United States Patent
Yamagaki et al.

(10) Patent No.: US 10,771,745 B2
(45) Date of Patent: Sep. 8, 2020

(54) IMAGE PROCESSING APPARATUS, IMAGE PROCESSING METHOD, AND STORAGE MEDIUM HAVING PROGRAM STORED THEREIN

(71) Applicant: NEC CORPORATION, Tokyo (JP)

(72) Inventors: Norio Yamagaki, Tokyo (JP); Hiroaki Aminaka, Tokyo (JP); Dai Kanetomo, Tokyo (JP); Yasuhiko Matsunaga, Tokyo (JP); Gen Motoyoshi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/327,577

(22) PCT Filed: Aug. 7, 2017

(86) PCT No.: PCT/JP2017/028526
§ 371 (c)(1),
(2) Date: Feb. 22, 2019

(87) PCT Pub. No.: WO2018/037890
PCT Pub. Date: Mar. 1, 2018

(65) Prior Publication Data
US 2019/0191128 A1    Jun. 20, 2019

(30) Foreign Application Priority Data

Aug. 23, 2016  (JP) .................................. 2016-162850

(51) Int. Cl.
*H04N 21/2662* (2011.01)
*H04N 19/167* (2014.01)
(Continued)

(52) U.S. Cl.
CPC ............... *H04N 7/181* (2013.01); *H04N 7/18* (2013.01); *H04N 7/183* (2013.01);
(Continued)

(58) Field of Classification Search
CPC .................. H04N 7/181; H04N 7/183; H04N 21/234345; H04N 21/2402; H04N 7/18;
(Continued)

(56) References Cited

U.S. PATENT DOCUMENTS

| 2002/0015092 | A1* | 2/2002 | Feder ..................... H04N 7/152 348/14.13 |
| 2010/0119157 | A1* | 5/2010 | Kameyama .......... H04N 19/115 382/195 |
| 2012/0075465 | A1* | 3/2012 | Wengrovitz ........... H04N 7/181 348/143 |

FOREIGN PATENT DOCUMENTS

| JP | 2000-101901 A | 4/2000 |
| JP | 2004-072655 A | 3/2004 |

(Continued)

OTHER PUBLICATIONS

International Search Report for PCT/JP2017/028526 dated Oct. 31, 2017 [PCT/ISA/210].

(Continued)

*Primary Examiner* — Jared Walker
(74) *Attorney, Agent, or Firm* — Sughrue Mion, PLLC

(57) ABSTRACT

A image processing apparatus according to an aspect of the present invention includes: determination unit 131 that determines a first region based on an occurrence position where a phenomenon is estimated to occur in an image; and setting unit 132 that sets a first condition in which the first region is encoded, and a second condition in which a second region included in the image and being a region other than (Continued)

the first region is encoded in such a way that the first region enhances image quality as compared with the second region.

14 Claims, 27 Drawing Sheets

(51) Int. Cl.
    *H04N 21/24*     (2011.01)
    *H04N 21/2343*     (2011.01)
    *H04N 7/18*     (2006.01)
    *H04N 19/176*     (2014.01)
    *H04N 19/124*     (2014.01)
    *H04N 21/431*     (2011.01)
    *H04N 21/6547*     (2011.01)

(52) U.S. Cl.
    CPC ......... *H04N 19/124* (2014.11); *H04N 19/167* (2014.11); *H04N 19/176* (2014.11); *H04N 21/234345* (2013.01); *H04N 21/2402* (2013.01); *H04N 21/2662* (2013.01); *H04N 21/431* (2013.01); *H04N 21/6547* (2013.01)

(58) Field of Classification Search
    CPC ............. H04N 21/6547; H04N 21/431; H04N 19/167; H04N 19/124; H04N 19/176; H04N 21/2662

See application file for complete search history.

(56) References Cited

FOREIGN PATENT DOCUMENTS

| | | |
|---|---|---|
| JP | 2005-130251 A | 5/2005 |
| JP | 2005-277660 A | 10/2005 |
| JP | 2005-341076 A | 12/2005 |
| JP | 2006-203395 A | 8/2006 |
| JP | 2008-048243 A | 2/2008 |
| JP | 2009-147595 A | 7/2009 |
| JP | 2009-290501 A | 12/2009 |
| JP | 2010-232888 A | 10/2010 |
| JP | 2013-229666 A | 11/2013 |
| JP | 2015-122768 A | 7/2015 |
| JP | 2015-208021 A | 11/2015 |

OTHER PUBLICATIONS

Written Opinion for PCT/JP2017/028526 dated Oct. 31, 2017 [PCT/ISA/237].

* cited by examiner

IMAGE PROCESSING APPARATUS, IMAGE PROCESSING METHOD, AND STORAGE MEDIUM HAVING PROGRAM STORED THEREIN

CROSS REFERENCE TO RELATED APPLICATIONS

This application is a National Stage of International Application No. PCT/JP2017/028526 filed Aug. 7, 2017, claiming priority based on Japanese Patent Application No. 2016-162850 filed Aug. 23, 2016, the disclosure of which is incorporated herein in its entirety.

TECHNICAL FIELD

The present disclosure relates to a technique of processing images.

BACKGROUND ART

In a public organization such as a police department and a fire department, for example, when a security service is performed in an event or an entertainment, and when a disaster, an incident, an accident, or the like occurs, refining the service such as grasping an on-site situation, and detecting a suspicious person and a suspicious object by utilizing a video (a captured image) is required. Configuring an independent network directed to temporary image distribution, utilizing a mobile carrier network, and the like for distributing an image to be utilized in such a service are also put into practice. Further, configuring a public-oriented long term evolution (LTE) is also studied for the future. A public-oriented LTE is also referred to as a public safety LTE (PS-LTE).

In order to utilize an image analysis technique for refining a public service, a high-quality image is required. In order to grasp an on-site situation when a disaster, an incident, an accident, or the like occurs by means of an image, and in order to detect a sign of an incident or an accident, it is necessary to acquire beforehand the image of a place where a disaster, an incident, an accident, or the like may occur. In view of the above, a communication infrastructure for transmitting an image from a place where a disaster, an incident, an accident, or the like may occur is necessary. However, it is not possible to predict a time and a place when and where a disaster, an incident, an accident, and the like occur. Therefore, it is not realistic to configure in advance a large-capacity public-oriented communication infrastructure in all possible places where a disaster, an incident, an accident, and the like may occur. Thus, effectively utilizing a bandwidth of an existing public-oriented network is required in a public service using an image. When an image is used in a public service, all regions in the image may not always be important. An important region is a region associated with a disaster, an incident, an accident, or the like, for example. A region where such an important and necessary target object, for example, is displayed is referred to as a region of interest (ROI). In the following description, an ROI is also described as a region of interest. In the following description, an ROI indicates a region where a phenomenon for which grasping a situation is required is generated in an environment captured in an image, for example.

For example, PTL 1 discloses a monitoring system for controlling a predetermined ROI in such a way that the predetermined ROI enhances image quality as compared with a region other than the ROI.

PTL 2 discloses an ROI region setting device in which an ROI recognized by a method selected from among a plurality of different ROI recognition methods is set as an ROI region.

PTL 3 discloses a monitoring camera and a monitoring system for adjusting a capturing region of the monitoring camera, based on a relative priority of an occurring event, when a predetermined event such as an accident, an incident, or a disaster occurs at a same time multiply.

PTL 4 discloses a moving image communication system in which an amount of encoding image data in a region other than an ROI is reduced, before transcoding of discarding a part of image data acquired by performing progressive coding according to a network bandwidth in which an image is distributed is performed. PTL 5 discloses a moving image communication system in which a size of a region being set in such a way that image quality is enhanced as compared with another region is reduced or increased depending on a measured communication rate.

PTL 6 discloses an image distributing device in which a gazing region gazed by a user is selected from among a plurality of regions acquired by dividing an image, based on a detected line-of-sight direction of the user, and encoding quality of the selected gazing region is enhanced.

CITATION LIST

Patent Literature

[PTL 1] Japanese Unexamined Patent Application Publication No. 2006-203395
[PTL 2] Japanese Unexamined Patent Application Publication No. 2004-072655
[PTL 3] Japanese Unexamined Patent Application Publication No. 2009-290501
[PTL 4] Japanese Unexamined Patent Application Publication No. 2005-341076
[PTL 5] Japanese Unexamined Patent Application Publication No. 2015-208021
[PTL 6] Japanese Unexamined Patent Application Publication No. 2005-130251

SUMMARY OF INVENTION

Technical Problem

In a service by a public organization, for example, in a security service by a police department in an event or an entertainment, in order to prevent an act of terrorism or an incident, particularly, it is necessary to securely distribute an image of an ROI with high quality to a remotely placed head office. An ROI in a security service is, for example, a place where suspicious persons, suspicious objects, and people gather, a place where screams or the like are heard, or the like. It is not possible to predict when and where such an ROI in a security service is generated.

In the technique of PTL 1, an ROI is set in advance. Therefore, it is difficult to apply the technique of PTL 1 to an image in which it is not possible to specify in advance a place where an ROI is generated. Further, PTLs 2 and 3 fail to disclose reducing a communication network bandwidth for use in transmitting an image. In the techniques of PTLs 2 and 3, it is not possible to reduce a communication network bandwidth for use in transmitting an image, without lowering image quality of an ROI in the image.

In the image communication system of PTL 4, first, an amount of encoding an extension layer in a region other than an ROI is reduced, and then data are discarded in transcoded data in the order of a lower plane of the extension layer, an upper plane of the extension layer, and a base layer. In this case, since data in the ROI are also discarded in the transcoded data, image quality of the ROI is also lowered. Specifically, in the technique of PTL 4, it is not possible to reduce a network bandwidth necessary for transmitting an image, without lowering image quality of an ROI.

In the technique of PTL 5, the size of a region in which image quality is designated to enhance (hereinafter, described as a "high image quality region") may be reduced depending on a communication bandwidth. For example, when a target object displayed in an image is a target of interest, a region of the target object is an original ROI. In PTL 5, a high image quality region may not always coincide with an ROI. For example, in the image communication system of PTL 5, even when an ROI is included in a high image quality region at the beginning, when the size of the high image quality region is reduced, the ROI may be deviated from the high image quality region. Further, the high image quality region may become smaller than the ROI. In such a case, image quality of a region which is not included in the high image quality region in the ROI may be lowered. Specifically, in the technique of PTL 5, it is not possible to reduce a network bandwidth necessary for transmitting an image, without lowering image quality of an ROI.

In PTL 6, when a user does not gaze at an ROI, a gazing region is not an ROI. In this case, in the technique of PTL 6, the ROI may not always be specified as a gazing region. Therefore, even when encoding quality of a gazing region is enhanced, it is not always possible to enhance encoding quality of an ROI. When an ROI is not gazed, image quality of the ROI is lowered. Specifically, in the technique of PTL 6, it is not possible to reduce a network bandwidth necessary for transmitting an image, without lowering image quality of an ROI.

The present invention is made in order to solve the above-described issues. One of objects of the present invention is to provide an image processing technique capable of reducing a network bandwidth necessary for transmitting an image, while suppressing lowering of image quality of a region of interest in the image where an occurrence place is not determined in advance.

Solution to Problem

An image processing apparatus according to an aspect of the present invention includes: determination means for determining a first region based on an occurrence position where a phenomenon is estimated to occur in an image; and setting means for setting a first condition in which the first region is encoded, and a second condition in which a second region included in the image and being a region other than the first region is encoded in such a way that the first region enhances image quality as compared with the second region.

An image processing method according to an aspect of the present invention includes: determining a first region based on an occurrence position where a phenomenon is estimated to occur in an image; and setting a first condition in which the first region is encoded, and a second condition in which a second region included in the image and being a region other than the first region is encoded in such a way that the first region enhances image quality as compared with the second region.

A storage medium according to an aspect of the present invention stores a program causing a computer to execute: determination processing of determining a first region based on an occurrence position where a phenomenon is estimated to occur in an image; and setting processing of setting a first condition in which the first region is encoded, and a second condition in which a second region included in the image and being a region other than the first region is encoded in such a way that the first region enhances image quality as compared with the second region. The present invention is achieved by the program stored in the storage medium described above.

Advantageous Effects of Invention

The present invention is advantageous in reducing a network bandwidth necessary for transmitting an image, while suppressing lowering of image quality of a region of interest in the image where an occurrence place is not determined in advance.

EXAMPLE EMBODIMENT

First Example Embodiment

«Configuration»

Next, a first example embodiment according to the present invention is described with reference to the drawings.

Figure 1:
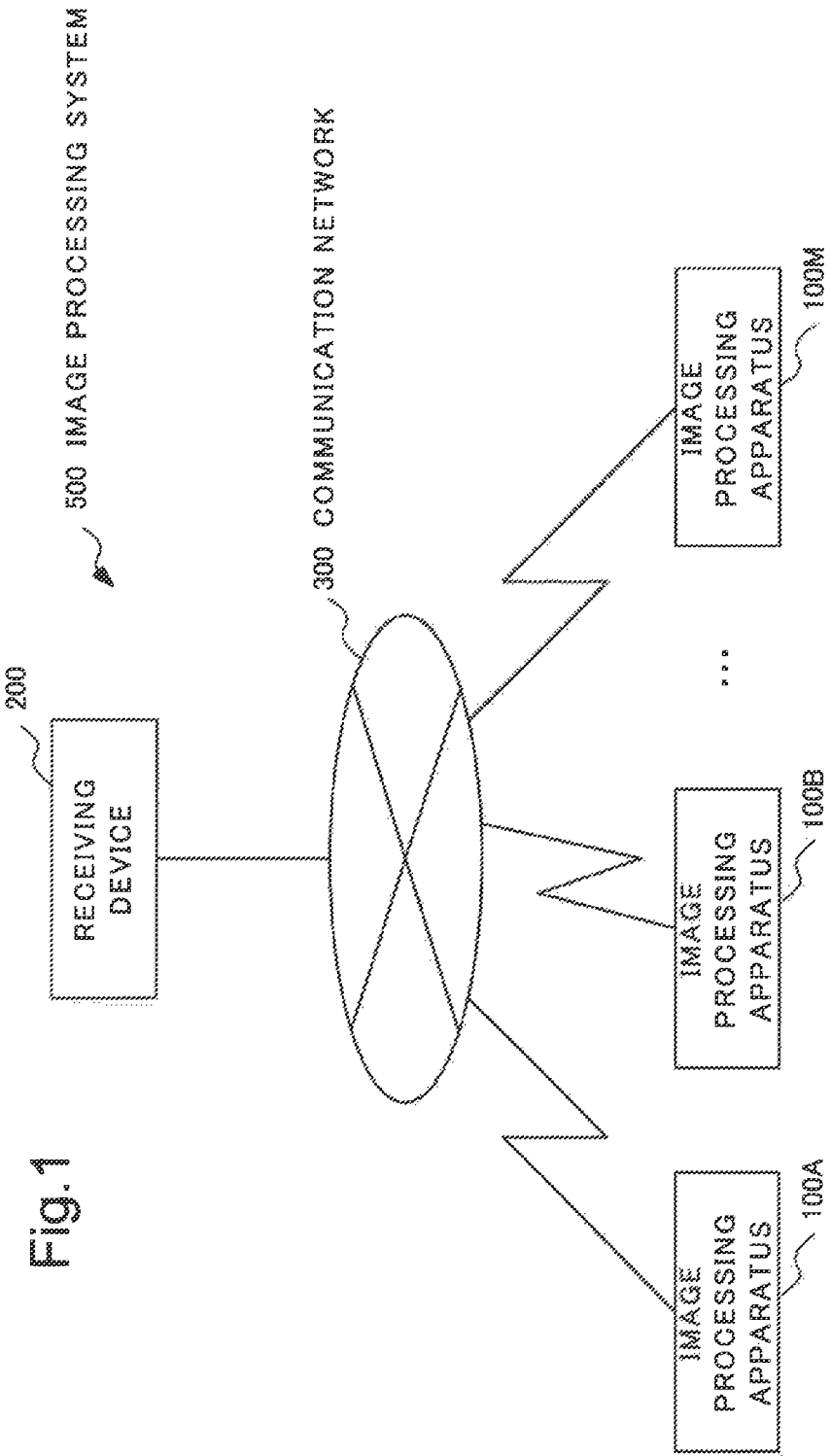
FIG. 1 is a block diagram illustrating a configuration example of an image processing system according to a first example embodiment of the present invention.

FIG. 1 is a block diagram illustrating a configuration example of an image processing system 500 according to the first example embodiment of the present invention. The image processing system 500 includes one or more image processing apparatuses 100 and a receiving device 200. The one or more image processing apparatuses 100 and the receiving device 200 may be communicably connected one another via a communication network 300. In the example illustrated in FIG. 1, as an example of the image processing apparatuses 100, image processing apparatuses 100A, 100B, . . . , and 100M are illustrated. The image processing apparatuses 100A, 100B, . . . , and 100M may have a common configuration illustrated as a configuration of the image processing apparatus 100 in the following. In the following, the image processing apparatuses 100A, 100B, . . . , and 100M are generically referred to as image processing apparatuses 100. The image processing apparatus 100 may have a wireless communication function. A wireless communication function may be a function of performing wireless communication in conformity with LTE, for example. A wireless communication function may be a function of performing communication by a wireless local area network (LAN) in accordance with a Wi-Fi (abbreviation of Wireless Fidelity, a registered trademark) standard. The image processing apparatus 100 may be communicably connected to the receiving device 200 via the communication network 300, specifically, via a base station, a wireless access point, or the like of the communication network 300 by using these wireless communication functions. The receiving device 200 has a wired communication function in accordance with a standard such as Ethernet (registered trademark), and is connected to the communication network 300 by the wired communication function. At least a part of the image processing apparatuses 100 may have a wired communication function, and may be connected to the communication network 300 by the wired communication function. Likewise, the receiving device 200 may have a wireless communication function, and may be connected to the communication network 300 by the wireless communication function.

Figure 2:
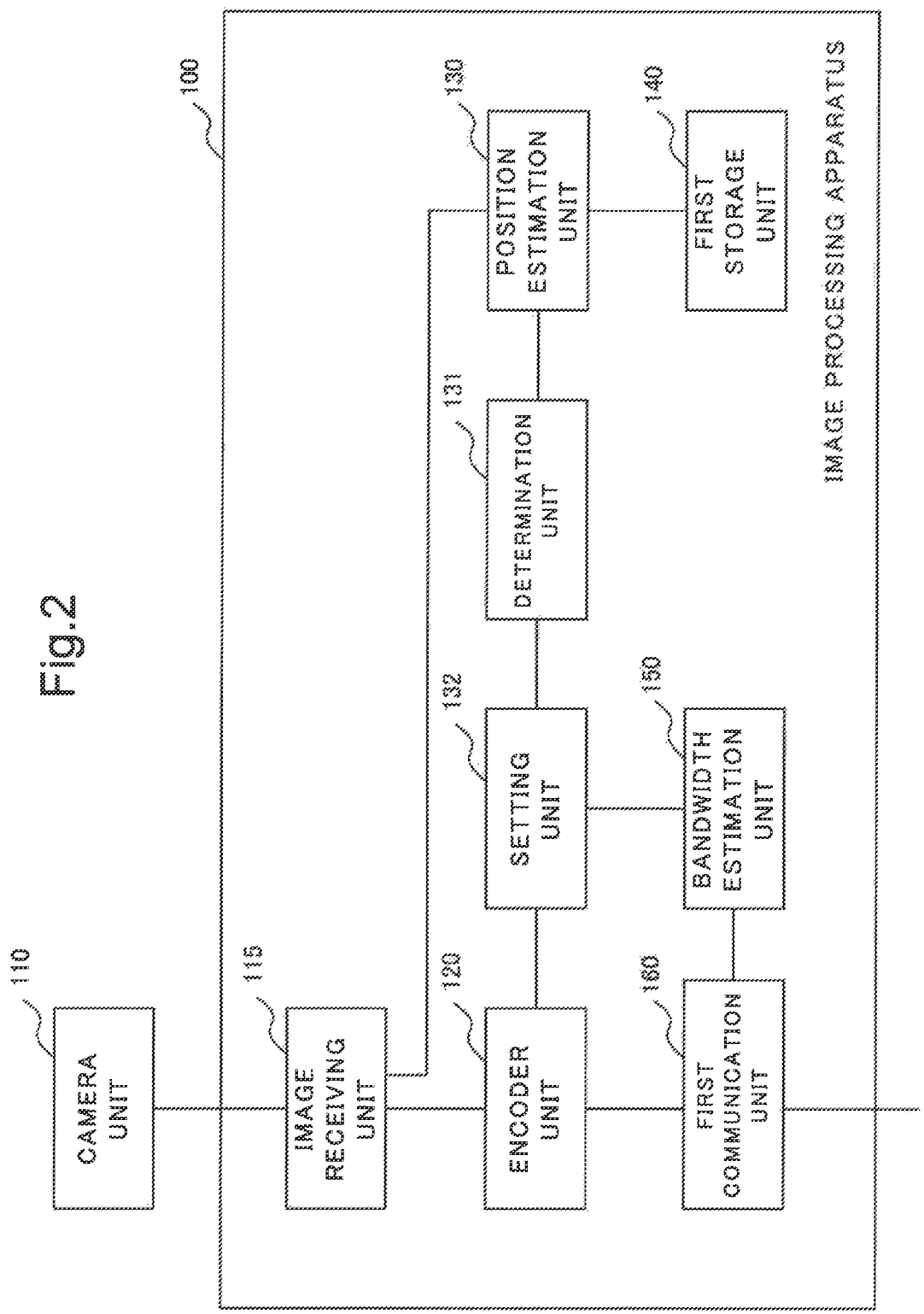
FIG. 2 is a block diagram illustrating a configuration example of an image processing apparatus according to the first example embodiment of the present invention.

FIG. 2 is a block diagram illustrating a configuration example of the image processing apparatus 100 in the first example embodiment. The image processing apparatus 100 includes an image receiving unit 115, an encoder unit 120 (also described as an encoding unit), a position estimation unit 130, a determination unit 131, a setting unit 132, a first storage unit 140, a bandwidth estimation unit 150, and a first communication unit 160. The image processing apparatus 100 is communicably connected to a camera unit 110.

The camera unit 110 is a camera included in the image processing apparatus 100, for example. The camera unit 110 may be incorporated in the image processing apparatus 100, or may be connected to the image processing apparatus 100 by a cable or the like. Further, the camera unit 110 may include a microphone for recording an image and a sound at a same time. The camera unit 110 transmits a captured image to the image receiving unit 115 of the image processing apparatus 100, for example.

The encoder unit 120, the position estimation unit 130, the determination unit 131, the setting unit 132, and the bandwidth estimation unit 150 may be achieved by a central processing unit (CPU) which executes processing by program control, for example. Specifically, the encoder unit 120, the position estimation unit 130, the determination unit 131, the setting unit 132, and the bandwidth estimation unit 150 may be achieved by a CPU which executes processing in accordance with an application software that runs based on an operating system (OS) loaded in the image processing apparatus 100, for example. In other words, a CPU may be operated as the encoder unit 120, the position estimation unit 130, the determination unit 131, the setting unit 132, and the bandwidth estimation unit 150 by executing a program loaded in a memory. The encoder unit 120, the position estimation unit 130, and the bandwidth estimation unit 150 may be mounted as a hardware engine such as a circuit, for example, for processing each of the functions at a high speed.

The image receiving unit 115 receives image data being data of an image captured by the camera unit 110. When received image data are encoded image data, the image receiving unit 115 may decode the image data. The image receiving unit 115 transmits received image data to the encoder unit 120 and the position estimation unit 130. The image receiving unit 115 may transmit received image data to the encoder unit 120 and the position estimation unit 130 for each frame, for example. When the camera unit 110 has a sound input function, the image receiving unit 115 may receive, from the camera unit 110, sound data in addition to image data. In the present example embodiment, the image receiving unit 115 may transmit sound data to the encoder unit 120. In this case, the encoder unit 120 to be described later may encode sound data in addition to image data by one of existing encoding methods. In this case, the first communication unit 160 may further transmit, to the receiving device 200, encoded sound data together with encoded image data. The image receiving unit 115 in the present example embodiment may not transmit sound data to the position estimation unit 130.

The position estimation unit 130 estimates a phenomenon occurrence position being a position where a phenomenon occurs in an image, based on data acquired by a sensor. Specifically, the position estimation unit 130 estimates the phenomenon occurrence position in a frame of an image, for example. In the following description, a position in an image represents a position in a frame of an image. A region in an image represents a region in a frame of an image. The position estimation unit 130 may estimate the phenomenon occurrence position for each frame of an image.

The phenomenon occurrence position may be represented by data indicating a region. Data indicating a region are data for specifying a range of a region, for example. Data indicating a region are, for example, coordinates of four vertexes of a rectangle, a specific point of a parallelogram (e.g., a point at which two coordinate values are both smallest), and two vectors representing two sides, coordinates of a center of a circle and a radius of the circle, a set of coordinates of each pixel included in a region, or the like. Data indicating a region are not limited to these examples. The phenomenon occurrence position may be represented by coordinates of a point. In the following description, the occurring phenomenon is also described as an "event". The phenomenon occurrence position is also described as an event occurrence position. The position estimation unit 130 may detect, from data acquired by a sensor, a predetermined feature pattern appearing in the data, as an occurring phenomenon. The position estimation unit 130 may estimate a region where a detected feature pattern appears, as a phenomenon occurrence position.

In the present example embodiment, a sensor is the camera unit 110. Data acquired by the sensor are image data. A feature pattern is an image pattern to be described later in detail. Specifically, the position estimation unit 130 detects, from image data of an image captured by the camera unit 110, a predetermined image pattern as an occurring phenomenon, for example. The position estimation unit 130 estimates a phenomenon occurrence direction, based on a detected image pattern. The phenomenon occurrence direction, specifically, a direction of an occurring phenomenon is, for example, a direction from the camera unit 110 toward a phenomenon occurrence position. More specifically, the phenomenon occurrence direction is, for example, a direction from a center of a camera of the camera unit 110 toward the phenomenon occurrence position. The occurring phenomenon is a sign (e.g., a target person or a target object) which may be connected to the phenomena, such as a disaster, an incident, and an accident. An image pattern may be, for example, a target person whose face information is registered in advance. An image pattern may be, for example, a person who makes a specific movement. An image pattern may be, for example, a change in shape of a target object whose shape or the like is registered in advance.

An image pattern may be, for example, a target object which makes a movement different from a registered movement pattern among target objects whose shapes and typical movement patterns are registered in advance. The phenomenon occurrence position may be a region of a face of a detected person. The phenomenon occurrence position may be a region of an entirety of a detected person. The phenomenon occurrence position may be a region of an entirety of a person whose face is detected. The phenomenon occurrence position may be a region of a detected target object.

First, the position estimation unit 130 may estimate the phenomenon occurrence direction being a direction of an occurring phenomenon. Further, the position estimation unit 130 may estimate, as the phenomenon occurrence position, coordinates of a point (e.g., a pixel) in an image indicated by an estimated occurrence direction. The phenomenon occurrence direction may be, for example, a direction of a face of a detected person, specifically, a direction from the camera unit 110 toward the face of the person. A direction of a face of a person may be, for example, a direction of a center of the face of the detected person, specifically, a direction from the camera unit 110 toward the center of the face of the person. A direction of a center of a face may be indicated by a centroid of a region of a face, for example. The position estimation unit 130 may determine a direction of a center of a face, based on positions of face parts (eyes, a nose, a mouth, and the like) detected from an image, and based on relationships between the positions of the face parts and the position of the center of the face, which are experimentally acquired in advance, for example. The phenomenon occurrence direction may be a direction of a person whose face is detected. The direction of the person may be, for example, a direction from the camera unit 110 toward a predetermined point of a body of a person (e.g., a centroid of an upper body or the like). The position estimation unit 130 may further detect a region of a body of a person whose face is detected in an image, and specify the above-described predetermined point in the detected body region. The position estimation unit 130 may calculate a predetermined point of a body of a person whose face is detected by using a positional relationship among a position of the face and a size of the face, and a predetermined point, which is experimentally derived in advance; and using a region of the detected face. The position estimation unit 130 may use a direction of a face, as a direction of a person. The phenomenon occurrence direction may be, for example, a direction of a target object, specifically, a direction from the camera unit 110 toward a target object.

A direction of a target object may be, for example, a direction indicated by a centroid of a region of the target object. The position estimation unit 130 may estimate the phenomenon occurrence direction by another method.

As described later in detail, information (hereinafter, also described as collation data) indicating an occurring phenomenon to be detected by the position estimation unit 130 is stored in advance in the first storage unit 140. In the present example embodiment, an image pattern is detected as an occurring phenomenon by the position estimation unit 130. Collation data stored in the first storage unit 140 represent an image pattern to be detected as an occurring phenomenon.

In the following, a case where a face of a specific person is detected is described as an example of an image pattern. The first storage unit 140 stores, as collation data, information representing a face of a specific person (e.g., information representing a feature of a face and usable for collation). In the following, information representing a feature of a face is described as "facial feature". The first storage unit 140 may store a facial feature as collation data for each of a plurality of persons. In the following description, a face in which information is included in collation data (specifically, a face to be detected) is described as a "registered face".

The position estimation unit 130 detects, from image data of an image captured by the camera unit 110, a face of a person (hereinafter, also described as a "detected face"). Specifically, the position estimation unit 130 detects a region of a face of a person. The position estimation unit 130 may extract, from a region of a detected face, a facial feature of the face. The position estimation unit 130 performs face collation of a detected face. Specifically, the position estimation unit 130 estimates whether or not a detected face is a face of a person (specifically, a registered face) whose collation data are stored in the first storage unit 140 by collating a facial feature of the detected face and the collation data stored in the first storage unit 140. As a result of collation, when it is determined that the detected face is identical to any one of registered faces in the collation data, the position estimation unit 130 may detect the detected face as an occurring phenomenon described above. As a result of collation, the position estimation unit 130 may detect a face which is determined to be a registered face, as an occurring phenomenon. As a method for detecting a face from an image, various face detection methods are applicable. Also as a method for performing collation of faces, various face collation methods are applicable.

The position estimation unit 130 may detect a plurality of detected faces as an occurring phenomenon in a same image frame. When a detected face is determined to be a registered face, the position estimation unit 130 may determine that a detected face, which is detected near a region of a detected face determined to be a registered face in a previous frame, and which is detected in a current frame (e.g., a detected face whose center is present within a predetermined distance from a center of a registered face) is identical to the detected face determined to be a registered face. When a region of a detected face detected in a current frame overlaps a region of a detected face determined to be a registered face in a previous face, for example, the position estimation unit 130 may detect that the detected face in the current frame is detected near a region of the detected face determined to be a registered face in the previous frame. The position estimation unit 130 may determine that the detected face determined to be a registered face in the previous frame is shifted to a position of the detected face in the current frame. In other words, the position estimation unit 130 may track a detected face determined to be a registered face. In this case, the position estimation unit 130 may not perform collation of a detected face, as far as tracking of a detected face is enabled.

The determination unit 131 determines a region of interest (hereinafter, also described as an ROI) based on an occurrence position estimated to be a phenomenon occurrence position, in an image in which a region including the occurrence position is captured. As described above, an occurrence position may be a point (e.g., a pixel) indicated by an occurrence direction in an image. The determination unit 131 may set, as an ROI, a region including a point indicated by an occurrence direction in an image (specifically, a point being an occurrence position). A point indicating an occurrence position may be, for example, a center (e.g., a centroid) of a region of a face determined to be a registered face. The determination unit 131 may set, as an ROI, a region of a predetermined size including a center of a face determined to be a registered face. The determination unit 131 may set, as an ROI, a region of a face determined to be a registered face. The determination unit 131 may set, as an ROI, a region of a person whose face is determined to be a registered face. The determination unit 131 may set, as an ROI, a region including a region of a person whose face is determined to be a registered face, and including a movement.

The determination unit 131 may determine an ROI in such a way that the ROI is a block group as an encoding unit by the encoder unit 120. The determination unit 131 may set, as an ROI, a block including at least a part of a phenomenon occurrence position (e.g., the above-described face region) among blocks as an encoding unit by the encoder unit 120, for example. In the following description, an ROI is also described as a "first region". An ROI may also be described as a "high image quality region". A region other than an ROI in an image frame is described as a "second region". A region other than an ROI in an image frame may also be described as a "low image quality region". An ROI to be determined by the determination unit 131 is not limited to the above-described examples.

The first storage unit 140 is, for example, a storage medium such as a memory. The first storage unit 140 stores information (e.g., the above-described collation data) for use in estimating a phenomenon occurrence direction by the position estimation unit 130. A phenomenon is, for example, a target person, a target object and the like which may be connected to a disaster, an incident, an accident, or the like. In the above-described example, collation data are, for example, data representing a facial feature of each of one or more persons. The first storage unit 140 may further store information for use in determining an ROI. Information for use in determining an ROI may be, for example, a size of a region to be set as an ROI.

The bandwidth estimation unit 150 estimates a bandwidth (in the following description, described as an "available bandwidth") of the communication network 300 usable by the image processing apparatus 100 including the bandwidth estimation unit 150. As a method for estimating an available bandwidth by the bandwidth estimation unit 150, various existing methods are applicable.

The setting unit 132 sets a condition (hereinafter, also described as a first condition) in which the first region is encoded, and a condition (hereinafter, also described as a second condition) in which a region other than the first region (namely, the above-described second region) is encoded in such a way that the first region enhances image quality as compared with the second region. A condition in which a region is encoded may be represented by a parameter (encoding parameter) indicating a ratio or the like of data to be reduced when encoding is performed, for example. The setting unit 132 may set the first condition and the second condition, based on an estimated available bandwidth. The setting unit 132 may set the first condition and the second condition in such a way that a bitrate (specifically, an amount of data per unit time) of image data to be encoded by the encoder unit 120 is transferrable in an estimated available bandwidth, for example. At this occasion, the setting unit 132 may set a value acquired by multiplying a constant of not smaller than 0 but not larger than 1 by an estimated available bandwidth, as an upper limit of a bitrate.

The setting unit 132 may set the first condition as a predetermined condition, for example. The setting unit 132 may set the second condition in such a way that a bitrate of an encoded second region becomes equal to or lower than a difference between a predicted available bandwidth, and a bitrate of a portion of an ROI which is encoded in the first condition. When it is not possible to transfer data in an ROI encoded when the first condition is a predetermined condition in an estimated available bandwidth, the setting unit 132 may reduce a bitrate of encoded data by lowering a frame rate. In this case, it is not necessary to change a parameter other than a frame rate. The setting unit 132 may lower a frame rate only in a region other than an ROI. In this case, the setting unit 132 may set the second condition in such a way that a region other than an ROI is the same among a plurality of frames. In other words, the setting unit 132 may set the first condition and the second condition in such a way that only an ROI changes, and a region other than the ROI does not change regarding encoded data in which the plurality of frames are encoded. When it is not possible to transfer data in an ROI which is encoded when the first condition is a predetermined condition in an estimated available bandwidth, the setting unit 132 may lower a bitrate of the ROI in such a way that data in the ROI which is encoded in the estimated available bandwidth is transferrable.

When an occurring phenomenon is not detected, the setting unit 132 may set a same encoding condition for all regions in a screen of an image, for example. In this case, the setting unit 132 may set an encoding condition in such a way that a bitrate of encoded data falls within an available bandwidth. At this occasion, the setting unit 132 may set a value acquired by multiplying a constant of larger than 0 but not larger than 1 by an estimated available bandwidth, as an upper limit of a bitrate. A lower limit of a bitrate may be determined. When an available bandwidth falls below a lower limit of a predetermined bitrate, the setting unit 132 may keep a value of an encoding parameter other than a frame rate as a value when a bitrate is a lower limit, and lower the frame rate.

The encoder unit 120 encodes image data received by the image receiving unit 115, regarding an image captured by the camera unit 110. An encoding standard by the encoder unit 120 may be a standard such that an amount of encoded data is changeable depending on a place within a screen of an image by changing an encoding condition (e.g., an encoding parameter being a parameter for encoding). Generally, when an amount of encoded data is increased, image quality of an image to be acquired by decoding the data is enhanced. When an amount of encoded data is decreased, image quality of an image to be acquired by decoding the data is lowered. The encoder unit 120 may encode a portion of a high image quality region of an image in the first condition set by the setting unit 132, and encode a portion other than the high image quality region (low image quality region/second region) in the second condition set by the setting unit 132. As described above, the first condition and the second condition are set in such a way that image quality of a high image quality region is enhanced as compared with image quality of a region other than a low image quality region. The encoder unit 120 transmits image data (hereinafter, also described as "encoded data"), which are encoded in the first condition and the second condition, to the receiving device 200 via the first communication unit 160 and the communication network 300.

An ROI (specifically, the first region) to be determined by the determination unit 131 may not be a block group being a minimum unit of encoding by the encoder unit 120. In other words, a portion that is not at least a part of a boundary of any one of blocks may be included in a boundary of an ROI. Not all boundaries of an ROI need to be at least a part of a boundary of any one of blocks. In this case, the encoder unit 120 may encode a block including at least a part of an ROI, based on the first condition, and encode a block which does not include at least a part of the ROI, based on the second condition.

The first communication unit 160 may be achieved by a processor to be controlled by a kernel of an OS, and a communication interface communicably connected to the processor, for example. In this case, the first communication unit 160 may perform processing of a transport layer, processing of a network layer, processing of a media access control (MAC), and the like, for example. Processing of a transport layer is, for example, processing of a transmission control protocol (TCP), a user datagram protocol (UDP), or the like. Processing of a network layer is, for example, processing of an internet protocol (IP) or the like. The first communication unit 160 may be a communication module which performs communication in accordance with a standard such as LTE, a wireless LAN, or the like. The first communication unit 160 receives encoded image data from the encoder unit 120, and transmits the encoded data to the receiving device 200 via the communication network 300.

Figure 3:
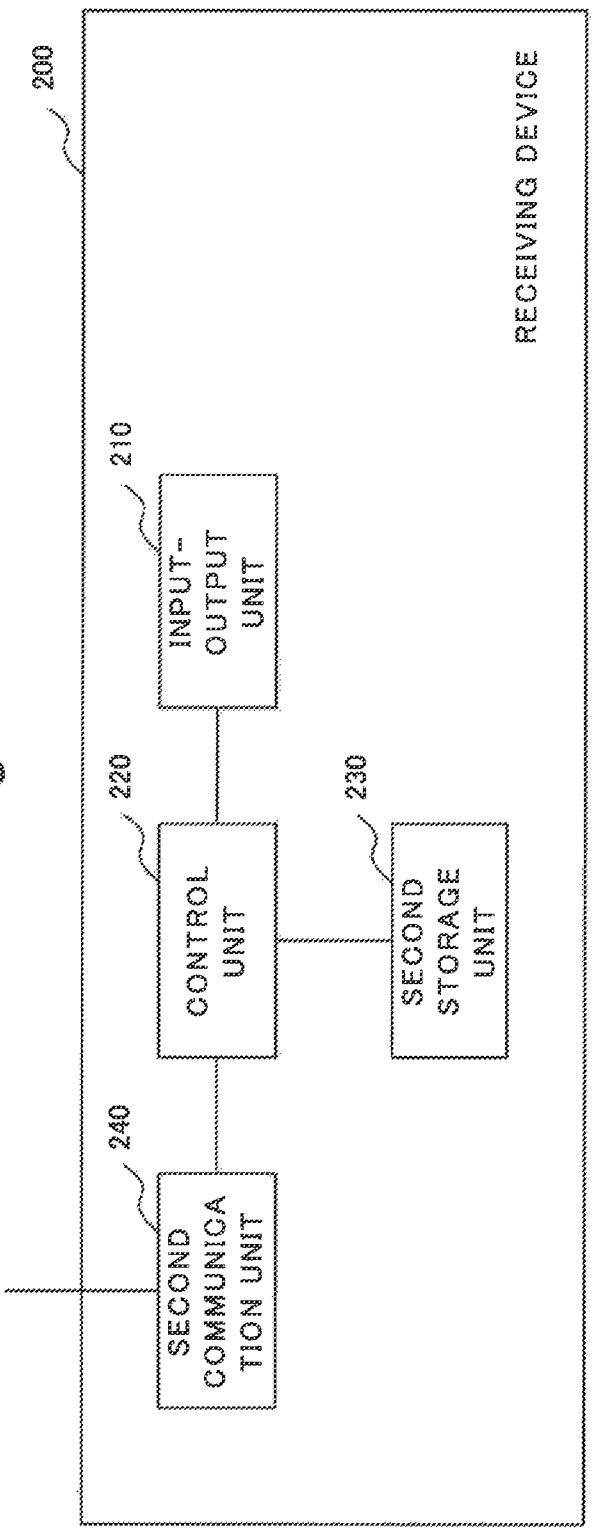
FIG. 3 is a block diagram illustrating a configuration example of a receiving device according to the first example embodiment of the present invention.

FIG. 3 is a block diagram illustrating a configuration example of the receiving device 200 in the present example embodiment. The receiving device 200 includes an input-output unit 210, a control unit 220, a second storage unit 230, and a second communication unit 240.

The input-output unit 210 is achieved by an output device having a display function such as a display or a touch panel, and an input device such as a touch panel, a keyboard, and a mouse, which are included in the receiving device 200, for example. The input-output unit 210 may be communicably connected to the receiving device 200. The input-output unit 210 displays an image according to control of the control unit 220, for example. The input-output unit 210 further receives a designation by a user. Specifically, the input-output unit 210 performs indication prompting to designate an image to be displayed among images from one or more image processing apparatuses 100. Indication prompting to designate an image to be displayed may be, for example, a thumbnail image of an image being received. Indication prompting to designate an image to be displayed may be, for example, a list of identifiers of apparatus names and the like, installation places, and the like of the image processing apparatus 100. The input-output unit 210 receives a designation for an image to be displayed, which is input by a user. A designation for an image to be displayed may be a designation to display images from the plurality of image processing apparatuses 100. The input-output unit 210 notifies the control unit 220 of an identifier of an image, which is input by a user, and is specified by a designation for an image to be displayed. An identifier of an image may be an identifier of the image processing apparatus 100 for transmitting the image. The input-output unit 210 receives, from the control unit 220, image data of an image of which display is designated, and displays the received image data.

The control unit 220 is achieved by a CPU which executes processing according to program control, for example. Specifically, the control unit 220 is achieved by a CPU which executes processing according to control of an application software that runs based on an OS loaded in the receiving device 200, for example. The control unit 220 receives, from the second communication unit 240, encoded data received by the second communication unit 240. The control unit 220 associates received encoded data with an image processing apparatus 100 that captures an image represented by the encoded data, and stores the encoded data associated with the image processing apparatus 100 that captures the image in the second storage unit 230. The control unit 220 generates image data of an image (specifically, an image of which display is designated), which is indicated by an identifier received from the input-output unit 210, by decoding encoded data of the image, and transmits the generated image data to the input-output unit 210. Specifically, the input-output unit causes the input-output unit 210 to display an image of which display is designated.

The second storage unit 230 stores encoded image data received by the control unit 220 via the second communication unit 240, specifically, encoded data.

The second communication unit 240 is achieved similarly to the first communication unit 160 in the image processing apparatus 100. The second communication unit 240 receives encoded image data (specifically, encoded data) from the image processing apparatus 100 via the communication network 300. The second communication unit 240 transmits the received encoded data to the control unit 220.

Figure 4:
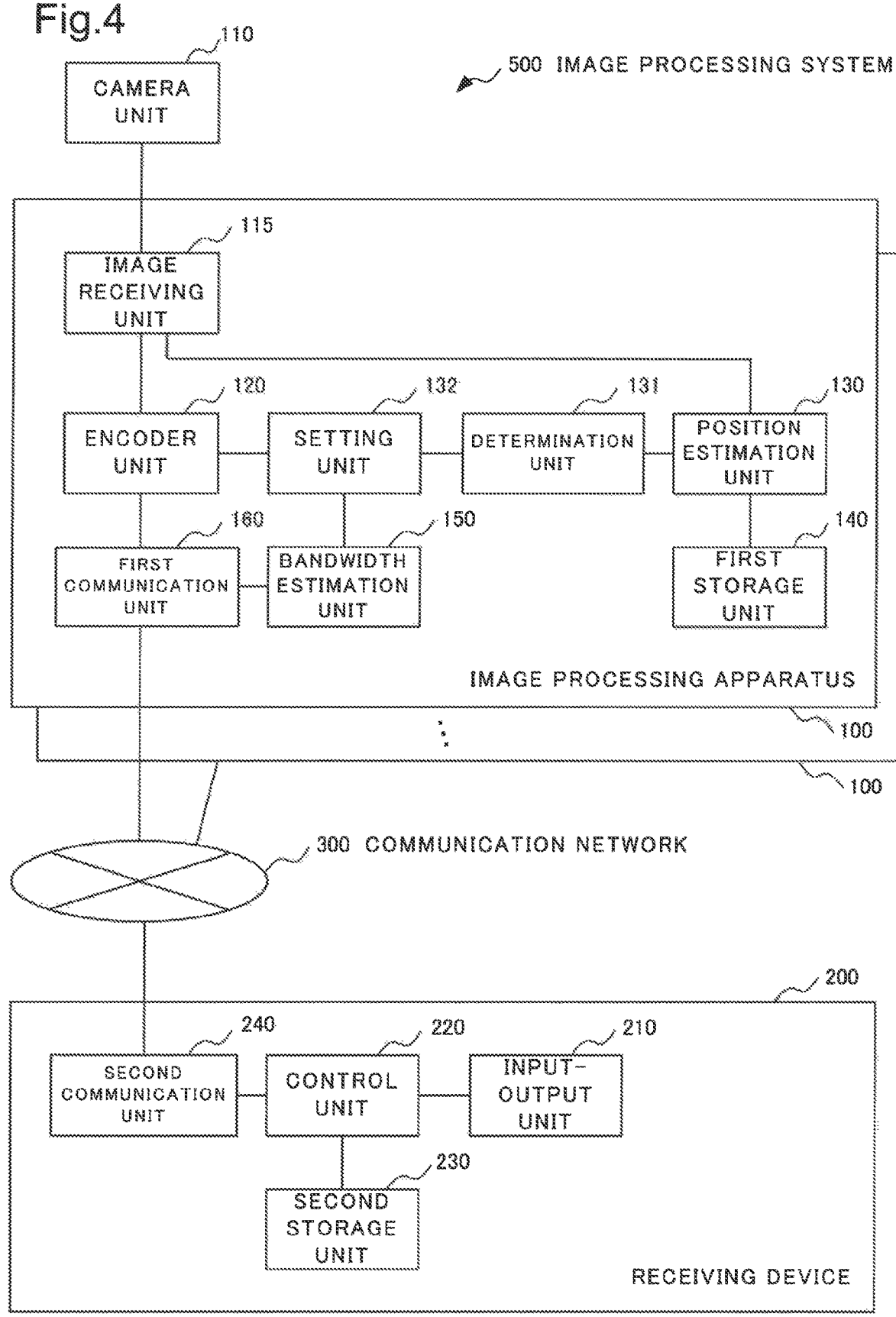
FIG. 4 is a block diagram illustrating a detailed overview of the image processing system according to the first example embodiment of the present invention.

FIG. 4 is a block diagram illustrating a detailed overview of the image processing system 500 in the present example embodiment. An image processing system illustrated in FIG. 4 includes one or more image processing apparatuses 100 and a receiving device 200. Each of the one or more image processing apparatuses 100 is communicably connected to the receiving device 200 via the communication network 300. Each of the image processing apparatuses 100 illustrated in FIG. 4 is the image processing apparatus 100 illustrated in FIG. 2. The receiving device 200 illustrated in FIG. 4 is the receiving device 200 illustrated in FIG. 3.

«Operation»

Next, an operation of the image processing apparatus 100 in the present example embodiment is described.

Figure 5:
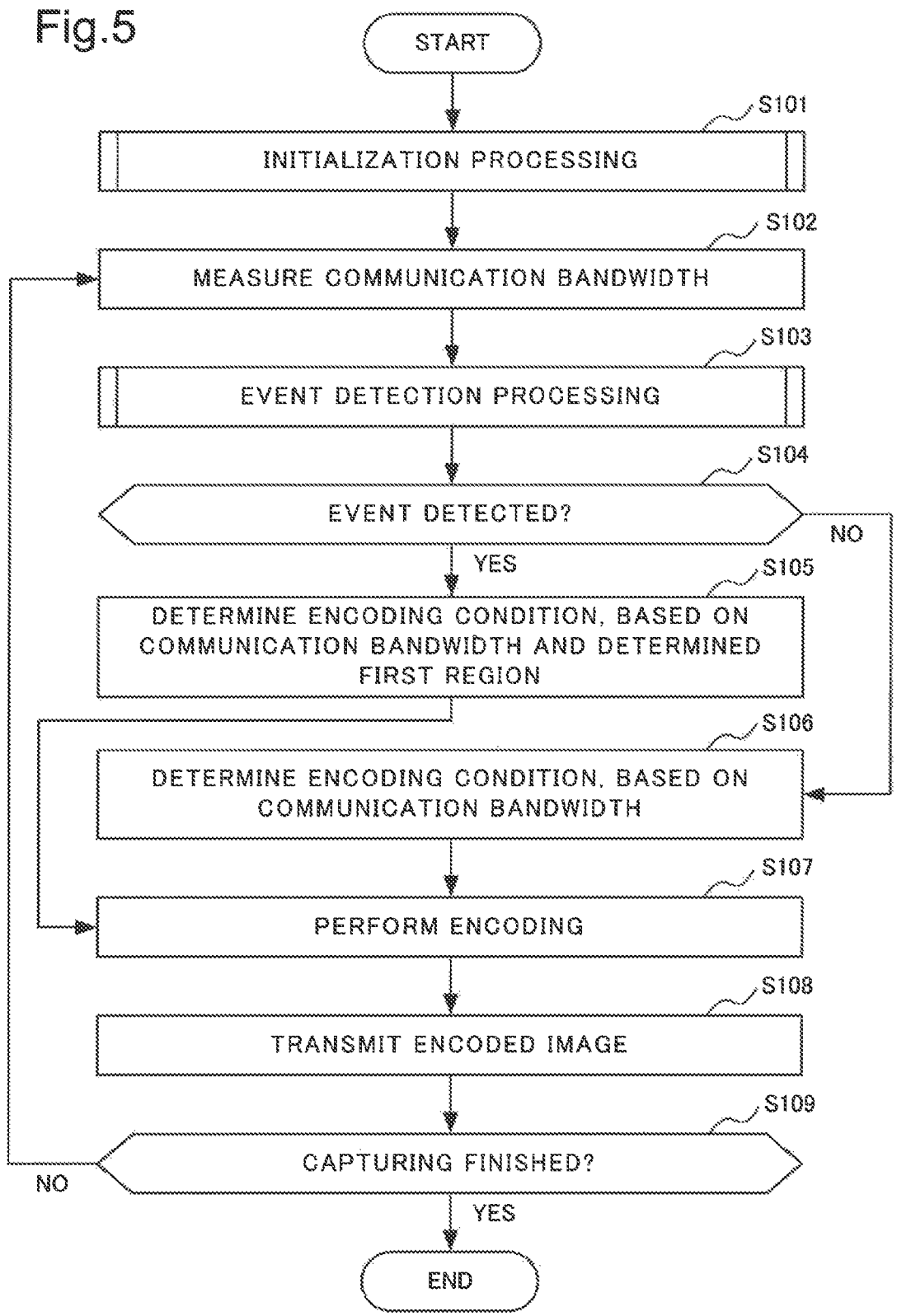
FIG. 5 is a flowchart illustrating an operation example of the image processing apparatus according to the first example embodiment of the present invention.

FIG. 5 is a flowchart illustrating an operation example of the image processing apparatus 100 in the present example embodiment. Independently of the operation illustrated in FIG. 5, the bandwidth estimation unit 150 may start estimating an available bandwidth when the image processing apparatus 100 is brought to a communicable state. In this case, the image processing apparatus 100 does not need to perform the operation of Step S102 to be described later. The bandwidth estimation unit 150 may periodically perform estimation of an available bandwidth, for example. The bandwidth estimation unit 150 may notify the encoder unit 120 of information on an estimated available bandwidth.

Step S101:

When power supply of the image processing apparatus 100 is turned on, for example, the image processing apparatus 100 performs initialization processing. The image processing apparatus 100 may perform initialization processing in accordance with a designation from the receiving device 200, for example. Since a signal line for transmitting a designation in this case is simple, illustration thereof is omitted in FIG. 4. A configuration is started by initialization processing, and image data are started to be transmitted from the camera unit 110 to the image receiving unit 115. An operation of initialization processing will be described later in detail.

Step S102:

The bandwidth estimation unit 150 estimates an available bandwidth, specifically, a communication bandwidth of the communication network 300, which is usable for transmitting encoded data from the image processing apparatus 100 to the receiving device 200. A timing at which the bandwidth estimation unit 150 performs measurement of an available bandwidth is not limited to the example illustrated in FIG. 5. The setting unit 132 may set an encoding condition, based on a finally estimated available bandwidth, when an encoding condition (e.g., the above-described first and second conditions) is determined.

Step S103:

Next, the image processing apparatus 100 performs event detection processing of detecting, from image data input from the camera unit 110, a disaster, an incident, an accident, or a sign of these phenomena, as an event. In Step S103, a region of interest (ROI) is determined by the determination unit 131, as a region relating to an occurring event. In Step S103, the image processing apparatus 100 may track an event detected in a frame preceding a current frame of an image. When an event is detected and an ROI is determined, information representing a place of the ROI is notified from the determination unit 131 to the setting unit 132. When an event is not detected and an ROI is not determined, information representing that an ROI is not present (specifically, an event is not detected) is notified from the determination unit 131 to the setting unit 132. Details of an operation of event detection processing will be described later.

Step S104:

When an event is not detected in Step S103 (NO in Step S104), the image processing apparatus 100 performs the operation of Step S106. When an event is detected in Step S103 (YES in Step S104), the image processing apparatus 100 performs the operation of Step S105.

Step S105:

The setting unit 132 determines an encoding condition for each of the first region, and a region other than the first region in an image, based on an available bandwidth being a usable communication bandwidth, and the first region determined by the determination unit 131.

Step S106:

The setting unit 132 determines an encoding condition, based on an estimated communication bandwidth, specifically, an available bandwidth.

Step S107:

The encoder unit 120 performs encoding of an image, based on a determined condition. When an event is detected, specifically, when a region of interest is determined, the encoder unit 120 performs encoding of image data in such a way that image quality of the first region is enhanced as compared with image quality of a region other than the first region according to an encoding condition of the first region, and an encoding condition of the region other than the first region. When an event is not detected, specifically, when a region of interest is not present, the encoder unit 120 may encode all regions of an image frame in a same condition. For example, the encoder unit 120 may impart an identifier of an image to encoded data being encoded image data, for example. An identifier of an image may be a name uniquely imparted to the image. An identifier of an image may be combination of an identifier of an image processing apparatus 100 which captures the image, and a time (e.g., a capturing start time), for example. The first communication unit 160 may impart an identifier of an image to the image.

Step S108:

The first communication unit 160 transmits encoded data being image data encoded by the encoder unit 120 to the receiving device 200 via the communication network 300.

Step S109:

When capturing is finished (YES in Step S109), the image processing apparatus 100 finishes the processing illustrated in FIG. 5. For example, when power supply of the camera unit 110 is turned off, or when a capturing stop button of the camera unit 110 or the image processing apparatus 100 is pressed, capturing is finished. When power supply of the camera unit 110 is turned off, and when a capturing stop button of the camera unit 110 is pressed, image data from the camera unit 110 is not transmitted. When transmission of image data from the camera unit 110 is stopped, the image processing apparatus 100 may determine that capturing is finished. When the image processing apparatus 100 receives a designation to finish capturing from the receiving device 200, the image processing apparatus 100 may determine that capturing is finished. When capturing is not yet finished (NO in Step S109), the operation of the image processing apparatus 100 returns to Step S102.

Next, an operation of initialization processing of the image processing apparatus 100 in the present example embodiment is described in detail with reference to the drawings.

Figure 6:
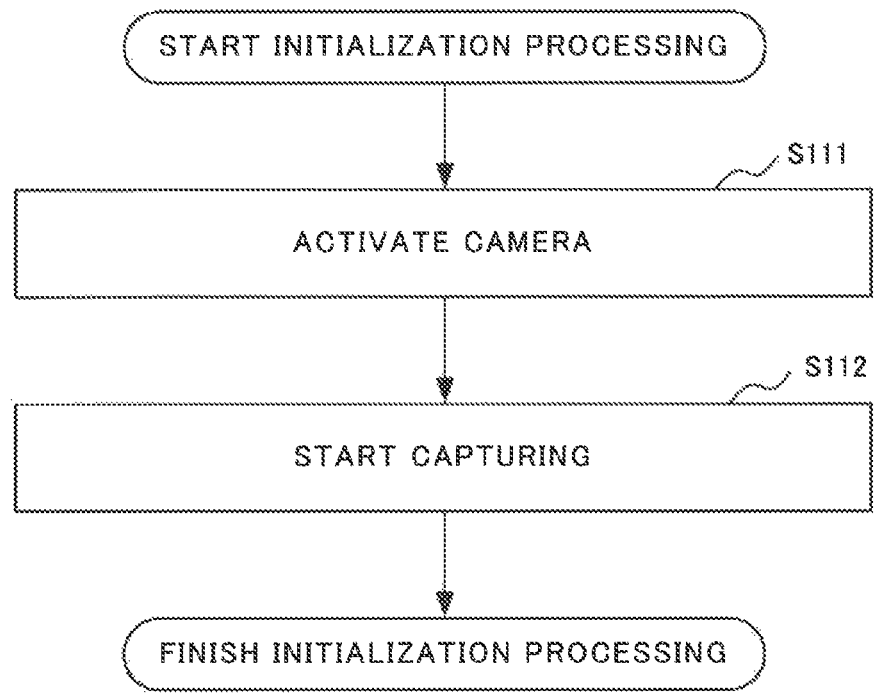
FIG. 6 is a flowchart illustrating an operation example of initialization processing of the image processing apparatus according to the first example embodiment of the present invention.

FIG. 6 is a flowchart illustrating an operation example of initialization processing of the image processing apparatus 100 in the present example embodiment.

Step S111:

For example, the image processing apparatus 100 activates the camera unit 110 in response to power-on of power supply of the image processing apparatus 100.

Step S112:

The camera unit 110 starts capturing. The camera unit 110 starts transmitting image data of a captured image to the image receiving unit 115.

Next, an operation of event detection processing of the image processing apparatus 100 in the present example embodiment is described in detail with reference to the drawings.

Figure 7:
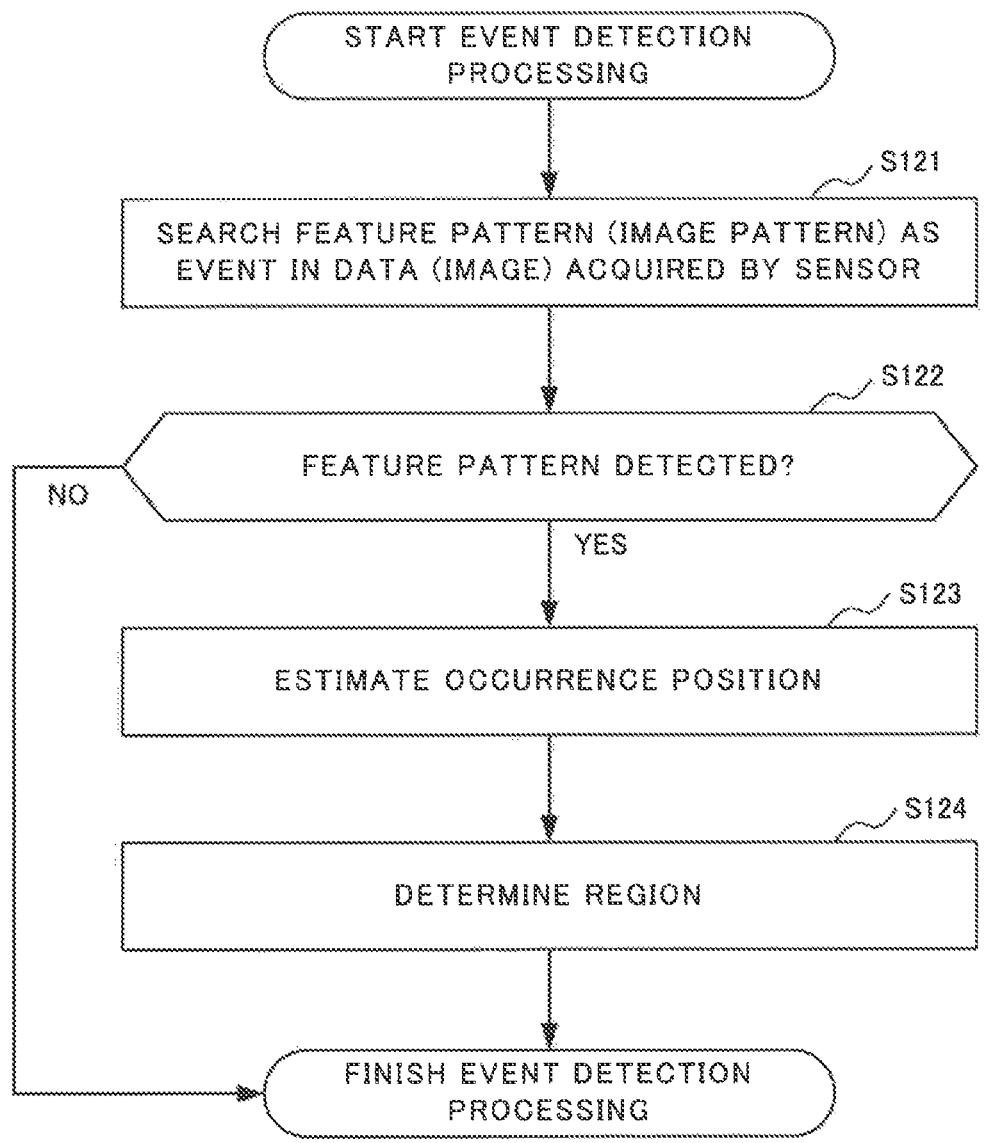
FIG. 7 is a flowchart illustrating an operation example of event detection processing of the image processing apparatus according to the first example embodiment of the present invention.

FIG. 7 is a flowchart illustrating an operation example of event detection processing of the image processing apparatus 100 in the present example embodiment. An operation of event detection processing is the operation of Step S103 illustrated in FIG. 4. Details of an operation when an event is determined to be detected, when a person who is determined to be a person whose face is registered in advance in collation data of faces is displayed in a captured image are described, as an operation example of Step S103 with reference to FIG. 7.

Step S121:

The position estimation unit 130 detects a feature pattern as an event in data acquired by a sensor. In the present example embodiment, a sensor is the camera unit 110. Data are image data. A feature pattern is an image pattern. Further, an image pattern is a face of a specific person. Specifically, the position estimation unit 130 detects a face in an image represented by image data.

Specifically, the position estimation unit 130 detects a face of a person in a frame of an image represented by image data input from the camera unit 110. More specifically, the position estimation unit 130 detects a region of a face of a person. Further, the position estimation unit 130 reads, from the first storage unit 140, collation data of faces registered in advance, and performs collation between a face whose data are included in the read collation data, and a face detected in an image frame. More specifically, the position estimation unit 130 extracts, for example, a facial feature from a region of a face (the above-described detected face) detected in an image frame; and compares between the extracted feature, and a feature of a face (registered face) included in the collation data. As a result of collation, when it is determined that the detected face is identical to any one of registered faces in the collation data, the position estimation unit 130 detects the face as an image pattern, specifically, a feature pattern (in other words, an occurring event). When a region of a face is not detected from the image, and when it is determined that a face detected from the image is different from any of registered faces, the position estimation unit 130 does not detect a feature pattern (in other words, an occurring event).

Step S122:

When a feature pattern (in other words, an occurring event) is not detected in Step S122 (NO in Step S122), the image processing apparatus 100 finishes the operation illustrated in FIG. 7. Specifically, as a result of collation, when a face identical to any of registered faces is not detected, the image processing apparatus 100 finishes the operation illustrated in FIG. 7. In this case, the image processing apparatus 100 performs the operation of Step S104 illustrated in FIG. 5 next.

When a feature pattern (in other words, an occurring event) is detected in Step S122 (YES in Step S122), the image processing apparatus 100 performs the operation of Step S123 next. In other words, as a result of collation, when a face identical to any one of the faces registered in a collation list is detected, the image processing apparatus 100 performs the operation of Step S123 next.

Step S123:

The position estimation unit 130 estimates a phenomenon occurrence position, based on a position of an image pattern detected as an event (e.g., a region of a detected face detected to be identical to a registered face) in an image frame. As described above, the position estimation unit 130 may estimate a region of a detected face detected to be identical to a registered face, as a phenomenon occurrence position. The position estimation unit 130 may estimate a region of a person having a detected face detected to be identical to a registered face, as a phenomenon occurrence position.

The position estimation unit 130 may determine a phenomenon occurrence direction, and estimate a phenomenon occurrence position (e.g., coordinates of a point in an image frame), based on the determined phenomenon occurrence direction. In this case, as described above, the phenomenon occurrence direction may be, for example, a direction of a person whose face is detected. The phenomenon occurrence direction may be a direction of a detected face. A direction of a face may be a direction from the camera unit 110 toward a centroid of a face region. In the present example embodiment, the determination unit 131 determines a direction of a person whose face is detected, as the phenomenon occurrence direction. The determination unit 131 specifies a direction from the camera unit 110 toward a position of a face detected in an image frame, as a direction of a person.

Step S124:

The determination unit 131 determines a region based on a phenomenon occurrence position, as a region of interest, namely, an ROI. When a phenomenon occurrence position is represented by a region, the determination unit 131 may set the phenomenon occurrence position as a region of interest. When a phenomenon occurrence position is represented by coordinates of a point, the determination unit 131 may set a region including the point represented by the phenomenon occurrence position, as a region of interest. For example, the determination unit 131 may determine, as an ROI, a region including a point indicated by a direction of a person estimated in Step S123 as a center, specifically, a region including a point indicated by a direction of a face as a center. The determination unit 131 may determine, as an ROI, a region of a detected face, or a region of a predetermined size including a region of a detected face as a center. When an ROI is determined, the image processing apparatus 100 finishes the operation illustrated in FIG. 7. Thereafter, the image processing apparatus 100 performs the operation of Step S104 illustrated in FIG. 5.

The determination unit 131 may determine ROIs of a number which does not exceed a predetermined upper limit value. The determination unit 131 may determine an ROI, based on regions of all detected faces. As described above, the determination unit 131 may set, as an ROI, a region including a region of a face determined to be a registered face. Specifically, the determination unit 131 may set, as an ROI, a block including at least a part of a region of a face determined to be a registered face, among blocks as an encoding unit by the encoder unit 120, for example. The determination unit 131 may set, as an ROI, a region including a region of a person whose face is determined to be a registered face. Specifically, the determination unit 131 may set, as an ROI, a block including at least a part of a region of a person whose face is determined to be a registered face, among blocks as an encoding unit by the encoder unit 120, for example. The determination unit 131 may provide a margin of a width corresponding to a predetermined pixel number around a region of a detected face, and set, as an ROI, a block including at least a region of the detected face and the margin. The determination unit 131 may determine an ROI in accordance with a predetermined method.

Subsequently, an operation of the receiving device 200 according to the first example embodiment of the present invention is described.

Figure 8:
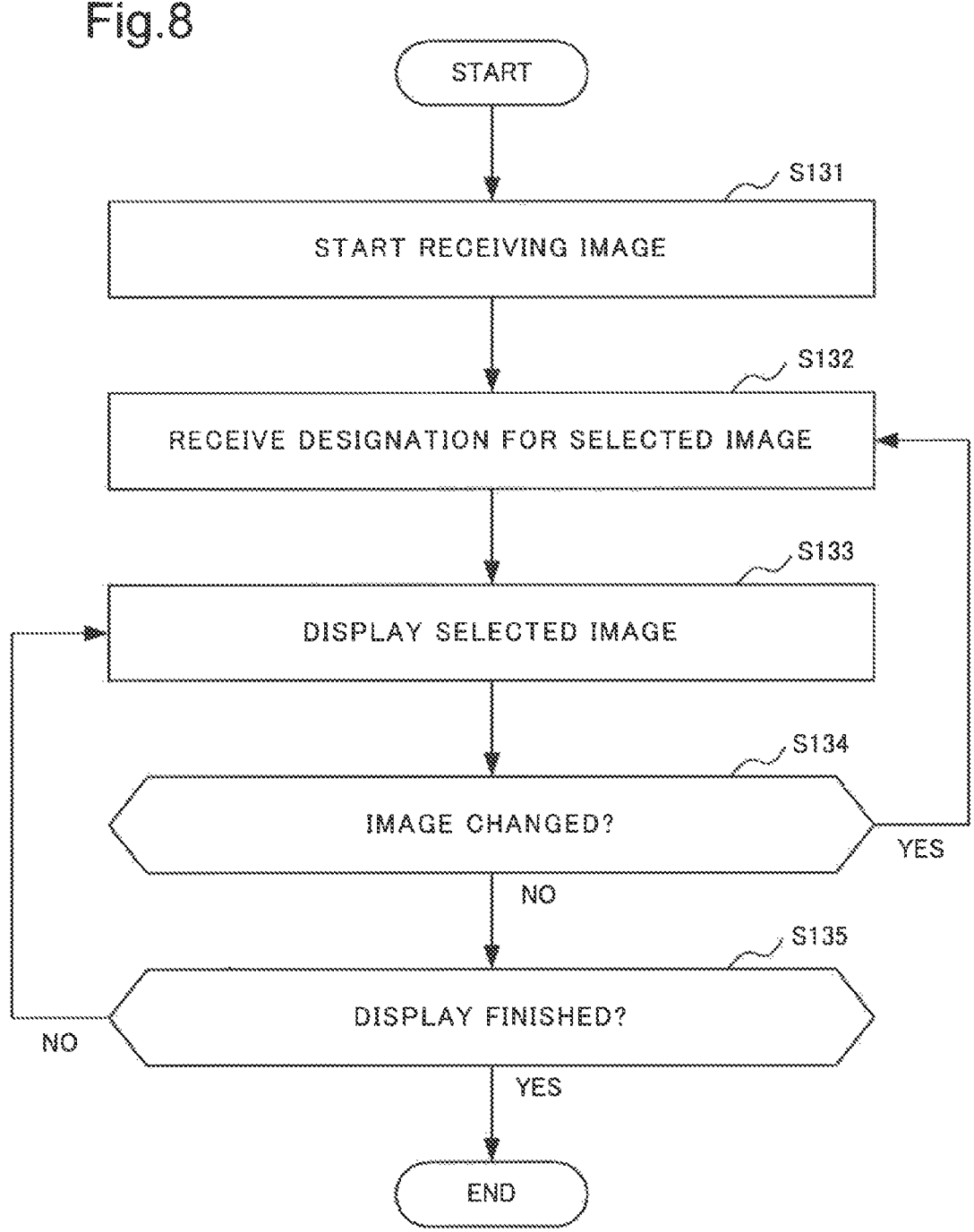
FIG. 8 is a flowchart illustrating an operation example of the receiving device according to the first example embodiment of the present invention.

FIG. 8 is a flowchart illustrating an operation example of the receiving device 200 in the present example embodiment.

Step S131:

The control unit 220 of the receiving device 200 starts receiving an image from the image processing apparatus 100. The control unit 220 receives encoded image data, namely, encoded data transmitted from the plurality of image processing apparatuses 100 via the communication network 300 and the second communication unit 240. The control unit 220 stores encoded data in the second storage unit 230 for each image processing apparatus 100 which transmits the encoded data. As described above, an identifier of an image may be imparted to encoded data to be transmitted from each of the image processing apparatuses 100. As described above, an identifier of an image may be, for example, combination of a content name unique to an image or an identifier of the image processing apparatus 100 which captures an image, and information on a time when the image is captured. The control unit 220 may cause the input-output unit 210 to display a latest frame represented by encoded data in a thumbnail format for each of the received encoded data, and periodically update the displayed latest frame.

Step S132:

The input-output unit 210 receives a designation for a selected image from a user. The input-output unit 210 may receive a designation for a plurality of selected images from a user. When receiving a user's designation for a selected image by a touch panel, a keyboard, a mouse, or the like, from among images displayed in a thumbnail format, for example, the input-output unit 210 notifies the control unit 220 of the designation. A designation may be an identifier of a selected image. A designation may be a number associated with an image displayed in a thumbnail format. A designation may be coordinates of a place touched or clicked by a user. In this case, the control unit 220 may receive a designation from the input-output unit 210, and specify a selected image (specifically, an identifier of an image), based on the received designation.

Step S133:

The control unit 220 stores, in the second storage unit 230, encoded data of an image selected by a user, specifically, of an image to be specified based on a user's designation, and decodes the encoded data. The control unit 220 displays, on the input-output unit 210, an image representing image data acquired by decoding encoded data. When a plurality of images are selected by a user, the control unit 220 may divide a display screen of the input-output unit 210 into areas of a same number as the number of selected images, and display one of the selected images in each of the divided areas.

Further, the control unit 220 may display, on a corner of a screen of the input-output unit 210, a thumbnail of an image which is received but is not displayed in such a way that a displayed image is changeable. When a user selects another image by selecting a thumbnail via the input-output unit 210, for example, while an image is displayed, the control unit 220 may change the displayed image to a newly selected image. In other words, a designation to change an image may be selecting a thumbnail of an image which is not displayed while an image is displayed. When selection of a thumbnail is detected, for example, the input-output unit 210 may transmit, to the control unit 220, an identifier of a selected image (specifically, an image whose thumbnail is selected), as a designation to change an image. A designation to change an image is not limited to the above-described examples. For example, a designation to change a displayed image, and a designation of an image selected as an image to be newly displayed may be different.

The control unit 220 may display an image via a graphics user interface (GUI), which is prepared in advance for image display. In the GUI, thumbnails of all received images may be displayed by switching a menu. The GUI may be set in such a way that an image can be selected by selecting a thumbnail of the image. The image processing apparatus 100 may be set in such a way that a position is specified by using a global positioning system (GPS), for example, and information on the specified position is transmitted to the receiving device 200. The receiving device 200 may collect information on a position of each of the image processing apparatuses 100. The receiving device 200 may display a map, and display a position of an image processing apparatus 100 which collects the information on the map together with a thumbnail of an image transmitted from the image processing apparatus 100. As described above, the receiving device 200 may display a received image to a user via a GUI. The receiving device 200 may display a position of an image processing apparatus 100 which captures an image and transmits the image to a user via the GUI. The receiving device 200 may provide a configuration with which a user is allowed to select an image via the GUI. Such a GUI is achievable in various forms.

Step S134:

When the input-output unit 210 receives a designation to change a displayed image from a user (YES in Step S134), the operation of the receiving device 200 returns to Step S132. When a designation to change a displayed image is not received from a user (NO in Step S134), the operation of the receiving device 200 is proceeded to Step S135.

As described above, a designation to change a displayed image, and a designation of an image selected as an image to be newly displayed may be different. In this case, when receiving a designation to change a displayed image in Step S134, the input-output unit 210 may receive a designation of a selected image in Step S132.

A designation of an image selected as an image to be newly displayed may be common to a designation to change a displayed image. Specifically, as described above, when a user selects another image by selecting a thumbnail via the input-output unit 210, for example, while an image is displayed, the control unit 220 may change a displayed image to a newly selected image. In other words, a designation to change an image may be selecting a thumbnail of an image that is not displayed, while an image is displayed. In this case, in Step S134, a designation of an image selected as an image to be newly displayed may be received as a designation to change a displayed image. This operation may be common to the operation of Step S132 that follows.

Step S135:

The input-output unit 210 may receive a designation to finish display of an image.

When the input-output unit 210 receives, from a user, a designation to finish display of an image (YES in Step S135), the receiving device 200 may finish the operation illustrated in FIG. 8. When a designation to finish display of an image is not received from a user (NO in Step S135), the receiving device 200 continues the operation of Step S133 and thereafter. When a designation to finish display of an image is received from a user (YES in Step S135), the control unit 220 may finish only the image by the input-output unit 210, and continue an operation of storing a received image in the second storage unit 230, while the receiving device 200 receives the image from the image processing apparatus 100.

The above-described present example embodiment has an advantageous effect that it is possible to reduce a network bandwidth necessary for transmitting an image, while suppressing lowering of image quality of a region of interest in the image where an occurrence position is not determined in advance. A reason for this is that the determination unit 131 determines a region of interest (specifically, the first region) in an image frame, based on a direction estimated as an event occurrence direction. The setting unit 132 sets a condition in which the first region is encoded, and a condition in which a region of an image other than the first region is encoded in such a way that image quality of the first region is enhanced as compared with image quality of a region other than the first region. By transmitting encoded data of an image according to an encoding condition determined as described above, it is possible to suppress lowering of image quality of a region of interest in the image where an occurrence position is not determined in advance. Further, it is possible to reduce a network bandwidth necessary for transmitting encoded data of the image.

Specifically, the above-described event is, for example, a disaster, an incident, an accident, or a target object as a sign of these phenomena, which is detected as an image pattern. According to the image processing apparatus 100 in the present example embodiment, it is possible to generate encoded data of an image in which an ROI where a target object estimated as such an event is displayed enhances image quality as compared with another region, and the bitrate is reduced. Thus, it is possible to suppress a communication bandwidth necessary for transmitting an image, and it is possible to increase the number of images transmittable via the same communication network 300.

Second Example Embodiment

«Configuration»

Next, an image processing system 501 in a second example embodiment according to the present invention is described in detail with reference to the drawings.

Figure 9:
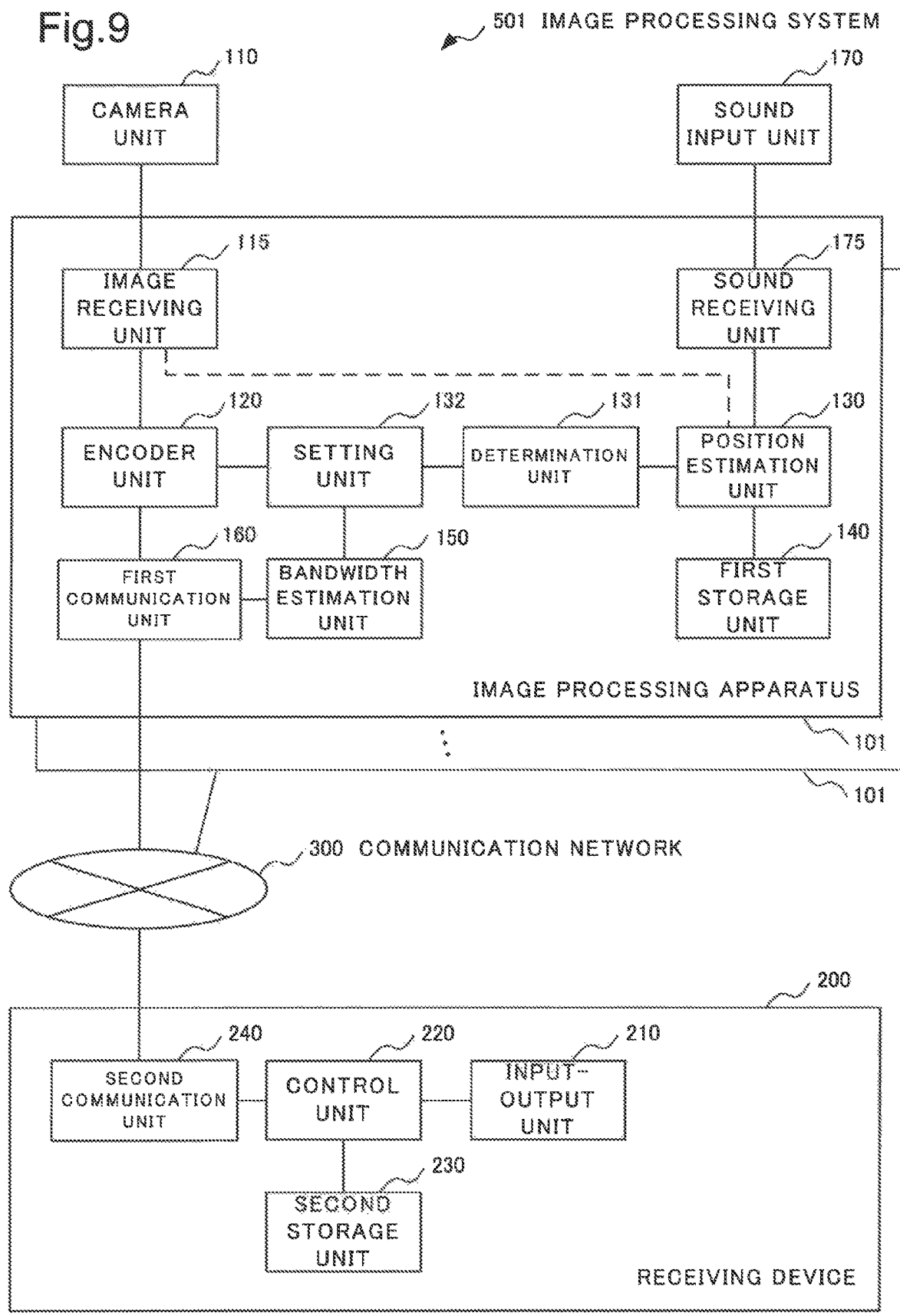
FIG. 9 is a block diagram illustrating a configuration example of an image processing system according to a second example embodiment of the present invention.

FIG. 9 is a block diagram illustrating a configuration example of the image processing system 501 in the present example embodiment. The image processing system 501 in the present example embodiment includes one or more image processing apparatuses 101 and a receiving device 200. The image processing apparatuses 101 are communicably connected to the receiving device 200 via a communication network 300.

When comparison is made with respect to the image processing system 500 in the first example embodiment illustrated in FIG. 4, the image processing system 501 in the present example embodiment includes the image processing apparatuses 101, in place of the image processing apparatuses 100. The receiving device 200 and the communication network 300 are respectively the same as the receiving device 200 and the communication network 300 in the first example embodiment.

Referring to FIG. 9, the image processing apparatus 101 in the present example embodiment includes same constituent elements as the constituent elements of the image processing apparatus 100 in the first example embodiment illustrated in FIG. 4. As illustrated in FIG. 9, the image processing apparatus 101 in the present example embodiment further includes a sound receiving unit 175. The image processing apparatus 101 in the present example embodiment is further communicably connected to a sound input unit 170. The image processing apparatus 101 in the present example embodiment has a same configuration as the image processing apparatus 100 in the first example embodiment illustrated in FIG. 2, and is operated similarly, except for the below-described differences. Constituent elements of the image processing apparatus 101 in the present example embodiment perform same operations as the constituent elements having same reference numbers in the image processing apparatus 100 of the first example embodiment, except for the below-described differences.

In the image processing apparatus 100 in the first example embodiment, the determination unit 131 determines an ROI by using image data captured by the camera unit 110. On the other hand, a determination unit 131 of the image processing apparatus 101 in the present example embodiment determines an ROI, based on sound data input from the sound input unit 170.

The sound input unit 170 is, for example, a microphone array including two or more microphones. The sound input unit 170 collects sounds, and inputs sound data representing the collected sounds to the sound receiving unit 175 of the image processing apparatus 101. The sound input unit 170 and a camera unit 110 may be installed in such a way that a relative position between the sound input unit 170 and the camera unit 110 does not change. The sound input unit 170 may be fixed to the camera unit 110. A relative position between the sound input unit 170 and the camera unit 110 may be measured in advance.

The sound receiving unit 175 receives collected sound data from each of a plurality of microphones included in the sound input unit 170.

A first storage unit 140 in the present example embodiment stores in advance data indicating a specific sound pattern (e.g., a scream, a specific phase, and the like), as collation data. The first storage unit 140 in the present example embodiment may store in advance data (e.g., a feature amount) indicating a feature of a specific sound pattern (e.g., a scream, a specific phrase, and the like), as collation data. As a specific feature pattern, a feature of voice of a specific person may be stored in advance.

A position estimation unit 130 in the present example embodiment estimates, as a phenomenon occurrence direction, a direction of a sound source which generates a sound, based on a phase difference in sound represented by sound data input from a plurality of microphones. The position estimation unit 130 may estimate a direction of a sound source in accordance with an existing method for estimating a direction of a sound source. A method for estimating a direction of a sound source is also disclosed in PTL 3, for example. More specifically, the position estimation unit 130 may first perform collation between a sound (e.g., a scream, a specific phrase, or the like), which is pre-registered (stored) in the first storage unit 140 as collation data, and a sound represented by sound data input from the sound input unit 170. The first storage unit 140 may store a feature amount extracted from a specific sound pattern. The position estimation unit 130 may extract a feature amount from sound data received by the sound receiving unit 175, and perform collation between the extracted feature amount, and a feature amount stored in the first storage unit 140. The position estimation unit 130 may detect voice of a specific person whose sound feature is stored in the first storage unit 140 in a sound received by the sound receiving unit 175.

When determining that an input sound coincides with any one of sounds registered as collation data, the position estimation unit 130 may detect the sound as an event such as a disaster, an incident, or an accident. The position estimation unit 130 may estimate a direction of a sound source of a sound detected as an event.

The determination unit 131 in the present example embodiment determines, as an ROI, a region in an image received by an image receiving unit 115, based on a direction of a sound source estimated by the position estimation unit 130. The determination unit 131 may specify, as a phenomenon occurrence position, a point in an image indicated by an estimated direction of a sound source (specifically, a phenomenon occurrence direction), and determine, as an ROI, a region including the specified point, for example. The determination unit 131 may determine, as an ROI, a region of a predetermined size including a specified point as a center. The determination unit 131 may determine a size of a region to be determined as an ROI depending on a magnitude of sound detected as an event, for example. For example, when a point in an image indicated by an estimated direction of a sound source is not determined as one point, such as a case where the sound input unit 170 includes two microphones, the determination unit 131 may determine, as an ROI, a region including all points indicated by an estimated direction of a sound source and included in an image. The determination unit 131 may determine an ROI, based on an estimated direction of a sound source in accordance with a predetermined rule.

«Operation»

Next, an operation of the image processing apparatus 101 in the present example embodiment is described.

Figure 10:
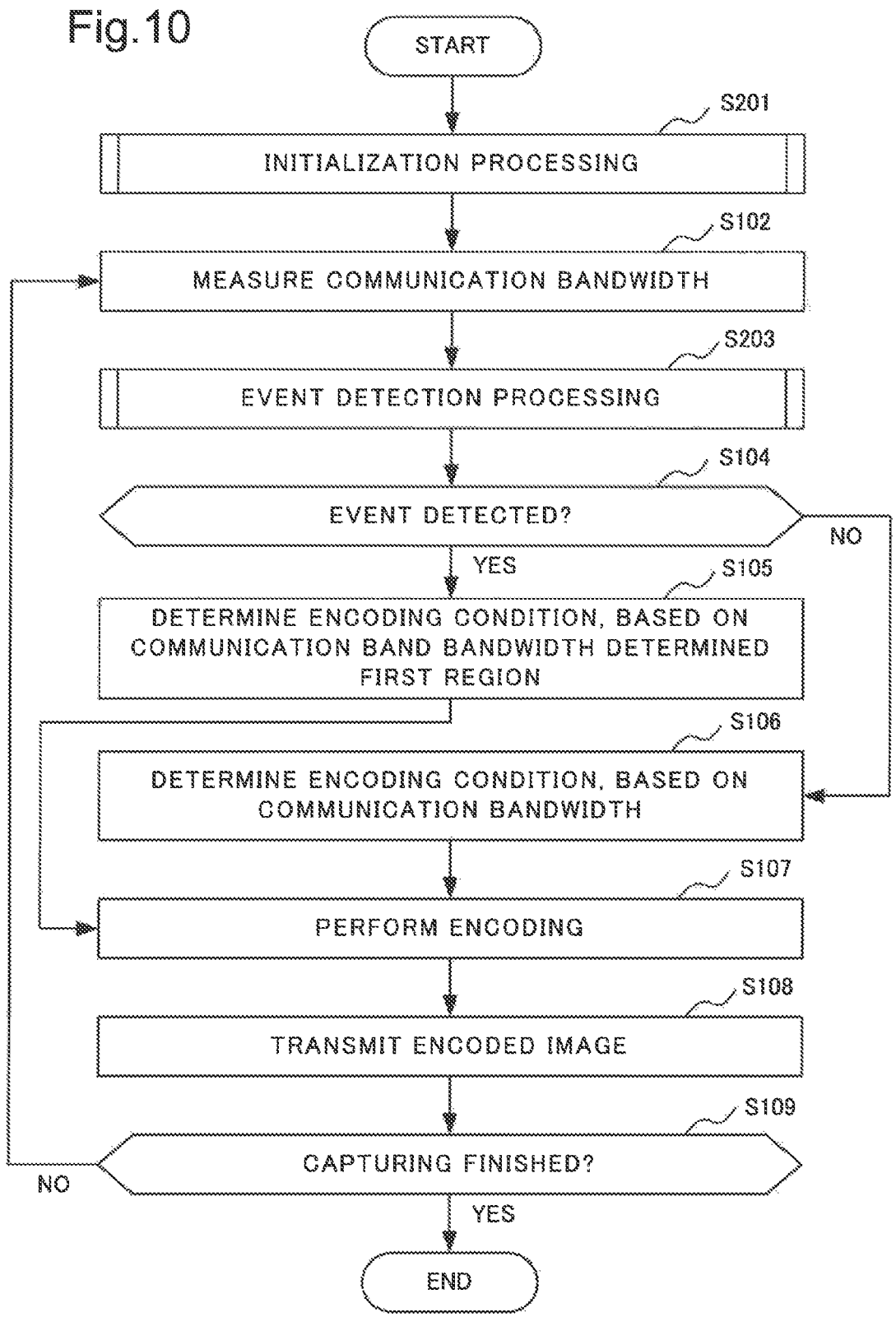
FIG. 10 is a flowchart illustrating an operation of an image processing apparatus according to the second example embodiment of the present invention.

FIG. 10 is a flowchart illustrating an operation of the image processing apparatus 101 in the present example embodiment. An operation of the image processing apparatus 101 in the present example embodiment illustrated in FIG. 10 is different from the operation of the image processing apparatus 100 in the first example embodiment of the present invention illustrated in FIG. 5, in the operations of Steps S201 and S203. The image processing apparatus 101 in the present example embodiment is operated similarly to the operations of steps having same reference numbers illustrated in FIG. 5, in steps other than Steps S201 and S203 illustrated in FIG. 10.

Figure 11:
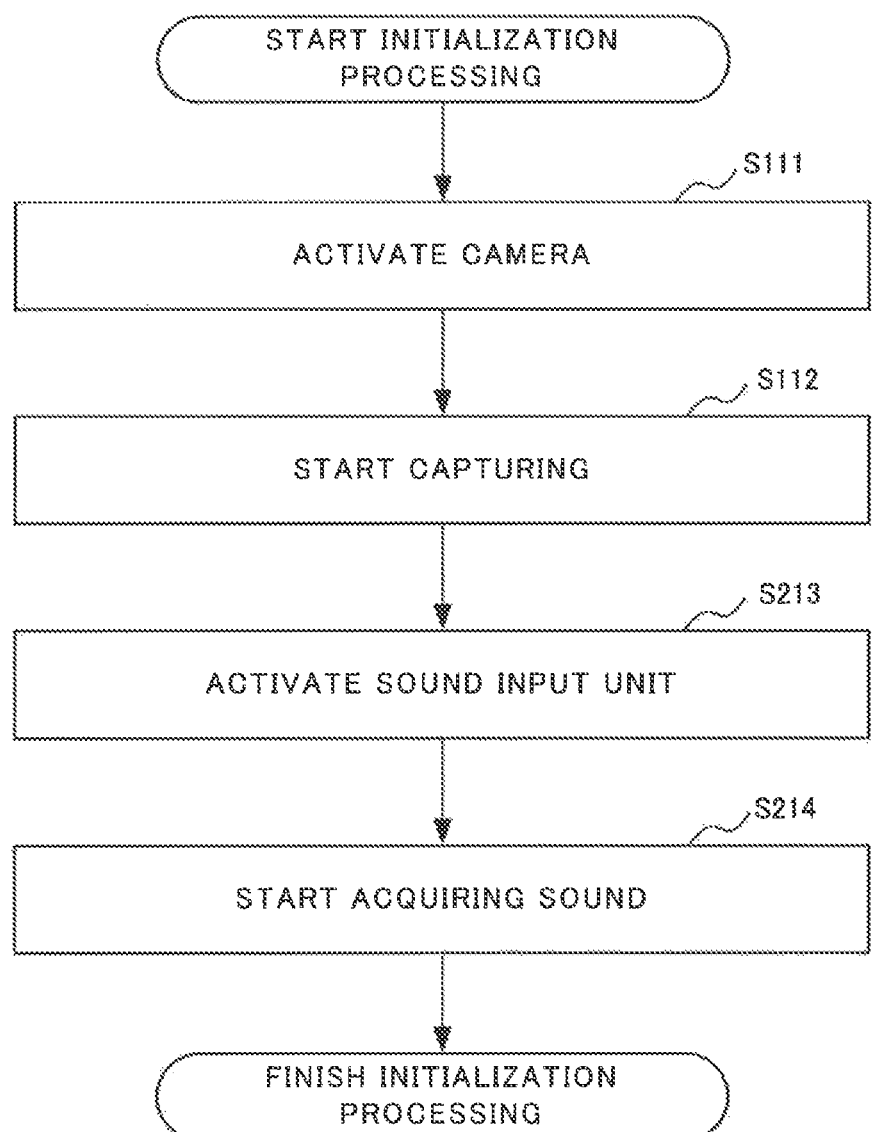
FIG. 11 is a flowchart illustrating an operation example of initialization processing of the image processing apparatus according to the second example embodiment of the present invention.

FIG. 11 is a flowchart illustrating an operation example of initialization processing of the image processing apparatus 101 in the present example embodiment. Operations of Steps S111 and S112 illustrated in FIG. 11 are respectively the same as the operations of Steps S111 and S112 illustrated in FIG. 6.

Step S213:

The image processing apparatus 101 activates the sound input unit 170 in response to power-on of power supply of the image processing apparatus 101 or the sound input unit 170, for example. The image processing apparatus 101 may activate the sound input unit 170 in response to a designation from the receiving device 200, for example. Since a signal line for transmitting a designation in this case is simple, illustration thereof is omitted in FIG. 11. The image processing apparatus 101 may activate the sound input unit 170 in response to power-on of power supply of a microphone used as the sound input unit 170. The image processing apparatus 101 may activate the sound input unit 170 in response to pressing of a sound collection start button, for example.

Step S214:

When the sound input unit 170 is activated, the sound input unit 170 starts acquiring sounds (namely, collecting sounds) by a plurality of microphones. The sound input unit 170 starts transmitting, to the sound receiving unit 175, sound data represented by acquired sounds. The sound receiving unit 175 starts receiving sound data represented by sounds acquired by the sound input unit 170.

Figure 12:
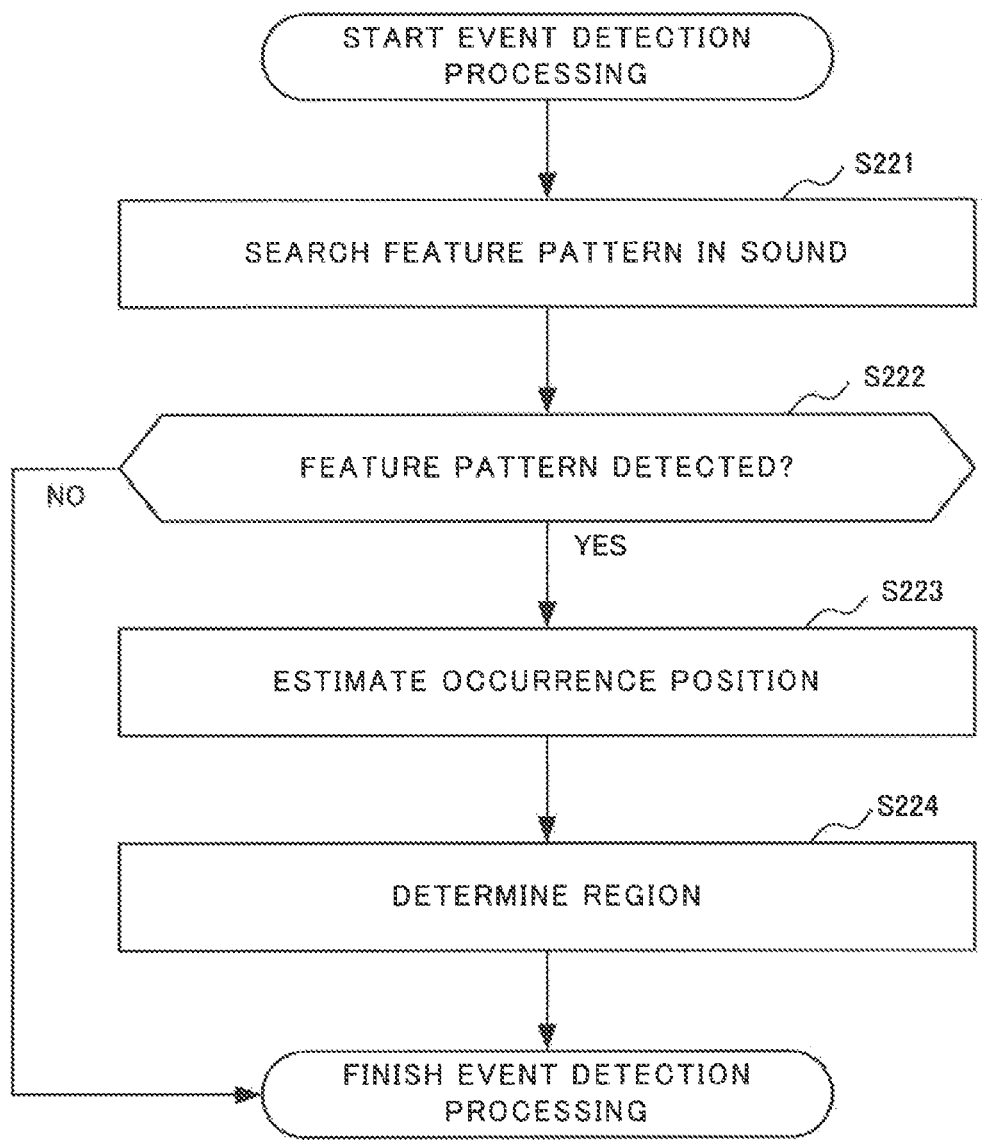
FIG. 12 is a flowchart illustrating an event detection processing estimation operation of the image processing apparatus according to the second example embodiment of the present invention.

FIG. 12 is a flowchart illustrating an event detection processing estimation operation of the image processing apparatus 101 in the present example embodiment.

Step S221:

The position estimation unit 130 searches, as an event, a feature pattern being a specific sound pattern registered in the first storage unit 140, for example, in sound data of sounds collected by using a plurality of microphones by the sound input unit 170, and received by the sound receiving unit 175.

Step S222:

When a specific sound pattern registered in the first storage unit 140 is not detected in sound data received by the sound receiving unit 175 (NO in Step S222), the image processing apparatus 101 finishes the operation illustrated in FIG. 12. When one of registered specific sound patterns is detected in sound data received by the sound receiving unit 175 (YES in Step S222), the image processing apparatus 101 performs the operation of Step S223 next.

Step S223:

The determination unit 131 estimates a direction of a sound source which generates a sound of a detected sound pattern with respect to a direction of the sound input unit 170, for example, from a phase difference in sound recorded as sound data received by the sound receiving unit 175 and input from a plurality of microphones. A direction of a sound source to be finally estimated by the determination unit 131 is a direction of a sound source in a frame of a captured image. The determination unit 131 may further estimate coordinates of a point in an image frame, which is indicated by a direction toward a sound source which generates a sound of a detected sound pattern, based on a relationship between a direction of the camera unit 110 and a direction of the sound input unit 170, for example. A direction of the camera unit 110 may be, for example, a direction from a center of a camera toward a center of an image.

For example, the camera unit 110 may be fixed to the image processing apparatus 101. In this case, a relationship between a direction of the image processing apparatus 101, and a direction of the camera unit 110 may be measured in advance. The sound input unit 170 may be fixed to the image processing apparatus 101. In this case, a relationship between a direction of the image processing apparatus 101, and a direction of the sound input unit 170 may be measured in advance. The camera unit 110 may be mounted on the image processing apparatus 101 in such a way as to control a direction. In this case, the image processing apparatus 101 may be able to specify a relationship between a direction of the camera unit 110 and a direction of the image processing apparatus 101, based on an angle of rotation of a motor for controlling a direction of the camera unit 110, for example. The sound input unit 170 may be mounted on the image processing apparatus 101 in such a way as to control a direction. In this case, the image processing apparatus 101 may be able to specify a relationship between a direction of the sound input unit 170 and a direction of the image processing apparatus 101, based on an angle of rotation of a motor for controlling a direction of the sound input unit 170, for example. For example, the camera unit 110 and the sound input unit 170 may respectively have a function of measuring a direction by a magnetic sensor or the like, for example. The determination unit 131 may acquire a direction of the camera unit 110 via the image receiving unit 115 and the position estimation unit 130, for example. The determination unit 131 may acquire a direction of the sound input unit 170 via the sound receiving unit 175 and the position estimation unit 130, for example. When both of the camera unit 110 and the sound input unit 170 are fixed to the image processing apparatus 101, a relationship between a direction of the camera unit 110, and a direction of the sound input unit 170 may be measured in advance.

Step S224:

Next, the determination unit 131 determines, in an image frame, a region including a point indicated by a direction of a sound source, as a region of interest (namely, an ROI). The determination unit 131 may determine, as an ROI, a region of a predetermined size indicated by a direction of a sound source and including coordinates in an image frame as a center, for example. The determination unit 131 may determine a magnitude of sound of a detected sound pattern. The determination unit 131 may determine, as an ROI, a region of a size depending on a magnitude of sound of a detected sound pattern indicated by a direction of a sound source and including coordinates in an image frame as a center, for example. The determination unit 131 may determine an ROI in such a way that a size of the ROI increases, as a magnitude of sound of a detected sound pattern increases, for example. A method for determining an ROI is not limited to the above-described examples.

The above-described present example embodiment has a same advantageous effect as the first example embodiment. A reason for this is the same as the reason why the advantageous effect of the first example embodiment is provided.

However, an event in the present example embodiment is specifically a disaster, an incident, an accident, or a target object as a sign of these phenomena in which a sound to be detected as a sound pattern is generated, for example. A target object which generates a sound is supposed to be displayed in an ROI including a point indicated by a direction of a sound source of the sound of the specific sound pattern. According to the image processing apparatus 101 in the present example embodiment, it is possible to generate encoded data of an image in which an ROI where a target object estimated as such an event is supposed to be displayed enhances image quality as compared with a region other than the ROI in an image frame, and the bitrate is reduced. Thus, it is possible to suppress a communication bandwidth necessary for transmitting an image, and it is possible to increase the number of images transmittable via the same communication network 300.

(Modification Example)

A position estimation unit 130 in the present example embodiment may further have a same function and perform a same operation as the position estimation unit 130 in the first example embodiment. Specifically, the position estimation unit 130 in the present example embodiment may further detect, as an event, an image pattern in an image captured by a camera unit 110.

Specifically, the position estimation unit 130 in the present modification example may detect, as a feature pattern to be detected as an event, a specific image pattern in image data. The position estimation unit 130 in the present modification example may detect, as a feature pattern to be detected as an event, a specific sound pattern in sound data. The position estimation unit 130 in the present modification example may further detect, as a feature pattern to be detected as an event, a combination of a specific image pattern in image data and a sound pattern in sound data.

The determination unit 131 may determine an ROI based on an event detected in image data, in addition to an ROI based on an event detected in sound data. The determination unit 131 may determine an ROI, based on an occurrence direction in which an event is detected from both of sound data and image data.

The present modification example has an advantageous effect that it is possible to detect various events. A reason for this is that the position estimation unit 130 in the present modification example is able to detect, as a feature pattern of an event, a sound pattern in sound data, an image pattern in image data, and a combination of a sound pattern in sound data and an image pattern in image data.

Therefore, the position estimation unit 130 in the present modification example is able to detect the following various events, for example, by detecting a feature pattern based on various combinations of a sound pattern and an image pattern.

(1) An event in which a specific sound pattern is detected, but a specific image pattern is not detected, (2) an event in which a specific image pattern is detected, but a specific sound pattern is not detected, (3) an event which is detected as a combination of a specific image pattern and a specific sound pattern, but which does not occur when only a specific image pattern is detected, or only a specific sound pattern is detected, and (4) an event which is detected as a specific image pattern, a specific sound pattern, or a combination of a specific image pattern and a specific sound pattern.

Third Example Embodiment

«Configuration»

Next, a third example embodiment of the present invention is described in detail with reference to the drawings.

Figure 13:
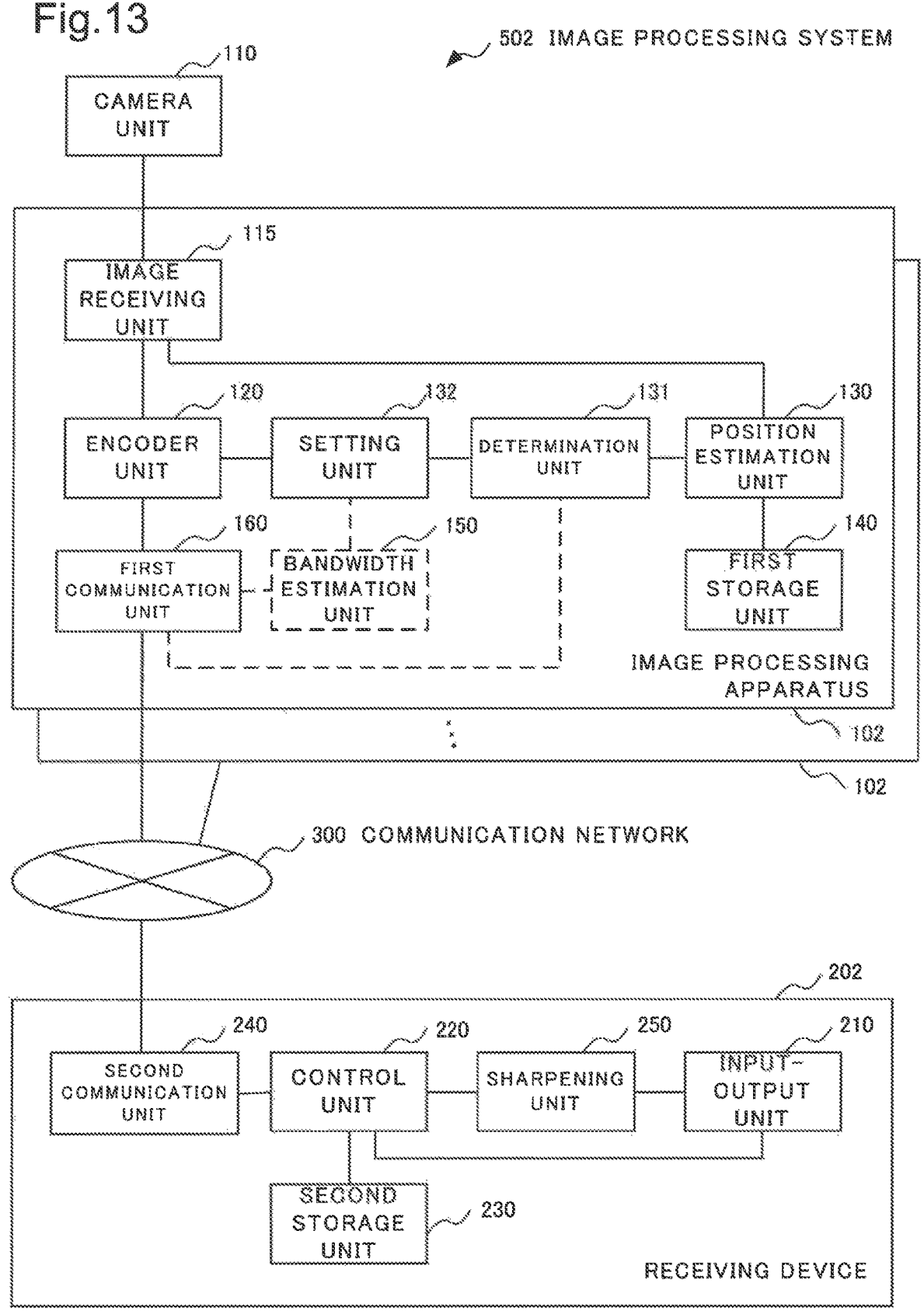
FIG. 13 is a block diagram illustrating a configuration example of an image processing system according to a third example embodiment of the present invention.

FIG. 13 is a block diagram illustrating a configuration example of an image processing system 502 in the present example embodiment. The image processing system 502 in the present example embodiment includes one or more image processing apparatuses 102 and a receiving device 202. Each of the one or more image processing apparatuses 102 is communicably connected to the receiving device 202 via a communication network 300. When comparison is made with respect to the image processing system 500 in the first example embodiment illustrated in FIG. 4, the image processing system 502 in the present example embodiment includes the image processing apparatuses 102 in place of the image processing apparatuses 100, and includes the receiving device 202 in place of the receiving device 200. The image processing system 502 in the present example embodiment is the same as the image processing system 500 in the first example embodiment in the other points.

As illustrated in FIG. 13, when comparison is made with respect to the image processing apparatus 100 in the first example embodiment, the image processing apparatus 102 in the present example embodiment does not need to include a bandwidth estimation unit 150. The image processing apparatus 102 in the present example embodiment is the same as the image processing apparatus 100 in the first example embodiment illustrated in FIG. 5 in the other points. Constituent elements of the image processing apparatus 102 in the present example embodiment perform same operations as the constituent elements having same reference numbers in the image processing apparatus 100 of the first example embodiment, except for the below-described differences.

A determination unit 131 in the present example embodiment transmits information representing a position of a determined ROI to a second communication unit 240 of the receiving device 202 via a setting unit 132, an encoder unit 120, a first communication unit 160, and the communication network 300, for example. The determination unit 131 may transmit position information of an ROI to the second communication unit 240 without via the setting unit 132 and the encoder unit 120, and via the first communication unit 160 and the communication network 300, for example. The determination unit 131 may associate a frame number of a frame in an image in which an ROI is determined, with position information of the ROI, and transmit, to the second communication unit 240 of the receiving device 202, the position information of the ROI associated with the frame number.

The first communication unit 160 transmits, to the second communication unit 240 of the receiving device 202 via the communication network 300, position information of an ROI determined by the determination unit 131, in addition to encoded data encoded by the encoder unit 120.

Further, as illustrated in FIG. 13, the receiving device 202 in the present example embodiment includes a sharpening unit 250, in addition to each constituent element of the receiving device 200 in the first example embodiment illustrated in FIG. 4. The receiving device 202 in the present example embodiment is the same as the receiving device 200 in the first example embodiment in the other points. Constituent elements of the receiving device 202 in the present example embodiment perform same operations as the constituent elements having same reference numbers in the receiving device 200 of the first example embodiment, except for the below-described differences.

The second communication unit 240 in the present example embodiment receives position information of an ROI in addition to encoded data from the first communication unit 160 via the communication network 300. The second communication unit 240 transmits, to a control unit 220, the received encoded data and the position information of the ROI.

The control unit 220 in the present example embodiment receives, from the image processing apparatus 102 via the second communication unit 240, encoded data and position information of an ROI, and transmits, to the control unit 220, the received encoded data and the position information of the ROI. A frame number of a frame in an image may be associated with position information of an ROI.

The control unit 220 receives encoded data and information on an ROI via the communication network 300 and the second communication unit 240. The control unit 220 associates encoded data and position information of an ROI with each other, and stores the encoded data associated with the position information of the ROI in the second storage unit 230. The control unit 220 decodes encoded data of a selected image, and transmits, to the sharpening unit 250, image data generated by decoding and position information of an ROI.

The second storage unit 230 stores encoded data associated with position information of an ROI.

The sharpening unit 250 receives, from the control unit 220, image data generated by decoding, and data on an ROI in a selected image. The sharpening unit 250 performs sharpening processing with respect to a region represented by position information of an ROI in a frame having a frame number associated with the position information of the ROI in received image data. A method for sharpening an image by the sharpening unit 250 is at least one of existing image sharpening methods such as contrast improvement, noise removal, and super-resolution, for example.

«Operation»

Next, an operation of the image processing apparatus 102 in the present example embodiment is described.

Figure 14:
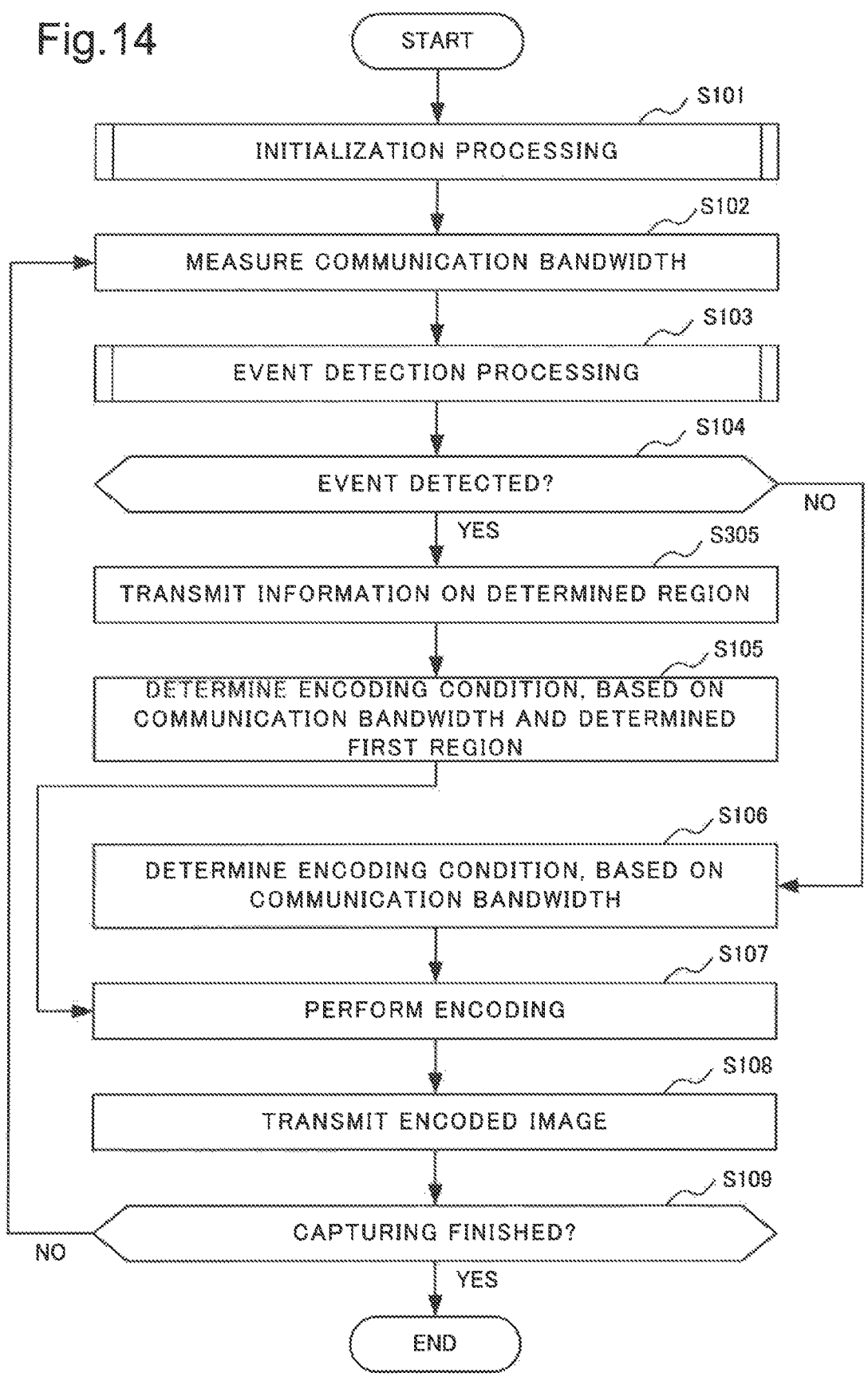
FIG. 14 is a flowchart illustrating an operation example of an image processing apparatus according to the third example embodiment of the present invention.

FIG. 14 is a flowchart illustrating an operation example of the image processing apparatus 102 in the present example embodiment. When comparison is made between FIGS. 14 and 5, an operation of the image processing apparatus 102 in the present example embodiment is the same as the operation of the image processing apparatus 100 in the first example embodiment illustrated in FIG. 5, except for the below-described differences. When an event is detected (YES in Step S104), the determination unit 131 in the present example embodiment performs the operation of Step S105 after performing the operation of Step S305. The image processing apparatus 102 in the present example embodiment performs, in the other steps, same operations as the operations of steps having same reference numbers in the image processing apparatus 100 of the first example embodiment.

Step S305:

The determination unit 131 imparts, to information representing a region position of a determined ROI, an identifier of an image in which the ROI is detected, and a frame number of a frame in which the ROI is detected, for example. Information representing a position of an ROI may be information for specifying a size of the ROI, and a position within a frame of the ROI. The determination unit 131 transmits, to the second communication unit 240 of the receiving device 202, an identifier of an image and information representing a position of an ROI to which a frame number is imparted.

As described above, the bandwidth estimation unit 150 in the present example embodiment does not need to be present. In this case, the image processing apparatus 102 does not need to perform an operation of event detection processing in Step S103. In Step S105, the setting unit 132 may respectively set an encoding condition (e.g., an encoding parameter) in an ROI, and an encoding condition (e.g., an encoding parameter) in a region other than the ROI to predetermined conditions (e.g., encoding parameters). At this occasion, an encoding condition in an ROI and an encoding condition in a region other than the ROI may be the same. Specifically, the setting unit 132 may use a same encoding condition for an entirety of a frame. Further, in Step S106, the setting unit 132 may set an encoding condition for an entirety of a frame to a predetermined condition (e.g., an encoding parameter).

Figure 15:
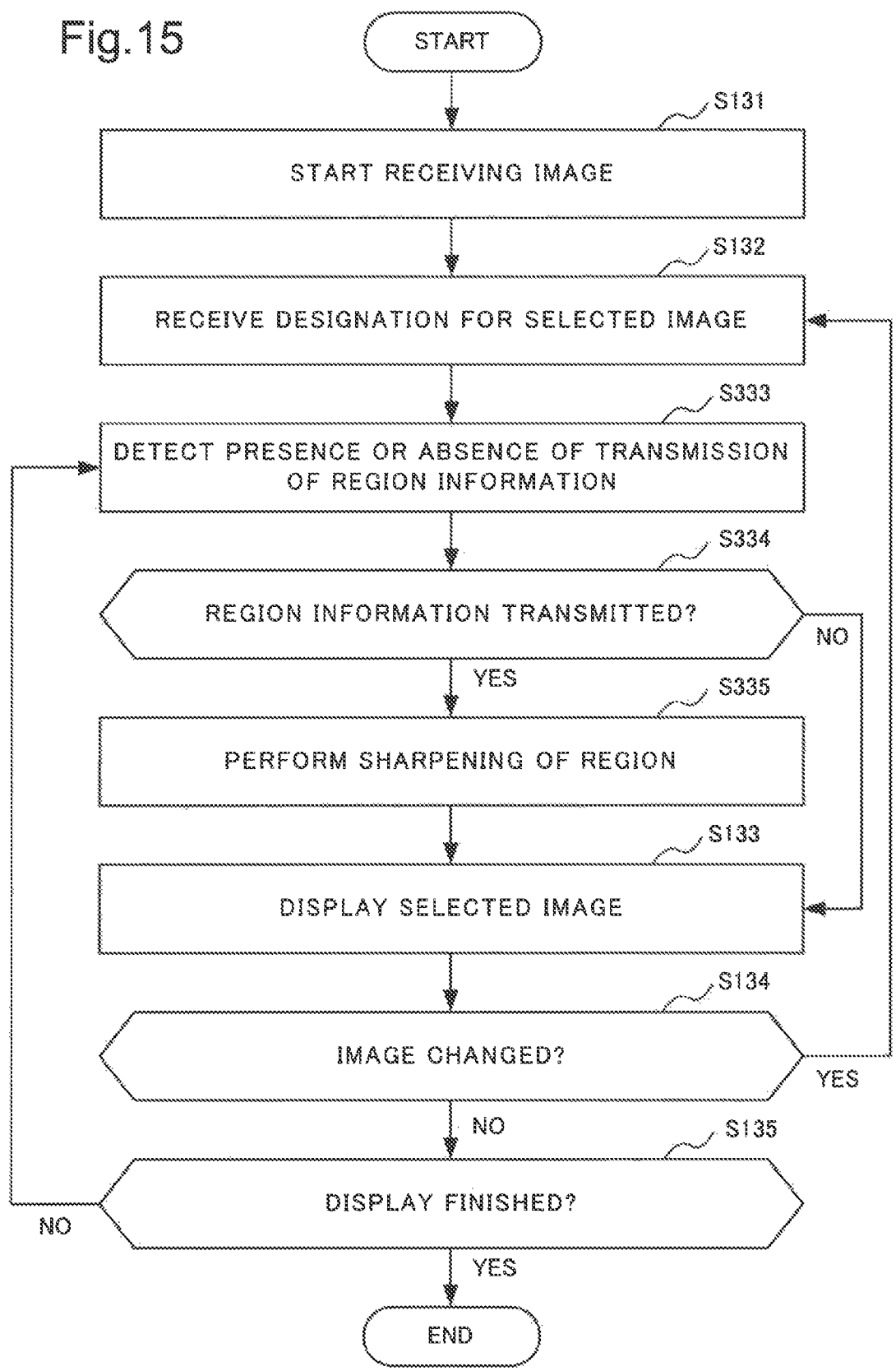
FIG. 15 is a flowchart illustrating an operation of a receiving device according to the third example embodiment of the present invention.

FIG. 15 is a flowchart illustrating an operation of the receiving device 202 in the present example embodiment. The receiving device 202 in the present example embodiment performs, in Steps S131, S132, S133, S134, and S135 illustrated in FIG. 15, same operations as the operations of steps having same reference numbers illustrated in FIG. 8, except for the below-described differences.

Step S131:

The control unit 220 starts receiving an image, specifically, starts receiving encoded data of an image. The control unit 220 in the present example embodiment receives position information of an ROI, in addition to encoded data of an image. The control unit 220 associates received position information of an ROI with encoded data of an image in which the ROI is detected, and stores, in the second storage unit 230, the encoded data associated with the position information of the ROI.

Step S132:

The control unit 220 receives a designation for a selected image similarly to the control unit 220 in the first example embodiment.

Step S333:

The control unit 220 detects presence or absence of transmission of information on a region of interest (specifically, position information of an ROI) in a selected image. The control unit 220 may detect whether or not position information of an ROI is associated with encoded data of a selected image.

Step S334:

When information on a region of interest (specifically, position information of an ROI) is not transmitted (NO in Step S334), the receiving device 202 performs the operation of Step S133 and thereafter. The operation of Step S133 and thereafter of the receiving device 202 in the present example embodiment are the same as the operation of Step S133 and thereafter of the receiving device 200 in the first example embodiment. When information on a region of interest (specifically, position information of an ROI) is transmitted (YES in Step S334), the receiving device 202 performs the operation of Step S335.

Step S335:

The sharpening unit 250 performs processing of sharpening image data acquired by decoding encoded data of a selected image in a region represented by position information of an ROI. After the operation of Step S335, the receiving device 202 performs the operation of Step S133 and thereafter. As described above, the operation of Step S133 and thereafter of the receiving device 202 in the present example embodiment are the same as the operation of Step S133 and thereafter of the receiving device 200 in the first example embodiment.

The above-described present example embodiment has a same advantageous effect as the first example embodiment. A reason for this is the same as the reason why the advantageous effect of the first example embodiment is provided.

The present example embodiment further has an advantageous effect that it is possible to enhance image quality of an ROI. A reason for this is that the determination unit 131 transmits position information of an ROI to the receiving device 202. The sharpening unit 250 of the receiving device 202 performs sharpening of image data to be acquired by decoding encoded data received from the image processing apparatus 102 in a region represented by a position of an ROI.

Further, the image processing apparatus 102 in the present example embodiment may include a sound input unit 170 and a sound receiving unit 175 similarly to the image processing apparatus 101 in the second example embodiment. The image processing system 502 in the present example embodiment may include the image processing apparatus 101 in the second example embodiment, in place of the image processing apparatus 102. A sound input unit 170, a sound receiving unit 175, a position estimation unit 130, and a determination unit 131 may be respectively operated similarly to the sound input unit 170, the sound receiving unit 175, the position estimation unit 130, and the determination unit 131 in the second example embodiment. In this case, the present example embodiment provides a same advantageous effect as the second example embodiment.

Fourth Example Embodiment

«Configuration»

Next, a fourth example embodiment of the present invention is described in detail with reference to the drawings.

Figure 16:
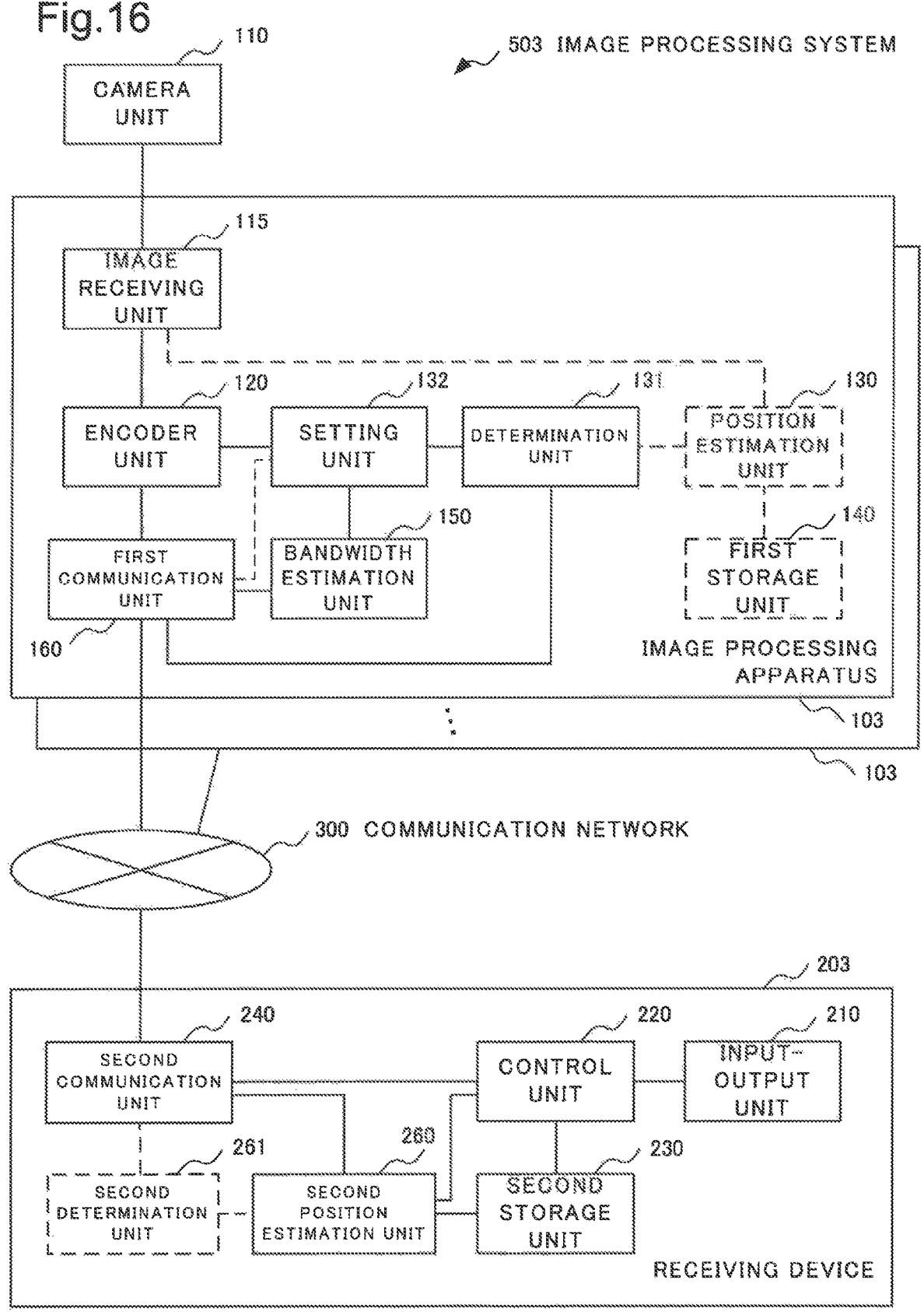
FIG. 16 is a block diagram illustrating a configuration example of an image processing system according to a fourth example embodiment of the present invention.

FIG. 16 is a block diagram illustrating a configuration example of an image processing system 503 in the present example embodiment.

The image processing system 503 in the present example embodiment is the same as the image processing system 500 in the first example embodiment illustrated in FIGS. 1 and 4, except for the below-described points. The image processing system 503 in the present example embodiment includes an image processing apparatus 103 in place of the image processing apparatus 100, and includes a receiving device 203 in place of the receiving device 200.

As illustrated in FIG. 16, the image processing apparatus 103 in the present example embodiment does not need to include a position estimation unit 130 and a first storage unit 140 among the constituent elements of the image processing apparatus 100 in the first example embodiment illustrated in FIGS. 2 and 4. The image processing apparatus 103 in the present example embodiment may include a position estimation unit 130 and a first storage unit 140. In the following description of the present example embodiment, a case where the image processing apparatus 103 does not include a position estimation unit 130 and a first storage unit 140 is mainly described. In description of modification examples of the present example embodiment to be described later, a case where the image processing apparatus 103 includes a position estimation unit 130 and a first storage unit 140 is described. Other constituent elements of the image processing apparatus 103 in the present example embodiment are operated similarly to the constituent elements having same reference numbers in the image processing apparatus 100 of the first example embodiment illustrated in FIGS. 2 and 4, except for the below-described differences.

A determination unit 131 in the present example embodiment receives a phenomenon occurrence position as event information from a receiving device 203 to be described later via a second communication unit 240, a communication network 300, and a first communication unit 160. The determination unit 131 in the present example embodiment determines an ROI (namely, a first region), based on a received phenomenon occurrence position similarly to the determination unit 131 in the first example embodiment.

The first communication unit 160 in the present example embodiment further transmits, to the determination unit 131, a phenomenon occurrence position received from the receiving device 203.

Further, as illustrated in FIG. 16, the receiving device 203 in the present example embodiment includes a second position estimation unit 260, in addition to each constituent element of the receiving device 200 in the first example embodiment. The receiving device 203 in the present example embodiment may further include a second determination unit 261. A case where the receiving device 203 includes the second determination unit 261 is described as a modification example of the present example embodiment. Other constituent elements of the receiving device 203 in the present example embodiment are operated similarly to the constituent elements having same reference numbers in the receiving device 200 of the first example embodiment illustrated in FIGS. 3 and 4, except for the below-described differences.

A control unit 220 in the present example embodiment further transmits, to the second position estimation unit 260, image data acquired by decoding encoded data received from the image processing apparatus 103 via the communication network 300 and the second communication unit 240.

A second storage unit 230 further stores collation data stored in the first storage unit 140 in the first example embodiment.

The second position estimation unit 260 receives image data from the control unit 220, and detects a phenomenon occurrence position in the received image by using collation data stored in the second storage unit, for example, similarly to the position estimation unit 130 in the first example embodiment. The second position estimation unit 260 transmits, to the image processing apparatus 103 which transmits encoded data from which received image data are generated, a phenomenon occurrence position (specifically, information representing a phenomenon occurrence position) via the second communication unit 240 and the communication network 300

«Operation»

Next, an operation of the image processing apparatus 103 in the present example embodiment is described.

Figure 17:
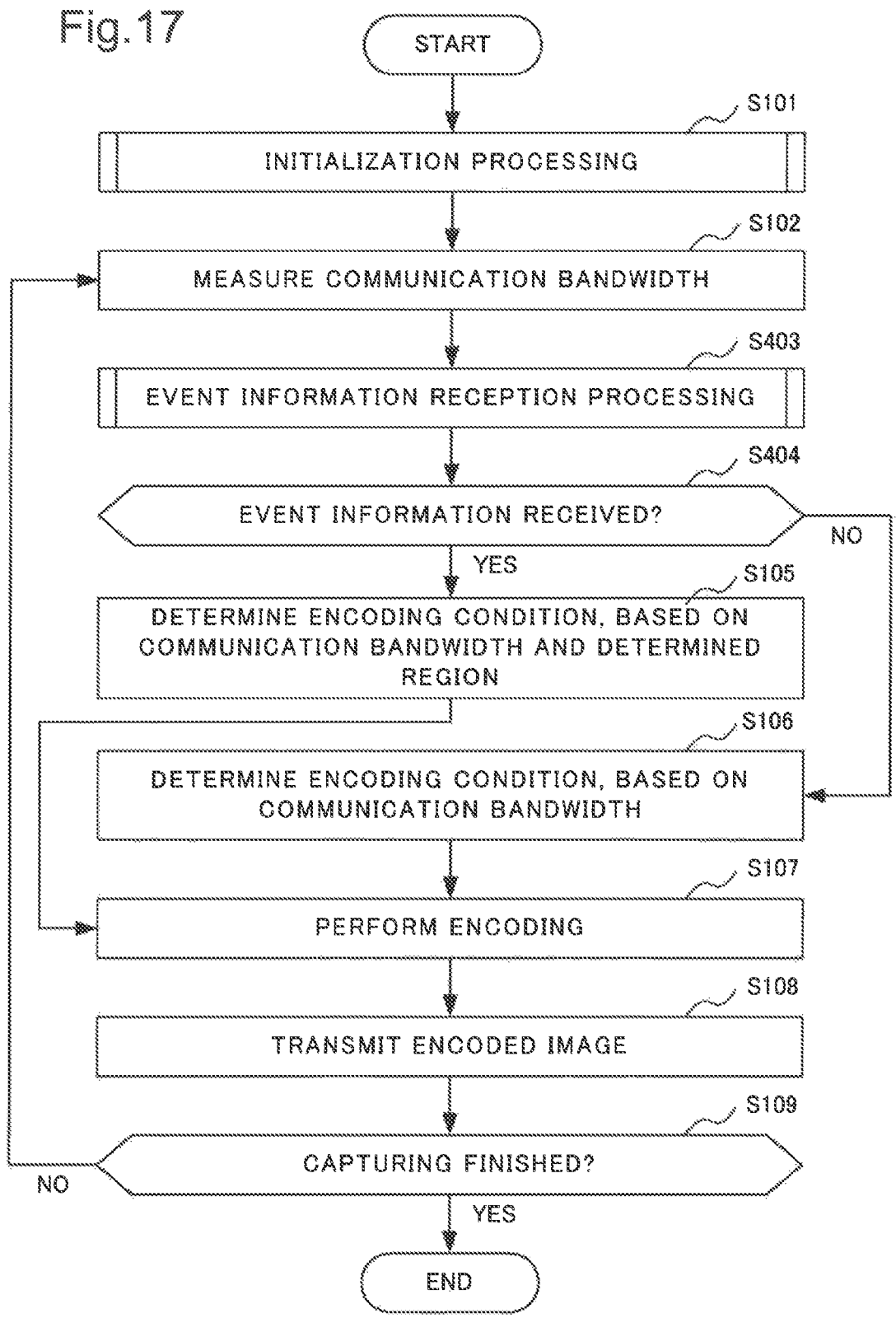
FIG. 17 is a flowchart illustrating an operation example of an image processing apparatus according to the fourth example embodiment of the present invention.

FIG. 17 is a flowchart illustrating an operation example of the image processing apparatus 103 in the present example embodiment. An operation of the image processing apparatus 103 according to the present example embodiment is the same as the operation of the image processing apparatus 100 in the first example embodiment of the present invention illustrated in FIG. 5, except for the below-described differences. Operations of the image processing apparatus 103 include the operations of Steps S403 and S404, in place of Steps S103 and S104. The image processing apparatus 103 in the present example embodiment performs, in steps other than Steps S403 and S404, same operations as the operations of steps having same reference numbers.

Step S403:

The determination unit 131 performs event information reception processing. In the event information reception processing, when event information is transmitted from the receiving device 203, the determination unit 131 receives the event information from the receiving device 203 via the communication network 300 and the first communication unit 160. Event information in the present example embodiment is information on a phenomenon occurrence position estimated by the second position estimation unit 260 of the receiving device 203. The determination unit 131 determines an ROI (namely, a first region), based on received information on a phenomenon occurrence position. When event information is not transmitted from the receiving device 203, the determination unit 131 does not determine a first region. Event information reception processing will be described later in detail. In Step S403, when receiving event information, the determination unit 131 may be regarded as determining that an event is detected.

Step S404:

When the determination unit 131 receives event information (YES in Step S404), specifically, when the determination unit 131 receives information on a phenomenon occurrence position from the receiving device 203, a setting unit 132 performs the operation of Step S105 next. When the determination unit 131 does not receive event information (NO in Step S404), specifically, when the determination unit 131 does not receive information on a phenomenon occurrence position, the setting unit 132 performs the operation of Step S106 next.

Figure 18:
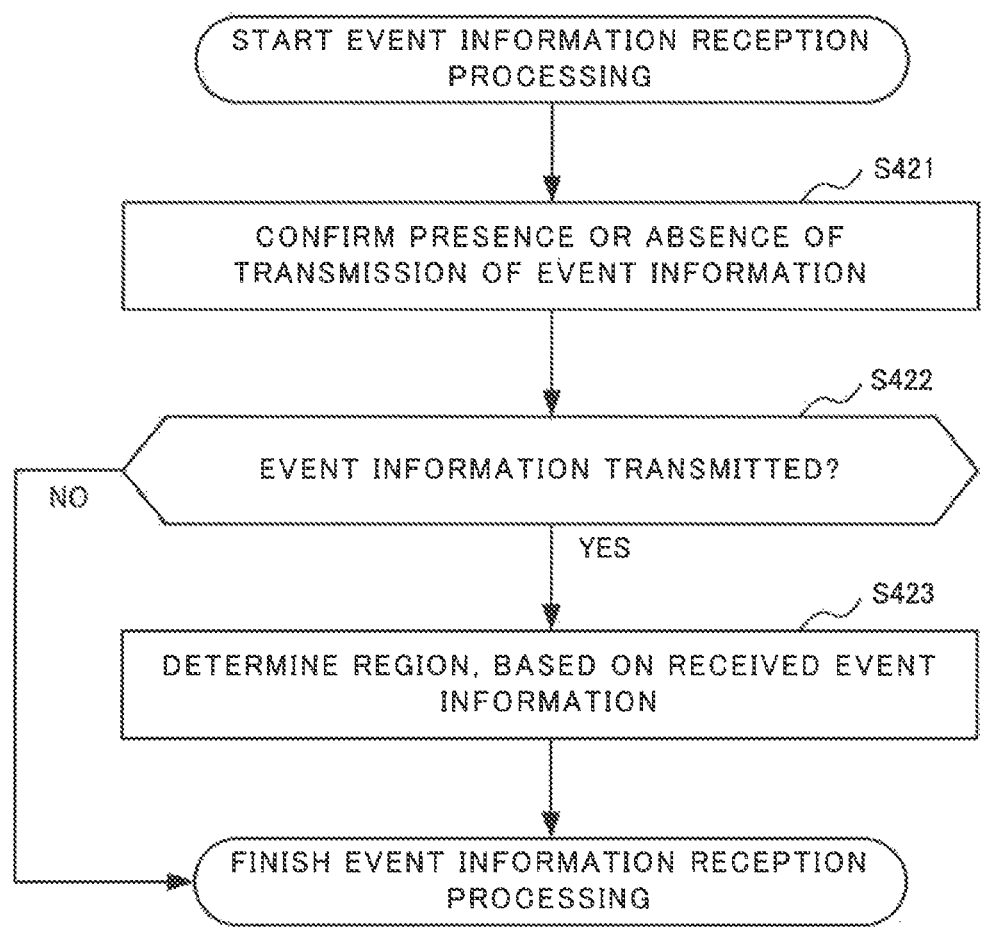
FIG. 18 is a flowchart illustrating an operation example in event information reception processing of the image processing apparatus according to the fourth example embodiment of the present invention.

FIG. 18 is a flowchart illustrating an operation example in event information reception processing of the image processing apparatus 103 in the present example embodiment. The image processing apparatus 103 in the present example embodiment receives event information to be transmitted from the receiving device 203, independently of the operations illustrated in FIGS. 17 and 18.

Step S421:

The determination unit 131 confirms presence or absence of transmission of event information from the receiving device 203. The determination unit 131 may confirm whether or not event information (e.g., information on a phenomenon occurrence position) is received from the receiving device 203.

Step S422:

When transmission of event information is not present, for example, when information on a phenomenon occurrence position is not received from the receiving device 203 (NO in Step S422), the image processing apparatus 103 finishes the operation illustrated in FIG. 18. When transmission of event information is present, for example, when position information of an ROI is received (YES in Step S422), the image processing apparatus 103 performs the operation of Step S423 next.

Step S423:

The determination unit 131 determines an ROI (namely, the above-described first region), based on received event information (e.g., information on a phenomenon occurrence position). Then, the image processing apparatus 103 finishes the operation illustrated in FIG. 18.

Figure 19:
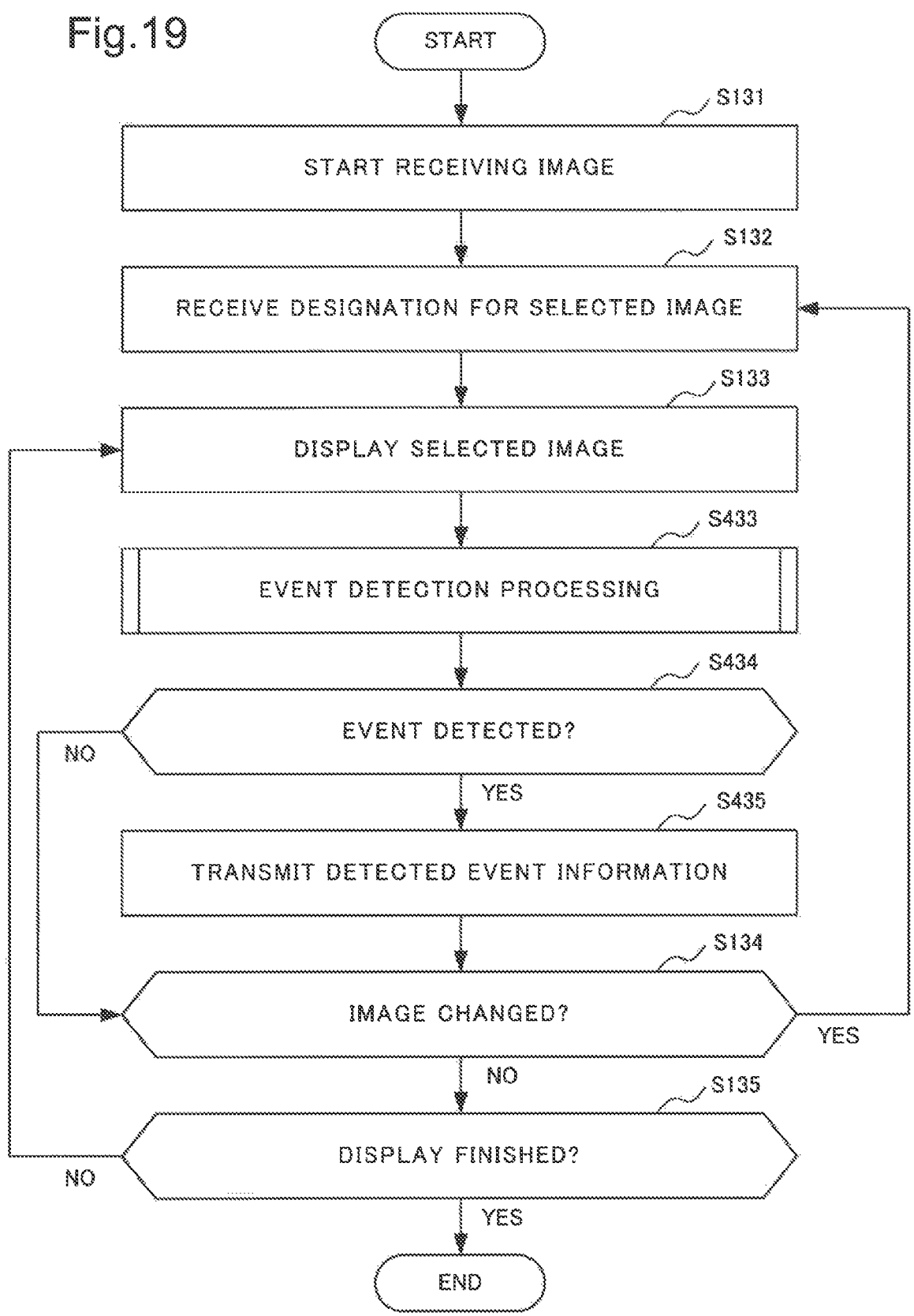
FIG. 19 is a flowchart illustrating an operation example of a receiving device according to the fourth example embodiment of the present invention.

FIG. 19 is a flowchart illustrating an operation example of the receiving device 203 in the present example embodiment. Operations of Steps S131, S132, S133, S134, and S135 of the receiving device 203 in the present example embodiment illustrated in FIG. 19 are respectively the same as the operations of steps having same reference numbers in the receiving device 200 of the first example embodiment of the present invention illustrated in FIG. 6, except for the below-described differences.

The receiving device 203 in the present example embodiment performs, in Steps S131 and S132, same operations as the operations of Steps S131 and S132 of the receiving device 200 in the first example embodiment. In Step S133, the receiving device 203 in the present example embodiment performs the same operation as the operation of Step S133 of the receiving device 200 in the first example embodiment, except for the below-described differences.

Step S133:

The control unit 220 in the present example embodiment decodes encoded data received from the image processing apparatus 103 via the communication network 300 and the second communication unit 240, and transmits, to the second position estimation unit 260, image data generated by decoding encoded data. When receiving encoded data from a plurality of image processing apparatuses 103, the control unit 220 may transmit, to the second position estimation unit 260, generated image data, for each of the image processing apparatuses 103 which transmits encoded data. In this case, the receiving device 203 may perform the operations from Steps S433 to S435, for each piece of image data generated from encoded data transmitted from the plurality of image processing apparatuses 103.

The control unit 220 in the present example embodiment does not need to transmit, to the second position estimation unit 260, all pieces of image data generated from encoded data transmitted from the plurality of image processing apparatuses 103. The control unit 220 in the present example embodiment may further transmit, to the second position estimation unit 260, image data generated by decoding encoded data of a selected image, for example. In this case, the receiving device 203 may perform the operations from Steps S433 to S435 for received image data.

The control unit 220 transmits, to the second position estimation unit 260, information for specifying an image processing apparatus 103 which transmits encoded data from which image data are generated, in addition to the image data. Information for specifying an image processing apparatus 103 is, for example, an IP address, another identifier or the like.

Step S433:

In Step S433, the receiving device 203 in the present example embodiment performs an operation similar to event detection processing by the image processing apparatus 100 in the first example embodiment illustrated in FIG. 7, except for the operation of Step S124. However, in the present example embodiment, the second position estimation unit 260 is operated similarly to the operation of event detection processing by the position estimation unit 130 of the image processing apparatus 100 in the first example embodiment with respect to image data received from the control unit 220. Specifically, the second position estimation unit 260 confirms presence or absence of a feature pattern by a method similar to the method for confirming presence or absence of a feature pattern by the position estimation unit 130 in the first example embodiment. When a feature pattern is detected, the second position estimation unit 260 estimates a phenomenon occurrence position, based on the detected feature pattern by a method similar to the method for estimating a phenomenon occurrence position by the position estimation unit 130 in the first example embodiment.

The receiving device 203 may perform the operation of Step S433 for all pieces of image data received from the control unit 220.

Step S434:

When an event is detected from one piece of received image data (YES in Step S434), the receiving device 203 performs the operation of Step S435 next. When an event is not detected from all pieces of received image data (NO in Step S434), the receiving device 203 performs the operation of Step S134 next.

Step S435:

The second determination unit 261 of the receiving device 203 transmits, to an image processing apparatus 103 which transmits encoded data from which image data in which an event is detected are generated, position information of an ROI determined in an image indicated by the image data. The second determination unit 261 of the receiving device 203 does not need to transmit, to the image processing apparatus 103 which transmits encoded data from which image data in which an event is detected are not generated, position information of an ROI. The receiving device 203 performs the operation of Step S134 next.

In Step S134, the receiving device 203 in the present example embodiment performs the same operation as the operation of Step S134 of the receiving device 200 in the first example embodiment. Likewise, in Step S135, the receiving device 203 in the present example embodiment performs the same operation as the operation of Step S135 of the receiving device 200 in the first example embodiment.

Figure 20:
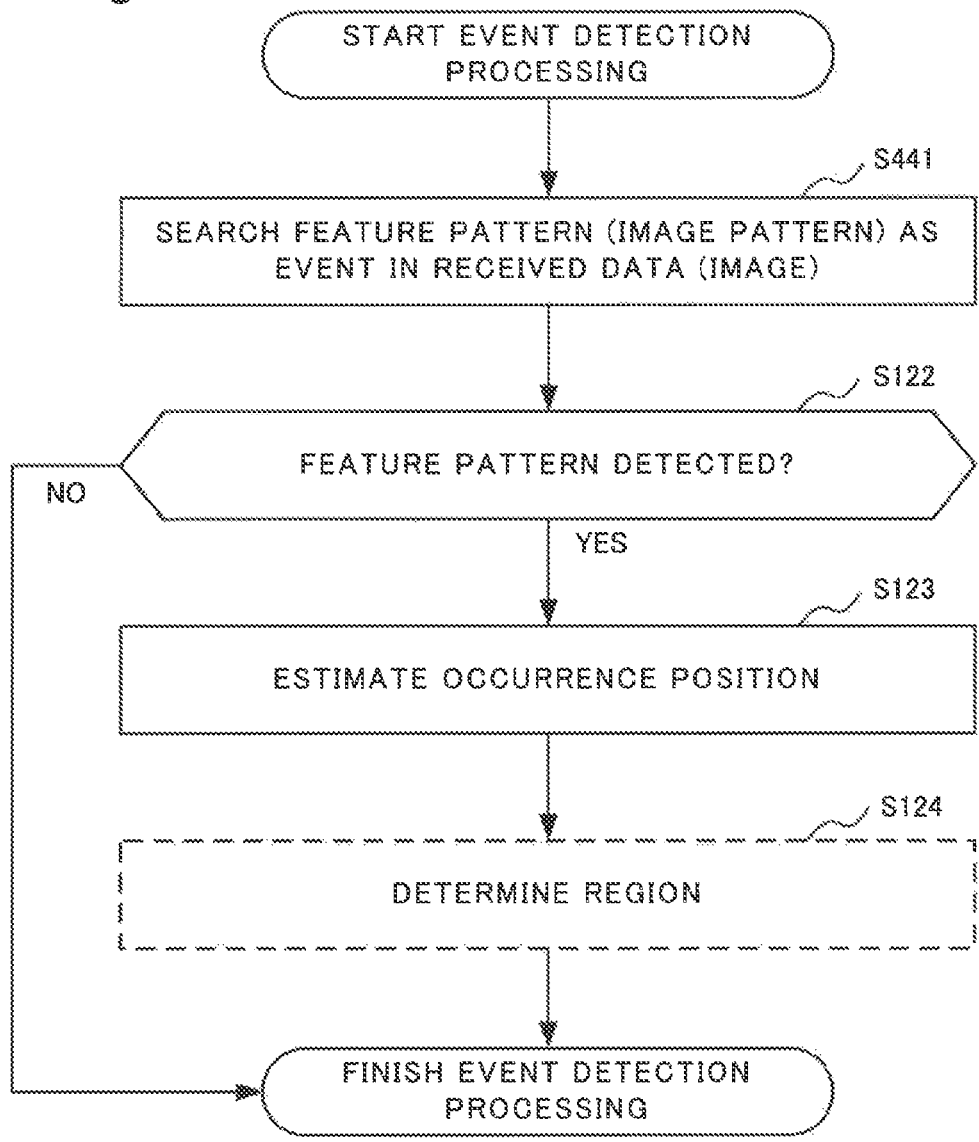
FIG. 20 is a flowchart illustrating an operation example of event detection processing of the receiving device according to the fourth example embodiment of the present invention.

FIG. 20 is a flowchart illustrating an operation example of event detection processing of the receiving device 203 in the present example embodiment.

The operation illustrated in FIG. 20 is different from the operation of the image processing apparatus 100 according to the first example embodiment illustrated in FIG. 7 in terms of data being a processing target, and a subject which performs an operation. Further, the receiving device 20 in the present example embodiment does not need to perform the operation of Step S124 illustrated in FIG. 20. The operation of Step S124 illustrated in FIG. 20 will be described later in description of a first modification example of the present example embodiment.

Step S441:

The second position estimation unit 260 searches an image pattern, as a feature pattern to be detected as an event, in image data received from the control unit 220. A method for searching an image pattern in Step S441 by the second position estimation unit 260 is the same as the method for searching an image pattern in the operation of Step S121 by the position estimation unit 130 of the image processing apparatus 100 in the first example embodiment illustrated in FIG. 7.

Step S122:

When a feature pattern is not detected (NO in Step S122), the receiving device 203 finishes the operation illustrated in FIG. 20. When a feature pattern is detected (YES in Step S122), the receiving device 203 performs the operation of Step S123 next.

Step S123:

The second position estimation unit 260 estimates a phenomenon occurrence direction, based on a position of a frame in an image in which a feature pattern is detected. A method for estimating a phenomenon occurrence method in Step S123 by the second position estimation unit 260 is the same as the method for estimating an event occurrence direction in Step S123 by the position estimation unit 130 of the image processing apparatus 100 in the first example embodiment. Then, the receiving device 203 finishes the operation illustrated in FIG. 20.

The above-described present example embodiment has an advantageous effect that, even when processing ability of the image processing apparatus 103 is low, it is possible to reduce a network bandwidth necessary for transmitting an image, while suppressing lowering of image quality of a region of interest in the image where an occurrence place is not determined in advance. A reason for this is that the second position estimation unit 260 of the receiving device 203 estimates a phenomenon occurrence position in image data generated from encoded data transmitted from the image processing apparatus 103. The receiving device 203 transmits, to the image processing apparatus 103, information on an estimated phenomenon occurrence position. The determination unit 131 of the image processing apparatus 103 determines a position of an ROI, based on a phenomenon occurrence position. The setting unit 132 determines a first condition in which an ROI is encoded, and a second condition in which a region other than the ROI is encoded in such a way that image quality in a determined ROI is enhanced as compared with image quality of a region in an image frame other than the ROI. Although it is possible to perform encoding of a captured image at a high speed by a loaded dedicated circuit depending on an image processing apparatus 103, ability of performing other processing such as image processing may be low. In this case, the image processing apparatus 103 may not estimate a phenomenon occurrence position due to insufficiency of processing ability. Even in this case, since the second position estimation unit 260 of the receiving device 203 performs estimation of a phenomenon occurrence position accompanying image processing in the present example embodiment, the image processing apparatus 103 is able to acquire a phenomenon occurrence position.

In the present example embodiment, collation data for use in estimation of a phenomenon occurrence position are not stored in the image processing apparatus 103, but are stored in the receiving device 203. Therefore, in the present example embodiment, for example, even when collation data are information of which registration is desired to be avoided in an image processing apparatus 103 to be installed on-site, such as confidential information in a police department, it is possible to determine an ROI by using such collation data.

Next, modification examples of the present example embodiment are described.

First Modification Examples

An image processing system 503 in a first modification example of the present example embodiment is different from the image processing system 503 in the present example embodiment in the below-described points.

An image processing apparatus 103 according to the first modification example of the present example embodiment does not need to include a determination unit 131. In this case, a first communication unit 160 and a setting unit 132 may be communicably connected. Further, a receiving device 203 may include a second determination unit 261.

The second determination unit 261 determines an ROI, based on a phenomenon occurrence position estimated by a second position estimation unit 260 similarly to the determination unit 131 in the present example embodiment (Step S124 illustrated in FIG. 20). The second determination unit 261 transmits, to the image processing apparatus 103, information representing a position of an ROI (specifically, information for specifying a region of an ROI) via a second communication unit 240 and a communication network 300.

A setting unit 132 in the first modification example receives, from the receiving device 203 via the communication network 300 and the first communication unit 160, information representing a position of an ROI.

The image processing system 503 in the first modification example of the present example embodiment is the same as the image processing system 503 in the present example embodiment, except for the above-described differences.

The present modification example has an advantageous effect that it is possible to further reduce a load of the image processing apparatus 103.

Second Modification Example

An image processing system 503 in a second modification example of the present example embodiment is different from the image processing system 503 in the present example embodiment in the below-described points.

An image processing apparatus 103 in the present modification example includes a position estimation unit 130 and a first storage unit 140. The first storage unit 140 in the present modification example may be the same as the first storage unit 140 in the first example embodiment.

The position estimation unit 130 in the present modification example receives, from a determination unit 131, information on a phenomenon occurrence position estimated by a second position estimation unit 260, for example. The position estimation unit 130 receives, from an image receiving unit 115, image data of an image captured by a camera unit 110, and performs tracking of a phenomenon of which information on an occurrence position is received in the received image data.

Specifically, for example, the position estimation unit 130 estimates a phenomenon occurrence position, and determines whether a phenomenon whose occurrence position is estimated is the same as a phenomenon whose occurrence position is estimated by the second position estimation unit 260. The position estimation unit 130 transmits, to the determination unit 131, an occurrence position of a phenomenon determined to be identical to a phenomenon whose occurrence position is estimated by the second position estimation unit 260, among estimated phenomenon occurrence positions.

More specifically, a phenomenon occurrence position may represent a region of a person whose detected face is determined to be identical to a registered face, for example. The position estimation unit 130 may detect a face of a person in an image received from the image receiving unit 115, and detect a region of the person whose face is detected, for example. The position estimation unit 130 may calculate a ratio of overlapping between a region of a detected person, and a region represented by a phenomenon occurrence position. Further, the position estimation unit 130 may estimate a region of a person whose overlapping ratio is largest, among regions of the person whose calculated ratios are larger than a predetermined value, as an occurrence position of a same phenomenon as a phenomenon of which information on the occurrence position is received. In this case, the first storage unit 140 may store information representing an image pattern to be detected (e.g., a feature included in a region to be detected as a face region). The first storage unit 140 does not need to store collation data of faces.

The determination unit 131 in the present modification example receives, from a receiving device 203, a phenomenon occurrence position via the communication network 300 and the first communication unit 160. The determination unit 131 transmits, to the position estimation unit 130, a phenomenon occurrence position received from the receiving device 203. The determination unit 131 in the present modification example further receives a phenomenon occurrence position from the position estimation unit 130. The determination unit 131 determines an ROI, based on the received phenomenon occurrence position.

The image processing system 503 in the second modification example of the present example embodiment is the same as the image processing system 503 in the present example embodiment, except for the above-described differences.

The above-described present modification example has an advantageous effect that, even when collation data are information of which registration is desired to be avoided in the image processing apparatus 103 to be installed on-site, it is possible to determine an ROI, while reducing a load of the receiving device 203 by using such collation data.

Third Modification Example

Further, in the present modification example, a second position estimation unit 260 may be included not in a receiving device 203 but in an information processing device different from the receiving device 203. The information processing device may be communicably connected to the receiving device 203 to which a local area network (LAN) is connected. In this case, a control unit 220 may transmit, to the information processing device, image data acquired by decoding encoded data received from the image processing apparatus 103, and an identifier of the image processing apparatus 103. The second position estimation unit 260 of the information processing device may estimate a phenomenon occurrence position in received image data, and transmit the estimated phenomenon occurrence position to the image processing apparatus 103.

Fifth Example Embodiment

«Configuration»

Next, a fifth example embodiment of the present invention is described in detail with reference to the drawings.

Figure 21:
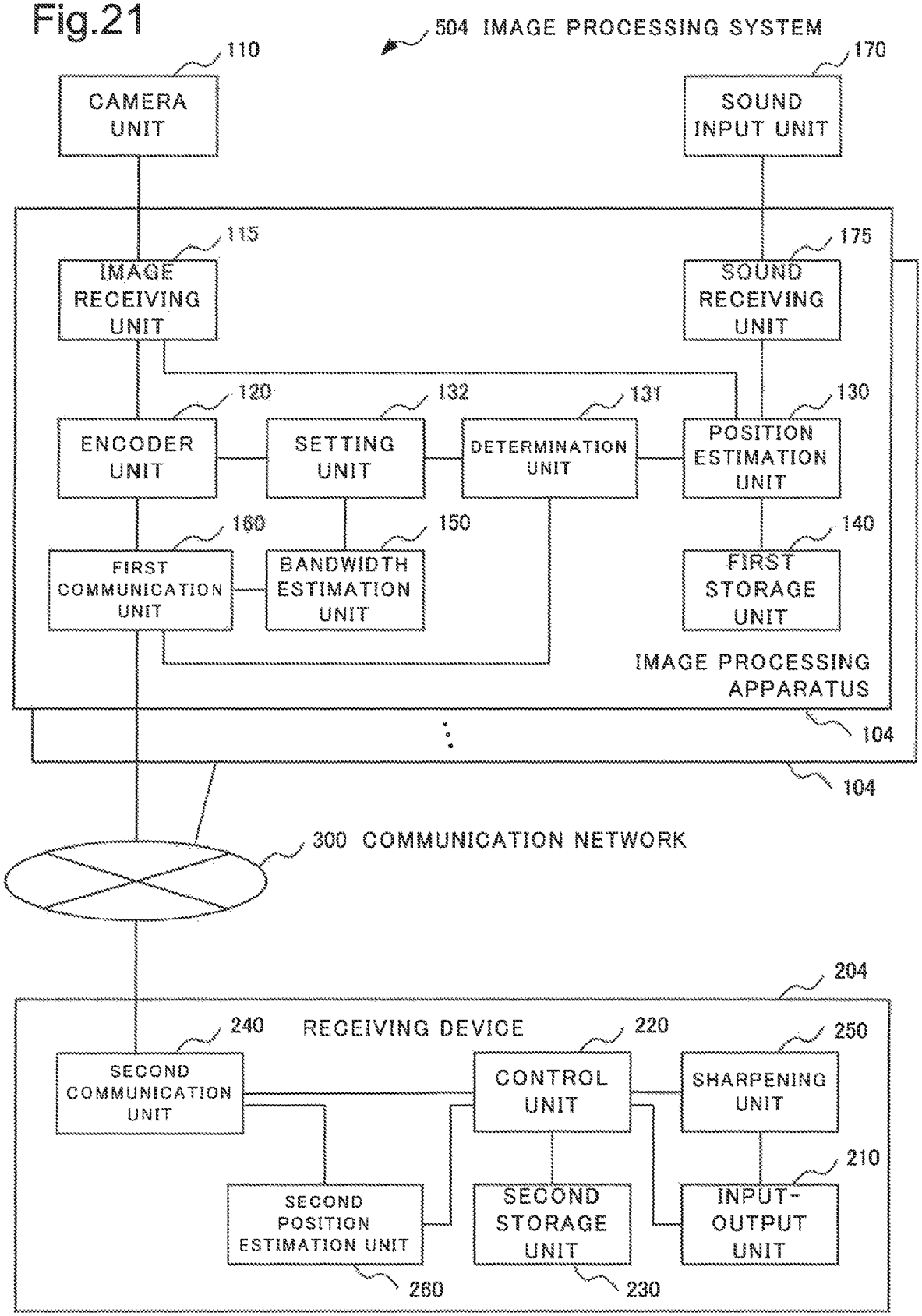
FIG. 21 is a block diagram illustrating a configuration example of an image processing system according to a fifth example embodiment of the present invention.

FIG. 21 is a block diagram illustrating a configuration example of an image processing system 504 in the present example embodiment.

Referring to FIG. 21, the image processing system 504 in the present example embodiment includes one or more image processing apparatuses 104 and a receiving device 204. Each of the one or more image processing apparatuses 104 is communicably connected to the receiving device 204 via a communication network 300.

The image processing apparatus 104 in the present example embodiment includes a sound input unit 170 and a sound receiving unit 175 in addition to each constituent element of the image processing apparatus 100 in the first example embodiment. Constituent elements other than the sound input unit 170 and the sound receiving unit 175 of the image processing apparatus 104 are operated similarly to the constituent elements having same reference numbers in the image processing apparatus 100 of the first example embodiment, except for the below-described differences. The sound input unit 170 and the sound receiving unit 175 in the present example embodiment are respectively operated similarly to the sound input unit 170 and the sound receiving unit 175 in the second example embodiment.

A position estimation unit 130 in the present example embodiment estimates a phenomenon occurrence position, based on sound data received from the sound receiving unit 175, similarly to the position estimation unit in the second example embodiment.

A determination unit 131 in the present example embodiment receives, from the position estimation unit 130, information on a phenomenon occurrence position. The determination unit 131 further receives, from the receiving device 204, information on a phenomenon occurrence position via the communication network 300 and a first communication unit. The determination unit 131 determines an ROI, based on each of occurrence position at which information is received. The determination unit 131 in the present example embodiment transmits, to the receiving device 204, information representing a position of a determined ROI via the first communication unit 160 and the communication network 300, similarly to the determination unit in the third example embodiment.

The receiving device 204 in the present example embodiment includes a sharpening unit 250 and a second position estimation unit 260, in addition to each constituent element of the receiving device 200 in the first example embodiment. The sharpening unit 250 is the same as the sharpening unit 250 in the third example embodiment. The second position estimation unit 260 is the same as the second position estimation unit 260 in the fourth example embodiment. A control unit 220 performs the same operation as the operation of the control unit 220 in the fourth example embodiment, in addition to the same operation as the operation of the control unit 220 in the third example embodiment.

«Operation»

Next, an operation of the image processing apparatus 104 in the present example embodiment is described in detail with reference to the drawings.

Figure 22:
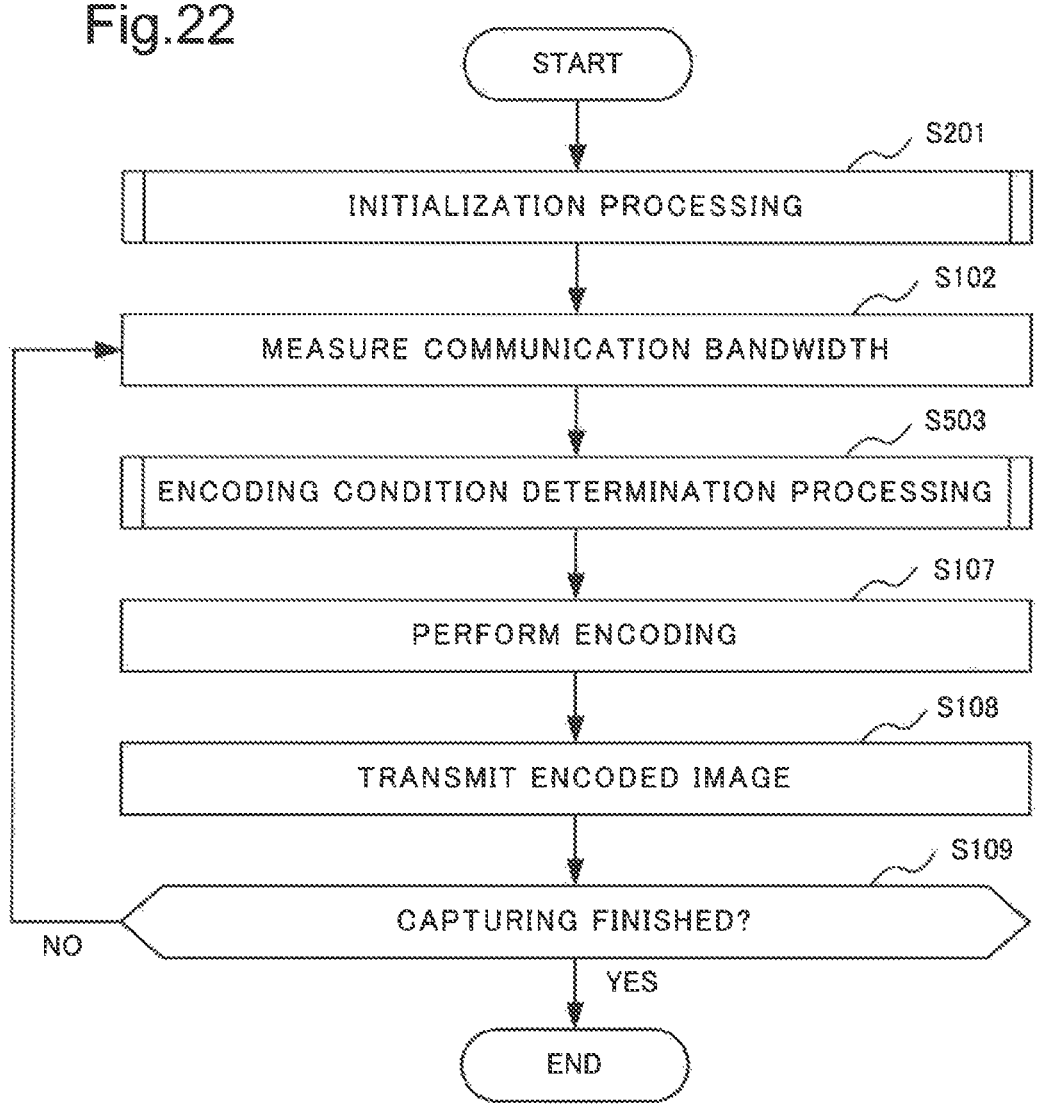
FIG. 22 is a flowchart illustrating an operation example of an image processing apparatus according to the fifth example embodiment of the present invention.

FIG. 22 is a flowchart illustrating an operation example of the image processing apparatus 104 in the present example embodiment. The operation of Step S201 in the image processing apparatus 104 illustrated in FIG. 22 is the same as the operation of Step S201 in FIG. 10, namely, the operation illustrated in FIG. 11. In Step S201, the image processing apparatus 104 performs the operation illustrated in FIG. 11. The operation of Step S102 in the image processing apparatus 104 of the present example embodiment is the same as the operation of Step S102 in the image processing apparatus 100 of the first example embodiment illustrated in FIG. 5. In Step S102, the image processing apparatus 104 performs the same operation as the operation of Step S102 in the image processing apparatus 100 of the first example embodiment illustrated in FIG. 5.

Step S503:

The image processing apparatus 104 performs encoding condition determination processing. The image processing apparatus 104 determines a condition (namely, a first condition) in which an ROI is encoded, and a condition (second condition) in which a first region is encoded in such a way that image quality of the ROI (first region) is enhanced as compared with image quality of a region (namely, a second region) other than the ROI in an image frame. Encoding condition determination processing will be described later in detail.

The operations of Steps S107, S108, and S109 are the same as the operations of steps having same reference numbers in the image processing apparatus 100 of the first example embodiment illustrated in FIG. 5. In Steps S107, S108, and S109, the image processing apparatus 104 performs the same operations as the operations of steps having same reference numbers in the image processing apparatus 100 of the first example embodiment illustrated in FIG. 5.

Figure 23:
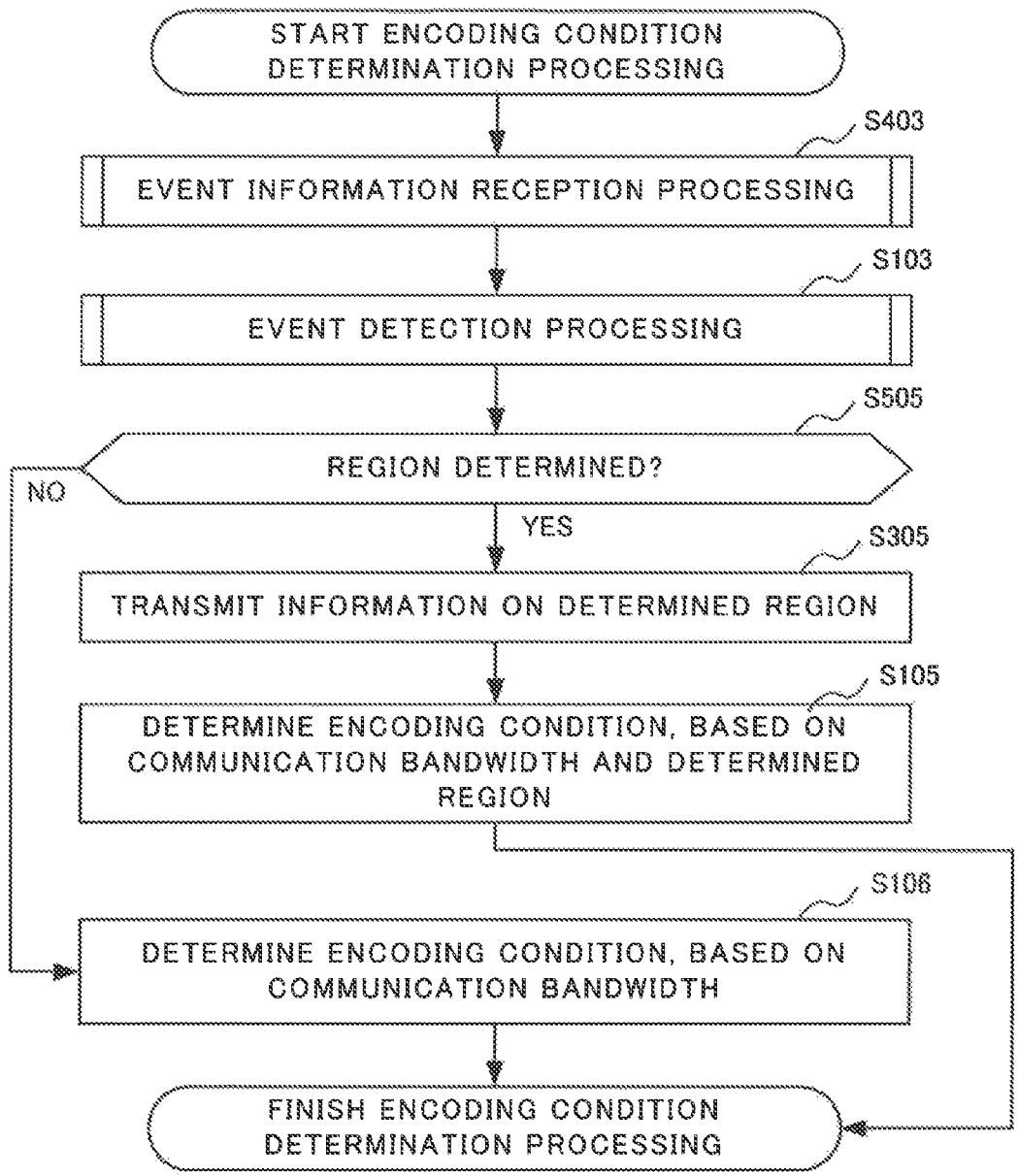
FIG. 23 is a flowchart illustrating an operation example of encoding condition determination processing of the image processing apparatus according to the fifth example embodiment of the present invention.

FIG. 23 is a flowchart illustrating an operation example of encoding condition determination processing of the image processing apparatus 104 in the present example embodiment. The determination unit 131 of the image processing apparatus 104 in the present example embodiment receives, from the receiving device 204, event information (specifically, information on a phenomenon occurrence position), which is estimated by the second position estimation unit 260 of the receiving device 204, independently of the operations illustrated in FIGS. 22 and 23. When the second position estimation unit 260 of the receiving device 204 does not estimate a phenomenon occurrence position, the determination unit 131 does not receive event information from the receiving device 204.

The operation of Step S403 illustrated in FIG. 23 is the same as the operation of Step S403 illustrated in FIG. 17, namely, the operation illustrated in FIG. 18. In Step S403, the image processing apparatus 104 performs the operation illustrated in FIG. 18. Likewise, the operation of Step S103 of the image processing apparatus 104 is the same as the operation of a step having a same reference number in the image processing apparatus 100 of the first example embodiment illustrated in FIG. 5.

Step S505:

In Step S403, when receiving event information (specifically, information on a phenomenon occurrence position) estimated by the second position estimation unit 260 of the receiving device 204, the determination unit 131 determines an ROI (namely, the above-described first region). Further, also when an event is detected in Step S103, the determination unit 131 determines an ROI. When an ROI is determined (YES in Step S505), the image processing apparatus 104 performs the operations of Steps S305 and S105 next. When an ROI is not determined (NO in Step S505), the image processing apparatus 104 performs the operation of Step S106 next.

The operation of Step S305 in the image processing apparatus 104 of the present example embodiment is the same as the operation of Step S305 in the third example embodiment illustrated in FIG. 14. The image processing apparatus 104 in the present example embodiment performs the same operation as the operation of Step S305 in the third example embodiment. Further, the operations of Steps S105 and S106 in the image processing apparatus 104 are the same as the operations of Steps S105 and S106 in the image processing apparatus 100 in the first example embodiment illustrated in FIG. 5. In Steps S105 and S106, the image processing apparatus 104 performs the same operations as the operations of Steps S105 and S106 in the image processing apparatus 100 of the first example embodiment.

Next, an operation of the receiving device 204 in the present example embodiment is described in detail with reference to the drawings.

Figure 24:
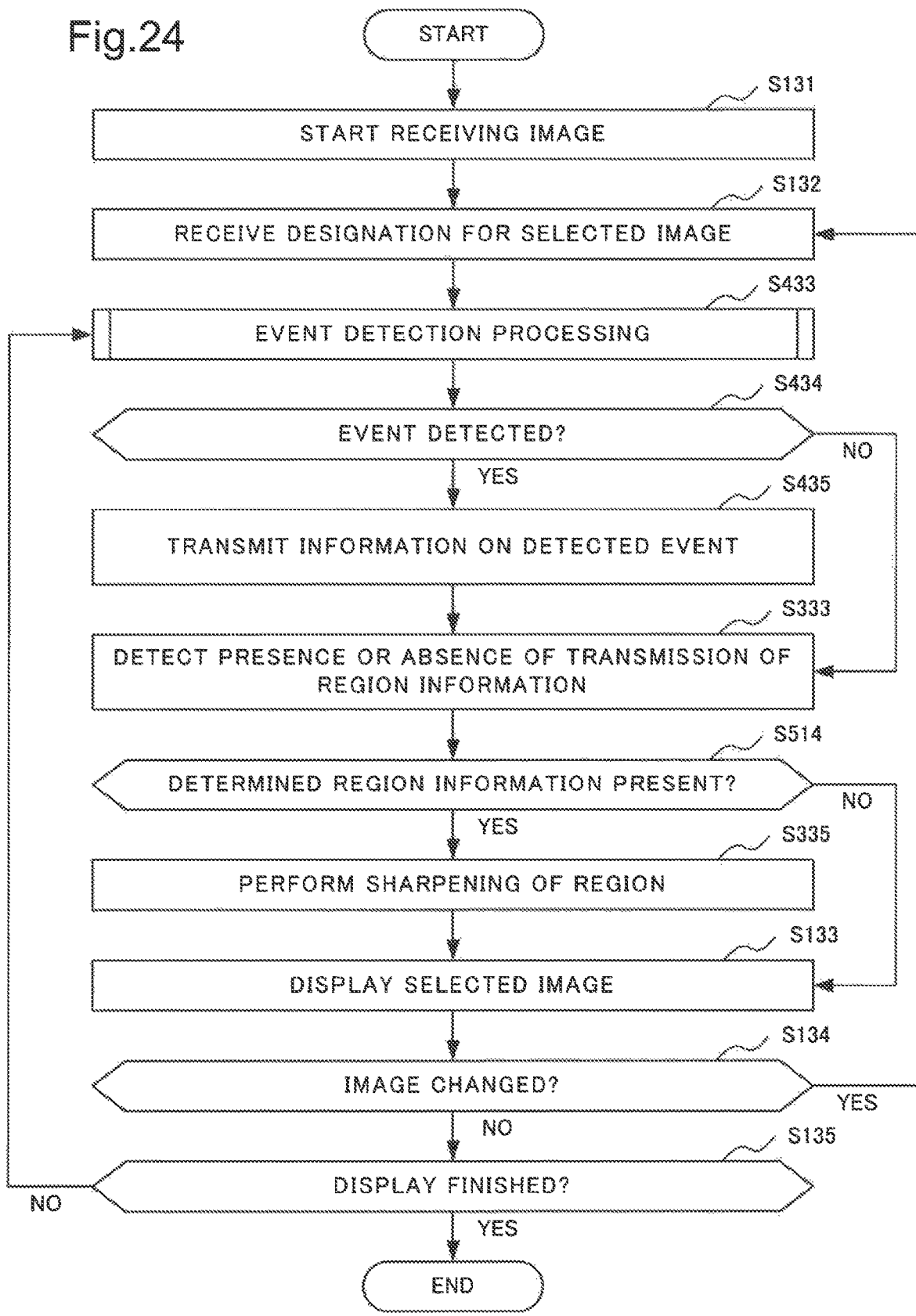
FIG. 24 is a flowchart illustrating an operation example of a receiving device according to the fifth example embodiment of the present invention.

FIG. 24 is a flowchart illustrating an operation example of the receiving device 204 in the present example embodiment.

In Steps S131 and S132 illustrated in FIG. 24, the receiving device 204 performs the same operations as the operations of Steps S131 and S132 of the receiving device 200 in the first example embodiment illustrated in FIG. 8.

In the operations from Steps S433 to S435 illustrated in FIG. 24, the receiving device 204 in the present example embodiment performs the same operations as the operations of steps having same reference numbers in the receiving device 203 of the fourth example embodiment illustrated in FIG. 19.

In the operation of Step S333 illustrated in FIG. 24, the receiving device 204 in the present example embodiment performs the same operation as the operation of a step having a same reference number in the receiving device 202 of the third example embodiment illustrated in FIG. 15. The receiving device 204 performs the operation of Step S514 following Step S333.

Step S514:

In Step S333, when information on an ROI is transmitted, information on a determined ROI is present. When information on a determined ROI is present (YES in Step S514), the receiving device 204 performs the operation of Step S335 next. When information on a determined ROI is not present (NO in Step S514), the receiving device 204 performs the operation of Step S133 next. In Step S433, the second position estimation unit 260 may determine an ROI. Specifically, the second position estimation unit 260 may perform the operation of Step S124 illustrated in FIG. 20. In this case, in Step S305 illustrated in FIG. 23, the determination unit 131 of the image processing apparatus 104 does not need to transmit, to the receiving device 204, information on an ROI based on event information received from the receiving device 204. When an ROI is determined in Step S433, information on the determined ROI is present, regardless that information on the ROI is not transmitted in Step S333.

In the operation of Step S335 illustrated in FIG. 24, the receiving device 204 in the present example embodiment performs the same operation as the operation of a step having a same reference number in the receiving device 202 of the third example embodiment illustrated in FIG. 15.

In Steps S133, S134, and S135 illustrated in FIG. 24, the receiving device 204 performs the same operations as the operations of steps having same reference numbers in the receiving device 200 of the first example embodiment illustrated in FIG. 8. However, when a display is not finished in Step S135 (NO in Step S135), the operation of the receiving device 200 returns to Step S433.

In the above-described present example embodiment, it is possible to reduce a network bandwidth necessary for transmitting an image, while suppressing lowering of image quality of a region of interest in the image where an occurrence place is not determined in advance, regarding regions of interest of various types.

A reason for this is that the position estimation unit 130 estimates a phenomenon occurrence position from image data acquired by a camera unit 110 and sound data acquired by the sound input unit 170. Further, the second position estimation unit 260 estimates a phenomenon occurrence position from image data acquired by decoding encoded data received from the image processing apparatus 104. Furthermore, the determination unit 131 determines an ROI, based on these phenomenon occurrence positions.

The present example embodiment further has a same advantageous effect as the third example embodiment. A reason for this is the same as the reason why the advantageous effect of the third example embodiment is provided.

Modification Example

The present example embodiment may be modified similarly to the modification example of the second example embodiment. In this case, a same advantageous effect as the modification example of the second example embodiment is provided. Further, modifications similarly to the second and third modification examples of the fourth example embodiment are also available.

Sixth Example Embodiment

Next, a sixth example embodiment of the present invention is described in detail with reference to the drawings.

«Configuration»

Figure 25:
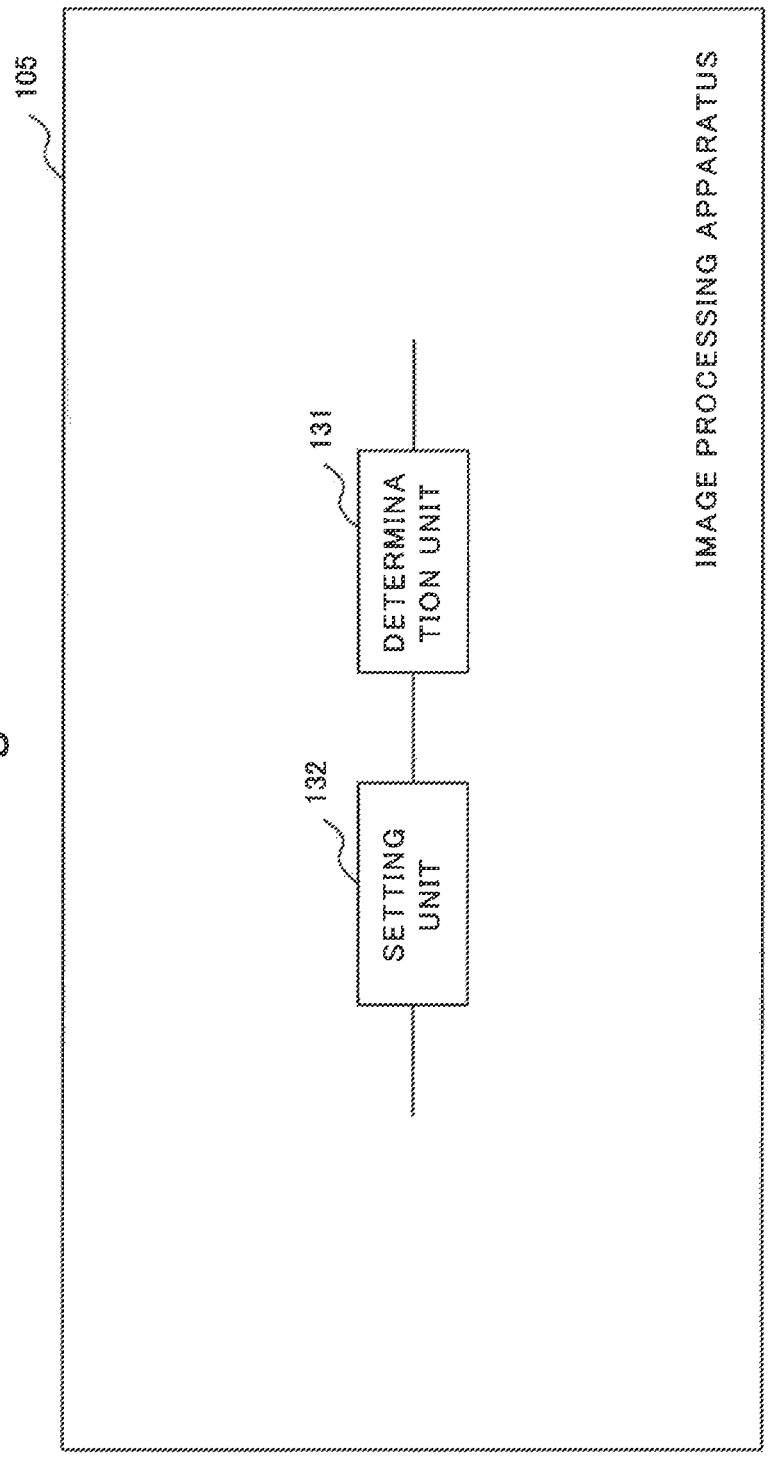
FIG. 25 is a block diagram illustrating a configuration example of an image processing apparatus according to a sixth example embodiment of the present invention.

FIG. 25 is a block diagram illustrating a configuration example of an image processing apparatus 105 in the present example embodiment.

Referring to FIG. 25, the image processing apparatus 105 in the present example embodiment includes a determination unit 131 and a setting unit 132. The determination unit 131 determines a first region based on an occurrence position where a phenomenon is estimated to occur in an image. The setting unit 132 sets a first condition (namely, a region of interest) in which the first region is encoded, and a second condition in which a second region (namely, a region other than the region of interest) included in an image and being a region other than the first region is encoded in such a way that the first region enhances image quality as compared with the second region.

«Operation»

Figure 26:
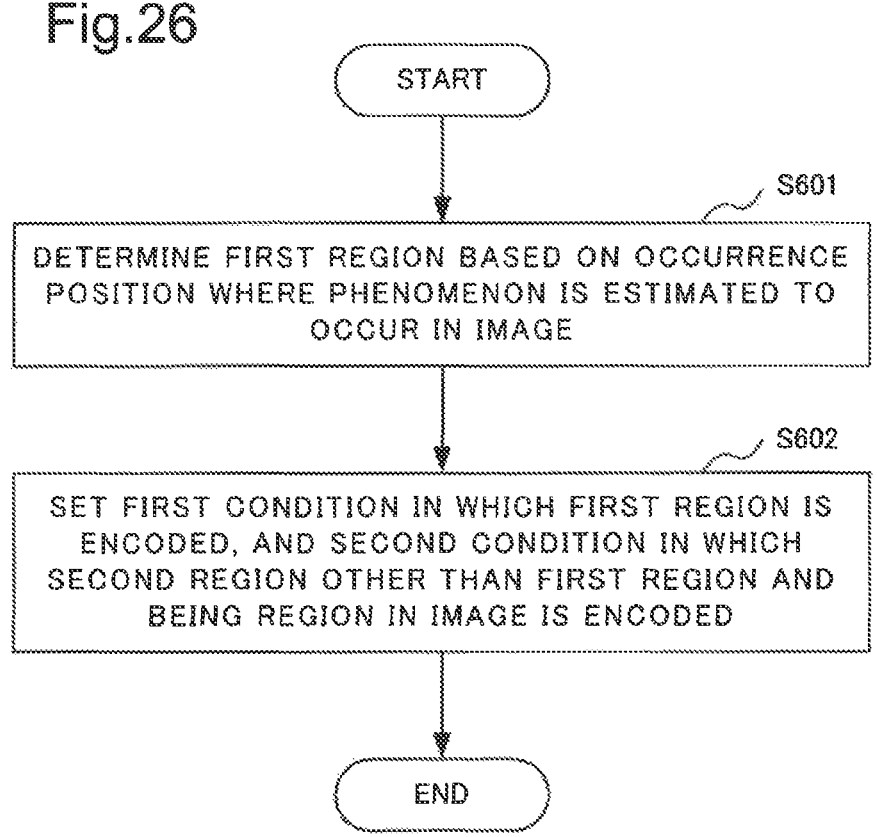
FIG. 26 is a flowchart illustrating an operation example of the image processing apparatus according to the sixth example embodiment of the present invention.

FIG. 26 is a flowchart illustrating an operation example of the image processing apparatus 105 in the present example embodiment.

S601:

The determination unit 131 determines a first region based on an occurrence position where a phenomenon is estimated to occur in an image.

S602:

The setting unit 132 sets a first condition (namely, a region of interest) in which the first region is encoded, and a second condition in which a second region (namely, a region other than the region of interest) included in an image and being a region other than the first region is encoded in such a way that the first region enhances image quality as compared with the second region.

The above-described present example embodiment has an advantageous effect that it is possible to reduce a network bandwidth necessary for transmitting a bandwidth, while suppressing lowering of image quality in a region of interest in an image where an occurrence position is not determined in advance. A reason for this is that the determination unit 131 determines a first region based on an occurrence position where a phenomenon is estimated to occur in an image. The setting unit 132 sets a first condition (namely, a region of interest) in which the first region is encoded, and a second condition in which a second region included in an image and being a region other than the first region is encoded in such a way that the first region enhances image quality as compared with the second region. The first region is a region of interest. The second region is a region other than the region of interest. For example, by setting the first and second conditions in such a way that image quality of the second region is lowered, while keeping image quality of the first region, it is possible to suppress lowering of image quality of a region of interest, and reduce an amount of data of encoded data in a region other than the region of interest.

Other Example Embodiments

In the examples of the above-described first, third, fourth, and fifth example embodiments, the position estimation unit 130 detects, as a phenomenon occurrence position, a region of a face or a person detected based on face collation, for example. A phenomenon occurrence position to be estimated by the position estimation unit 130 is not limited to the above-described examples. The position estimation unit 130 may detect, as a phenomenon occurrence position, a position of a person who behaves suspiciously (person who performs a predetermined behavior pattern), a position of abandoned goods (suspicious goods), a position of a gathering crowd (persons of a predetermined number or more present within a predetermined area), or the like. Examples of the suspicious behavior are staying at a same place for a predetermined time or longer, repeatedly walking along a similar route, repeating a similar behavior pattern and the like.

Further, the image processing apparatuses according to the above-described each example embodiment (namely, the image processing apparatuses 100, 101, 102, 103, and 104) may include a display unit such as a display. The image processing apparatuses according to the above-described each example embodiment may notify an image processing apparatus in the vicinity of position information of a district in which an ROI is set, when an occurrence position of a phenomenon as a disaster, an incident, an accident, and a sign of these phenomena is detected. Position information of a district in which an ROI is set may be, for example, a latitude and a longitude indicated by a phenomenon occurrence position, which are estimated based on a phenomenon occurrence position in an image, or the like. Position information of a district in which an ROI is set may be, for example, a name of an intersection, a name of a street, or an address. Position information of a district in which an ROI is set may be, for example, an identifier imparted in advance to a block acquired by dividing a district where an image processing apparatus is installed, or the like. Position information of a district in which an ROI is set may be, for example, information indicating a position such as a latitude and a longitude of an image processing apparatus which determines the ROI. Position information of a district in which an ROI is set may be, for example, a combination of information indicating a position such as a latitude and a longitude of an image processing apparatus which determines the ROI, and a direction of a camera unit 110. Further, the image processing apparatus may be a mobile terminal carried by a police officer, and the like.

Thus, a police officer and the like in the vicinity and carrying a mobile terminal being an image processing apparatus which receives position information is allowed to make haste to a location near a place indicated by the position information, and distribute an image in the vicinity of the place to a receiving device by the image processing apparatus. In this case, the image processing apparatus may measure a capturing place and a camera direction by GPS information or a magnetic sensor, and notify a receiving device according to an example embodiment of the present invention of the measured capturing place and camera direction. The receiving device may notify another image processing apparatus of the notified capturing place and camera direction. The receiving device may notify only an image processing apparatus present within a predetermined area from a notified capturing place, of the notified capturing place.

A receiving device according to the fourth and fifth example embodiments may set an ROI by using an image, an image, and the like to be acquired via the Internet, in addition to determining an ROI by using an image received from an image processing apparatus. The receiving device may detect a disaster, an incident, an accident, and a sign of these phenomena by using big data analysis and the like in data acquired from a social networking service (SNS) on the Internet, for example. The receiving device may further specify a place where a disaster, an incident, an accident, and a sign of these phenomena are detected. The receiving device may further specify an image in which a condition in the vicinity of a specified place is displayed, and set an ROI in the specified image. The image may be an image captured by any one of the image processing apparatuses.

Each constituent element of an image processing apparatus and a receiving device according to the above-described each example embodiment may be achieved by a dedicated circuit mounted as a semiconductor processing component including an application specific integrated circuit (ASIC), for example. Further, these constituent elements may be achieved by a computer including a memory in which a program for achieving functions of these constituent elements is stored, and at least one processor which executes the program. The one or more processors are, for example, a micro processing unit (MPU), a digital signal processor (DSP), and a combination of these elements.

Figure 27:
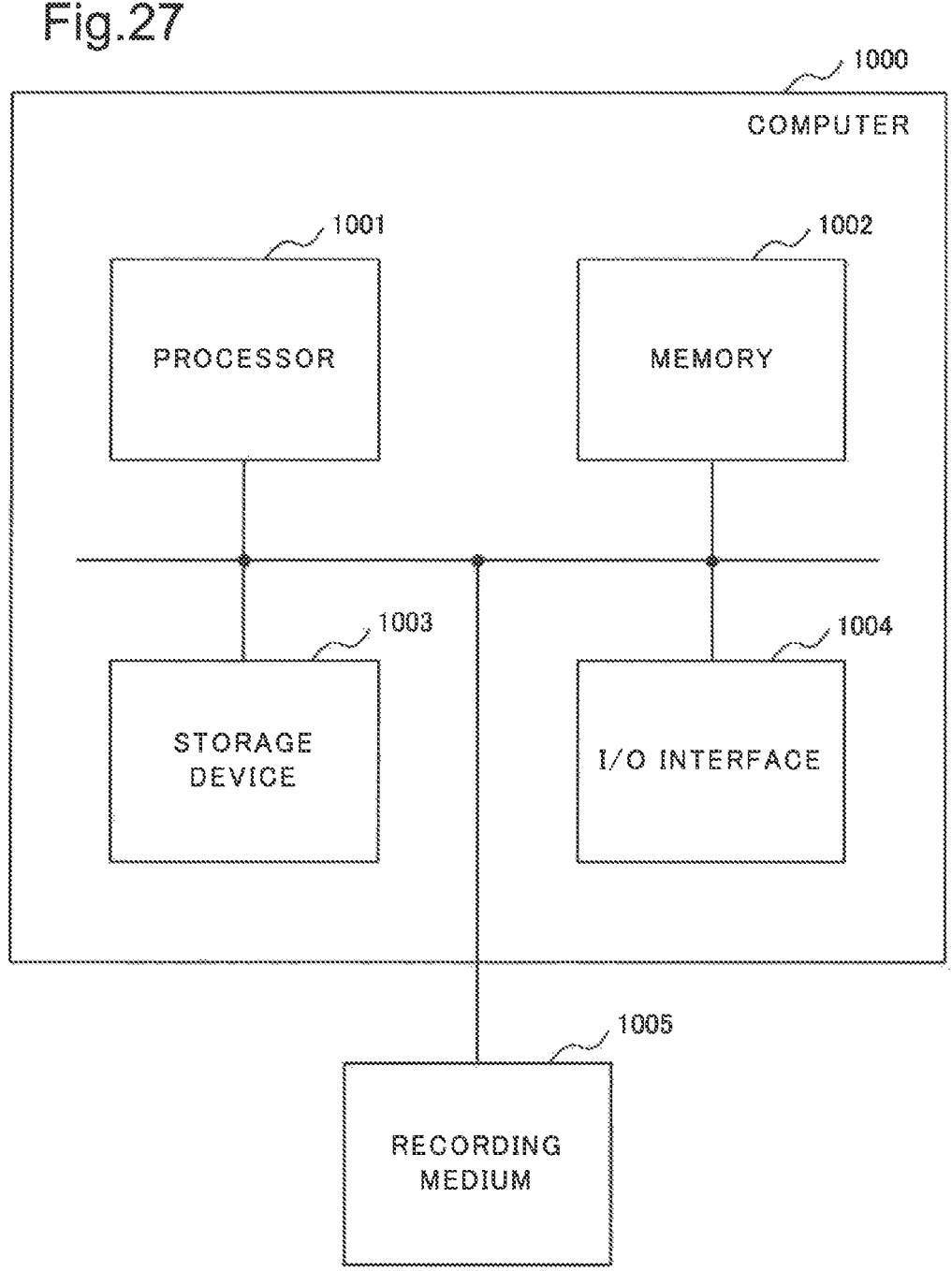
FIG. 27 is a block diagram illustrating a configuration example of a computer, which enables to achieve an image processing apparatus and a receiving device according to each example embodiment of the present invention.

FIG. 27 is a block diagram illustrating a configuration example of a computer capable of achieving an image processing apparatus and a receiving device according to each example embodiment of the present invention. Referring to FIG. 27, a computer 1000 includes a processor 1001, a memory 1002, a storage device 1003, and an input/output (I/O) interface 1004. The computer 1000 is able to access to a recording medium 1005. The memory 1002 and the storage device 1003 are, for example, a storage device such as a random access memory (RAM), or a hard disk. The recording medium 1005 is, for example, a non-transitory computer readable medium to be described later in detail. The storage device 1003 may be the recording medium 1005. The processor 1001 is able to read and write data and a program with respect to the memory 1002 and the storage device 1003. The processor 1001 is able to access to another device connected to a communication network 300 via the I/O interface 1004, for example. The processor 1001 is able to access to the recording medium 1005. The recording medium 1005 stores a program which causes the computer 1000 to operate as an image processing apparatus or a receiving device according to any one of the example embodiments of the present invention.

The processor 1001 loads a program stored in the recording medium 1005 into the memory 1002. The computer 1000 is operated as an image processing apparatus or a receiving device according to any one of the example embodiments of the present invention by causing the processor 1001 to execute a program loaded in the memory 1002.

Specifically, a part or the entirety of the image receiving unit 115, the encoder unit 120, the position estimation unit 130, the determination unit 131, the setting unit 132, the first storage unit 140, the bandwidth estimation unit 150, the first communication unit 160, and the sound receiving unit 175 may be achieved by a dedicated circuit. The image receiving unit 115, the encoder unit 120, the position estimation unit 130, the determination unit 131, the setting unit 132, the bandwidth estimation unit 150, the first communication unit 160, and the sound receiving unit 175 may be achieved by a memory in which a program for achieving functions of these units is loaded, and one or more processors which execute the program. The first storage unit 140 may be achieved by a storage device such as a memory or a hard disk device included in a computer. Likewise, the control unit 220, the second storage unit 230, the second communication unit 240, the sharpening unit 250, the second position estimation unit 260, and the second determination unit 261 may be achieved by a dedicated circuit. The control unit 220, the second communication unit 240, the sharpening unit 250, the second position estimation unit 260, and the second determination unit 261 may be achieved by a memory in which a program for achieving functions of these units is loaded, and one or more processors which execute the program. The second storage unit 230 may be achieved by a storage device such as a memory or a hard disk device included in a computer.

The above-described program is stored in a non-transitory computer readable medium of various types, and is providable to a computer. A non-transitory computer readable medium includes a tangible storage medium of various types. A non-transitory computer readable medium may be, for example, a magnetic recording medium (e.g., a flexible disk, a magnetic tape, or a hard disk). A non-transitory computer readable medium may be a magneto-optical recording medium (e.g., a magneto-optical disk), a compact disc read only memory (CD-ROM), a compact disc-recordable (CD-R), or a compact disc-rewritable (CD-R/W). A non-transitory computer readable medium may be a semiconductor memory (e.g., a mask ROM, or a programmable ROM (PROM)), an erasable PROM (EPROM), a flash ROM, and a random access memory (RAM). Further, a program may be provided to a computer by a transitory computer readable medium of various types. Examples of the transitory computer readable medium include an electrical signal, an optical signal, and an electromagnetic wave. A transitory computer readable medium is able to provide a computer with a program via a wired communication path such as an electrical wire or an optical fiber, or a wireless communication path.

Further, a part or the entirety of the above-described example embodiments may be described as the following supplementary notes, but are not limited to the follows.

(Supplementary Note 1)

An image processing apparatus including:

determination means for determining a first region based on an occurrence position where a phenomenon is estimated to occur in an image; and setting means for setting a first condition in which the first region is encoded, and a second condition in which a second region included in the image and being a region other than the first region is encoded in such a way that the first region enhances image quality as compared with the second region.

(Supplementary Note 2)

The image processing apparatus according to Supplementary Note 1, wherein the setting means sets the first condition and the second condition, based on a communication bandwidth usable in a communication network in which the image is distributed.

(Supplementary Note 3)

The image processing apparatus according to Supplementary Note 1 or 2, further including position estimation means for estimating the occurrence position, based on data acquired by a sensor.

(Supplementary Note 4)

The image processing apparatus according to Supplementary Note 3, wherein the position estimation means detects an image pattern as the phenomenon in the image, and estimates a position where the phenomenon is detected, as the occurrence position.

(Supplementary Note 5)

The image processing apparatus according to Supplementary Note 3 or 4, wherein the position estimation means specifies a direction of a sound source, based on sound data collected by two or more microphones, and estimates a position in the image being indicated by the direction of the sound source, as the occurrence position.

(Supplementary Note 6)

The image processing apparatus according to Supplementary Note 5, wherein the position estimation means detects a predetermined sound pattern in the sound data, and specifies the direction of the sound source of the sound including the sound pattern.

(Supplementary Note 7)

The image processing apparatus according to any one of Supplementary Notes 1 to 6, further including encoder means for encoding the first region in the first condition, and encoding the second region in the second condition.

(Supplementary Note 8)

An image processing system including the image processing apparatus according to any one of Supplementary Notes 1 to 7, and a receiving device, wherein the image processing apparatus further includes first communication means for transmitting encoded image data of the image, and region information indicating a range of the first region, and the receiving device includes:

second communication means for receiving the image data and the region information;

control means for generating a decoded image by decoding the image data;

sharpening means for sharpening the decoded image in a region indicated by the region information; and display means for displaying the sharpened decoded image.

(Supplementary Note 9)

An image processing method including:

determining a first region based on an occurrence position where a phenomenon is estimated to occur in an image; and setting a first condition in which the first region is encoded, and a second condition in which a second region included in the image and being a region other than the first region is encoded in such a way that the first region enhances image quality as compared with the second region.

(Supplementary Note 10)

The image processing method according to Supplementary Note 9, further including setting the first condition and the second condition, based on a communication bandwidth usable in a communication network in which the image is distributed.

(Supplementary Note 11)

The image processing method according to Supplementary Note 9 or 10, further including estimating the occurrence position, based on data acquired by a sensor.

(Supplementary Note 12)

The image processing method according to Supplementary Note 11, further including detecting an image pattern as the phenomenon in the image, and estimating a position where the phenomenon is detected, as the occurrence position.

(Supplementary Note 13)

The image processing method according to Supplementary Note 11 or 12, further including specifying a direction of a sound source, based on sound data collected by two or more microphones, and estimating a position indicated by the direction of the sound source in the image, as the occurrence position.

(Supplementary Note 14)

The image processing method according to Supplementary Note 13, further including detecting a predetermined sound pattern in the sound data, and specifying the direction of the sound source of the sound including the sound pattern.

(Supplementary Note 15)

The image processing method according to any one of Supplementary Notes 9 to 14, further including encoding the first region in the first condition, and encoding the second region in the second condition.

(Supplementary Note 16)

A storage medium storing a program causing a computer to execute:

determination processing of determining a first region based on an occurrence position where a phenomenon is estimated to occur in an image; and setting processing of setting a first condition in which the first region is encoded, and a second condition in which a second region included in the image and being a region other than the first region is encoded in such a way that the first region enhances image quality as compared with the second region.

(Supplementary Note 17)

The storage medium according to Supplementary Note 16, wherein the setting processing sets the first condition and the second condition, based on a communication bandwidth usable in a communication network in which the image is distributed.

(Supplementary Note 18)

The storage medium according to Supplementary Note 16 or 17, wherein the storage medium stores the program which causes a computer to further execute position estimation processing of estimating the occurrence position, based on data acquired by a sensor.

(Supplementary Note 19)

The storage medium according to Supplementary Note 18, wherein the position estimation processing detects an image pattern in the image as the phenomenon, and estimates a position where the phenomenon is detected, as the occurrence position.

(Supplementary Note 20)

The storage medium according to Supplementary Note 18 or 19, wherein the position estimation processing specifies a direction of a sound source, based on sound data collected by two or more microphones, and estimates a position indicated by the direction of the sound source in the image, as the occurrence position.

(Supplementary Note 21)

The storage medium according to Supplementary Note 20, wherein the position estimation processing detects a predetermined sound pattern in the sound data, and specifies the direction of the sound source of the sound including the sound pattern.

(Supplementary Note 22)

The storage medium according to any one of Supplementary Notes 16 to 21, wherein the storage medium stores the program which causes a computer to further execute encoding processing of encoding the first region in the first condition, and encoding the second region in the second condition.

The present invention is described with reference to example embodiments. The present invention, however, is not limited to the above-described example embodiments. A configuration and details of the present invention may be modified in various ways comprehensible to a person skilled in the art, as far as the modifications do not depart from the gist of the present invention.

The above-described example embodiments are merely an example relating to application of a technical idea acquired by the inventors of the present application. Specifically, it is needless to say that the technical idea is not limited to the above-described example embodiments, and various modifications are available.

According to the present invention, also in image distribution in an environment where a network bandwidth is limited, a target region is applicable for use such as an image processing apparatus capable of distributing a high quality image, an image distributing system incorporating the apparatus, and a program for achieving the apparatus.

REFERENCE SIGNS LIST

100 Image processing apparatus
101 Image processing apparatus
102 Image processing apparatus
103 Image processing apparatus
104 Image processing apparatus
105 Image processing apparatus
110 Camera unit
115 Image receiving unit
120 Encoder unit
130 Position estimation unit
131 Determination unit
132 Setting unit
140 First storage unit
150 Bandwidth estimation unit
160 First communication unit
170 Sound input unit
175 Sound receiving unit
200 Receiving device
202 Receiving device
203 Receiving device
204 Receiving device
210 Input-output unit
220 Control unit
230 Second storage unit
240 Second communication unit
250 Sharpening unit
260 Second position estimation unit
261 Second determination unit
300 Communication network
500 Image processing system
501 Image processing system
502 Image processing system
503 Image processing system
504 Image processing system
1000 Computer
1001 Processor
1002 Memory
1003 Storage device
1004 I/O interface
1005 Recording medium

The invention claimed is:

1. An image processing apparatus comprising:
at least one memory that stores a set of instructions; and
at least one processor configured to execute the set of instructions to:
determine a first region based on an occurrence position where a phenomenon is estimated to occur in an image;
set a first condition in which the first region is encoded, and a second condition in which a second region included in the image and being a region other than the first region is encoded in such a way that the first region enhances image quality as compared with the second region;
estimate the occurrence position, based on data acquired by a sensor; and
specify a direction of a sound source, based on sound data collected by two or more microphones, and determine a position in the image being indicated by the direction of the sound source, as the occurrence position.

2. The image processing apparatus according to claim 1, wherein
the at least one processor is configured to
set the first condition and the second condition, based on a communication bandwidth usable in a communication network in which the image is distributed.

3. The image processing apparatus according to claim 1, wherein
the at least one processor is configured to
detect an image pattern as the phenomenon in the image, and determine a position where the phenomenon is detected, as the occurrence position.

4. The image processing apparatus according to claim 1, wherein
the at least one processor is configured to
detect a predetermined sound pattern in the sound data, and specify the direction of the sound source of the sound including the sound pattern.

5. The image processing apparatus according to claim 1, wherein
the at least one processor is configured to
encode the first region in the first condition, and encoding the second region in the second condition.

6. An image processing system including the image processing apparatus according to claim 1, and a receiving device, wherein
the at least one processor is configured to
transmit encoded image data of the image, and region information indicating a range of the first region, and
the receiving device includes:
at least one second memory that stores a second set of instructions; and
at least one second processor configured to execute the second set of instructions to:
receive the image data and the region information;
generate a decoded image by decoding the image data;
sharpen the decoded image in a region indicated by the region information; and
display the sharpened decoded image.

7. An image processing method comprising:
determining a first region based on an occurrence position where a phenomenon is estimated to occur in an image;
setting a first condition in which the first region is encoded, and a second condition in which a second region included in the image and being a region other than the first region is encoded in such a way that the first region enhances image quality as compared with the second region;
estimating the occurrence position, based on data acquired by a sensor; and
specifying a direction of a sound source, based on sound data collected by two or more microphones, and estimating a position indicated by the direction of the sound source in the image, as the occurrence position.

8. The image processing method according to claim 7, further comprising
setting the first condition and the second condition, based on a communication bandwidth usable in a communication network in which the image is distributed.

9. The image processing method according to claim 7, further comprising
detecting an image pattern as the phenomenon in the image, and estimating a position where the phenomenon is detected, as the occurrence position.

10. The image processing method according to claim 7, further comprising
detecting a predetermined sound pattern in the sound data, and specifying the direction of the sound source of the sound including the sound pattern.

11. The image processing method according to claim 7, further comprising
encoding the first region in the first condition, and encoding the second region in the second condition.

12. A non-transitory computer readable storage medium storing a program causing a computer to execute:
determination processing of determining a first region based on an occurrence position where a phenomenon is estimated to occur in an image;
setting processing of setting a first condition in which the first region is encoded, and a second condition in which a second region included in the image and being a region other than the first region is encoded in such a way that the first region enhances image quality as compared with the second region; and
position estimation processing of estimating the occurrence position, based on data acquired by a sensor, wherein
the position estimation processing specifies a direction of a sound source, based on sound data collected by two or more microphones, and estimates a position indicated by the direction of the sound source in the image, as the occurrence position.

13. The storage medium according to claim 12, wherein the setting processing sets the first condition and the second condition, based on a communication bandwidth usable in a communication network in which the image is distributed.

14. The storage medium according to claim 12, wherein the position estimation processing detects an image pattern in the image as the phenomenon, and estimates a position where the phenomenon is detected, as the occurrence position.

* * * * *